US012736212B2

(12) United States Patent
Bertken

(10) Patent No.: US 12,736,212 B2
(45) Date of Patent: Sep. 15, 2026

(54) PROTECTIVE LIGHTING SYSTEM AND METHODS

(71) Applicant: Infinity X1 LLC, Carlsbad, CA (US)

(72) Inventor: Dennis K. Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

(21) Appl. No.: 19/266,012

(22) Filed: Jul. 10, 2025

(65) Prior Publication Data

US 2026/0016151 A1 Jan. 15, 2026

Related U.S. Application Data

(60) Provisional application No. 63/747,005, filed on Jan. 18, 2025, provisional application No. 63/676,435, filed on Jul. 28, 2024, provisional application No. 63/669,674, filed on Jul. 10, 2024.

(51) Int. Cl.
*F21V 25/02* (2006.01)
*F21V 23/04* (2006.01)

(52) U.S. Cl.
CPC .......... *F21V 25/02* (2013.01); *F21V 23/0485* (2013.01)

(58) Field of Classification Search
CPC ............................ H05B 45/18; F21V 23/0485
See application file for complete search history.

(56) References Cited

U.S. PATENT DOCUMENTS 8,563,898 B1 * 10/2013 Wright ................. B60Q 1/0017 219/202
11,665,803 B2 * 5/2023 Pilz ...................... H05B 47/175 315/151
11,901,755 B2 2/2024 Wang et al.
12,356,527 B1 7/2025 Bertken
2016/0360585 A1 * 12/2016 Urry ................... F21V 23/0414
2019/0014643 A1 * 1/2019 Gharabegian ........... G06F 3/167
(Continued)

FOREIGN PATENT DOCUMENTS

CN 212298619 U 1/2021
CN 215300990 U 12/2021
(Continued)

OTHER PUBLICATIONS

English Machine Translation of CN 116685016 (Year: 2023).*
(Continued)

*Primary Examiner* — Zheng Song
(74) *Attorney, Agent, or Firm* — Wang Hardoon, P.C.

(57) ABSTRACT

Touch-based protective lighting system and methods may be used. Portable lighting devices and/or modes of operation may pose safety risks. High-lumen output, focused light output, and/or overheating components may damage, burn, or ignite surrounding materials or the user. Various modes of operation of the portable lighting device may include modes designed to increase the safety of the portable lighting device. In certain operating modes or configurations, user touch/presence/control, distance to an illumination target, temperature of an illumination target, and/or device temperature may be used to determine whether to use the operating mode or instead to enter a protective/safe mode. Safe mode may be characterized by a lower light output/power mode or may power off the portable lighting device.

28 Claims, 17 Drawing Sheets

(56) References Cited

U.S. PATENT DOCUMENTS

| | | | | |
|---|---|---|---|---|
| 2023/0132952 | A1* | 5/2023 | Youngblood | G16H 40/63 607/88 |
| 2023/0204168 | A1* | 6/2023 | Bertken | F21V 23/0492 |
| 2023/0400177 | A1* | 12/2023 | Chen | F21V 33/0076 |
| 2025/0297731 | A1 | 9/2025 | Li | |

FOREIGN PATENT DOCUMENTS

| | | | | |
|---|---|---|---|---|
| CN | 116685016 | A * | 9/2023 | H05B 45/18 |
| CN | 117750594 | A | 3/2024 | |
| CN | 221666012 | U | 9/2024 | |
| CN | 119521505 | A | 2/2025 | |
| DE | 202023106707 | U1 | 1/2024 | |
| EP | 3671034 | A1 | 6/2020 | |
| WO | 2021068385 | A1 | 4/2021 | |

OTHER PUBLICATIONS

Fenix LR80R Rechargeable LED Searchlight—18000 Lumens (2023) https://fenix-store.com/products/fenix-lr80r-rechargeable-searchlight-18000-lumens.

Fenixlight Limited, Fenix LR80R Product Manual, Super Bright Handheld Searchlight (Dec. 15, 2022).

Nextorch Saint Torch 30C Bright Search Light | 15,000 lm (2025) https://www.nextorch.com/products/saint-torch-30c-ultra-bright-search-light.

X65 Mini High Intensity Flashlight (2025) https://www.acebeam.com/x65-mini .

* cited by examiner

100

| Sensation | Skin Color | Tissue Temperature deg. C | Tissue Temperature deg. F | Process | Injury |
|---|---|---|---|---|---|
| Numbness | White | 72 | 162 | Protein Coagulation | Irreversible |
| | Mottled Red and White | 68 | | Thermal Inactivation of Tissue Contents | Possibly Reversible |
| | | 64 | | | |
| | | 60 | 140 | | |
| Maximum Pain | Bright Red | 56 | | | Reversible |
| Severe Pain | | 52 | | | |
| Threshold Pain | Light Red | 48 | | | |
| | | 44 | 111 | | |
| Hot | Flushed | 40 | | Normal Metabolism | None |
| Warm | | 36 | | | |
| | | | 93 | | |
| | | 32 | | | |

FIG. 1

PROTECTIVE LIGHTING SYSTEM AND METHODS

PRIORITY

This application claims the benefit of priority to U.S. Provisional Patent Application Ser. No. 63/669,674 filed Jul. 10, 2024 and entitled "TOUCH BASED PROTECTIVE LIGHTING SYSTEM AND METHODS", U.S. Provisional Patent Application Ser. No. 63/676,435 filed Jul. 28, 2024 and entitled "TEMPERATURE-BASED PROTECTIVE LIGHTING SYSTEM AND METHODS", and U.S. Provisional Patent Application Ser. No. 63/747,005 filed Jan. 18, 2025 and entitled "PROTECTIVE LIGHTING SYSTEM AND METHODS" each of the foregoing incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of lighting systems. More particularly, the present disclosure relates to protective lighting systems.

DESCRIPTION OF RELATED TECHNOLOGY

Recent improvements to battery capacity and LED output capabilities have created new market segments for handheld flashlights and lanterns. Some of these high output devices can generate more than ten thousand lumens (10,000 lm); in some cases, flashlights may even exceed 100,000 lumens. At these output levels, obstructing the light beam with a user's hand for more than a few seconds can result in a physical burn; accidentally dropping the flashlight into/onto flammable materials (e.g., oily rags, etc.) could create a significant fire risk. In other words, these high output devices may introduce unexpected new hazards.

Extended continuous use of the flashlight can cause the flashlight to overheat. High-power flashlights are often designed for short bursts of use rather than extended periods.

High-power flashlights can produce very intense beams of light with high lumen output. This intense light can focus enough energy on a small area to generate significant heat. Further, flashlights may have focusing lenses or other mechanisms to direct light output. If the flashlight has a highly focused beam (like a laser), the flashlight may concentrate light energy on a small area, which may raise the temperature of that area quickly, potentially leading to burns or even ignition of flammable materials.

The intense beam from a high-power flashlight can focus enough light on a piece of paper or dry leaves to ignite them. Directing a high-power flashlight beam onto a piece of fabric for an extended period can cause it to heat up and potentially burn. Accidentally shining a high-power flashlight directly onto the skin for too long can cause burns.

Standards bodies and safety organizations publish guidelines regarding safe to touch temperatures. For example, ASTM C1055 (Standard Guide for Heated System Surface Conditions that Produce Contact Burn Injuries) recommends that pipe surface temperatures remain at or below 140° F. The reason for this is that the average person can touch a 140° F. surface for up to five seconds without sustaining irreversible burn damage. ASTM C1055 determined that five seconds is the most probable contact time in an industrial setting. In high ambient temperature environments or where there is an elevated risk to the worker, many process engineers use 120° F. as the maximum safe-to-touch temperature to further reduce the risk to workers. Safety organizations such as California's OSHSB amended their General Industry Safety Orders (Section 3308) to read that, "pipes or other exposed surfaces having an external surface temperature of 140° F. (60° C.) or higher," should be insulated or otherwise guarded against contact. OSHA regulation 1910.261(k)(11) states, "all exposed steam and hot-water pipes within 7 feet of the floor or working platform, or within 15 inches measured horizontally from stairways, ramps, or fixed ladders, shall be covered with an insulating material or guarded in such a manner as to prevent contact."

FIG. 1 is a table 100 illustrating thermal sensations and associated effects throughout a range of temperatures compatible with tissue life. As the temperature of skin or other tissue rises, pain and potentially irreversible injury is experienced. Table 100 illustrates how skin reacts when exposed to surfaces at varying temperatures. As temperatures rise, burned skin tissue may turn white. This is indicative of irreversible burn damage and is so severe that the pain can be replaced by a feeling of numbness.

Fabrics may also scorch, melt, or burn when exposed to high temperatures. For example, while the ideal temperature range for heat pressing polyester is 270° F.-300° F. (132° C.-149° C.), temperatures above 320° F. (160° C.) can cause melting or scorching. Some polyester fabrics may be more sensitive and may scorch at temperatures as low as 280° F. Polyester fiber has a melting point of approximately 482° F. (295° C.). Low-melt polyester fiber has a melting point of 90° F.-220° F., with 110° C. LMF being the most common.

BRIEF DESCRIPTION OF THE DRAWINGS

FIG. 1 is a table 100 illustrating thermal sensations and associated effects throughout a range of temperatures compatible with tissue life.

DETAILED DESCRIPTION

Figure 2:
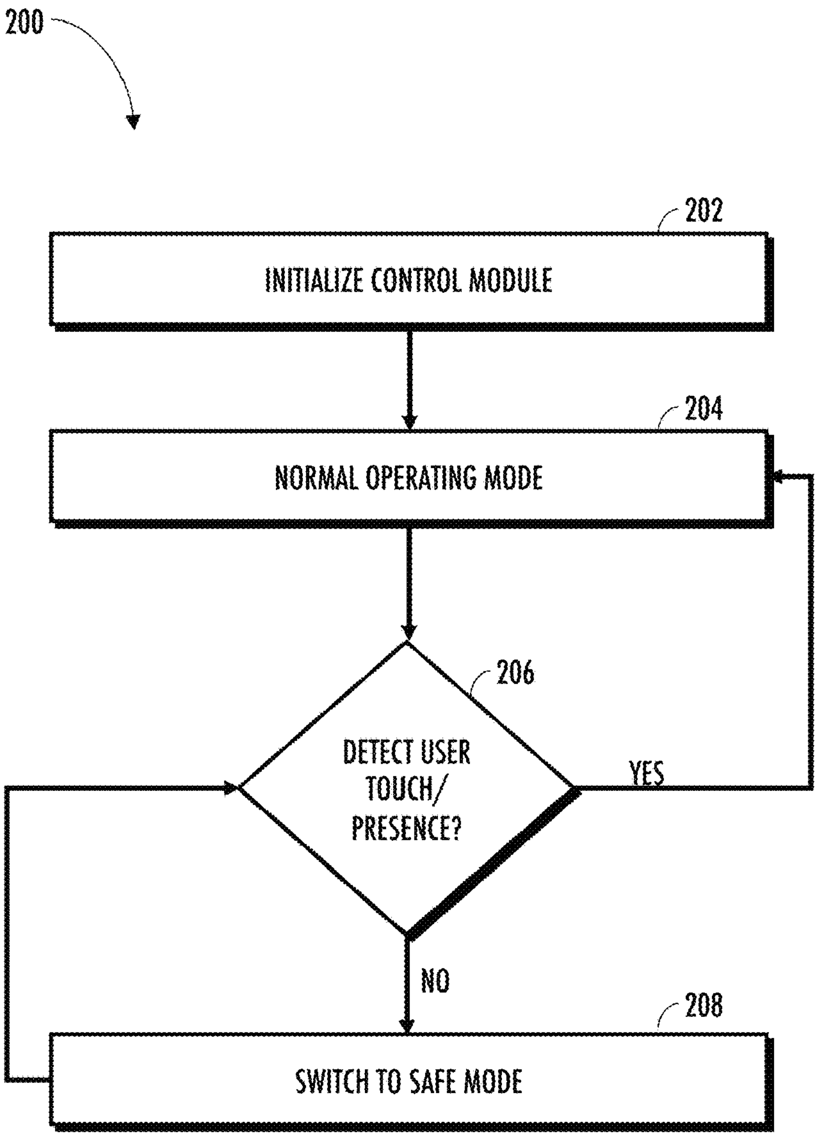
FIG. 2 is a logical flow diagram of one exemplary method for safe mode fallback, according to aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

For purposes of the description hereinafter, it is to be understood that the specific articles, compositions, and/or processes described herein are exemplary and should not be considered as limiting. In the description, relative terms such as "lower," "upper," "horizontal," "vertical,", "above," "below," "up," "down," "top," "bottom," "underside," "front," "rear," and "side" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Portable lighting devices (including flashlights) and/or modes of operation of portable lighting devices may pose safety risks when used in certain situations. Portable lighting devices with high-lumen output, focused light output, and/or overheating components may damage, burn, or ignite surrounding materials or the user. These outcomes are more likely when the portable lighting devices are left unattended or set down during operation. Accordingly, there is a need to provide safety solutions for portable lighting devices and to provide for user safety.

According to aspects of the present disclosure, a portable lighting device is disclosed. The portable lighting device may be single or multi-mode. Various modes of operation of the portable lighting device may include modes designed to increase the safety of the portable lighting device.

In some examples, in certain operating modes (e.g., with a lumen output over a threshold) or configurations (e.g., configuration of lenses that focus the light output onto a small area) a user may be required to actively be present during the operation of the operating mode or configuration. Inductive/capacitive sensing may be used to detect the presence/touch of a user on the portable lighting device. While the user is touching/holding the portable lighting device, the device may operate in a high-power mode. When the user is not touching/holding the portable lighting device, the portable lighting device may power off or switch to a lower-power mode. In other examples, a user may hold down a button to continue operation in a high-power mode.

Other mechanisms to determine active user control of the device or provide an override input that may override the reduction in light output/return the device to the previous light output. For example, control/override input may include an override button activated when pressed/held down, e.g., by a user. Other control/override inputs may include: detecting movement of the portable lighting device (via, e.g., motion sensor(s)), detecting the user's proximity (via, e.g., proximity sensor(s)), detection of certain heat signatures (of a user's hand on the device via temperature sensor(s)), voice confirmation (e.g., receiving verbal assurances of control or commands to continue the device mode from a user; via microphones), gesture recognition (via, e.g., device motion), visual recognition (via e.g., camera(s)), or the presence of other devices (e.g., wearables via e.g., RFID or wireless signals). Certain techniques may be used to limit certain operating modes to a particular user or set of users (e.g., voice or visual recognition, fingerprint detection) and lock out or limit operation for others (e.g., minors, non-owners, etc.).

According to some aspects, the temperature of an area (e.g., an area illuminated by the portable lighting device) or object may be determined. Where the temperature is determined to be over a threshold temperature, the light output of the portable lighting device may be reduced, the light output turned off entirely, and/or other lights/modes of the portable lighting device may be activated.

For example, in certain operating modes (e.g., with a lumen output over a threshold) or configurations (e.g., configuration of lenses that focus the light output onto a small area) a temperature sensor (e.g., an infrared temperature sensor) may be activated to sense the temperature of an object. In some examples, the temperature sensor is configured to detect the temperature of objects illuminated by the portable lighting device. In flashlight embodiments, the temperature sensor may be located in the head portion of the flashlight near the lighting elements. During operation, a controller may be configured to receive temperature data from the temperature sensor. When the temperature is detected to be above a threshold temperature, the controller may reduce the light output of lighting elements of the portable lighting device. In some examples, power provided to the lighting elements may be reduced.

The light output may be reduced below a pre-set light output (e.g., 1000 lm). After waiting period (e.g., 1 second, 2 seconds, 5 seconds, etc.), another temperature reading may be taken by the temperature sensor and provided to the controller. Where the temperature reading is above (i.e., not below) the threshold temperature and/or where a reduction in the temperature is detected, the controller may further reduce the light output of the portable lighting device. In some examples, the light output may be reduced by a static amount (e.g., 250 lm). In other examples, the light output may be reduced by a percentage of the current output (e.g., a 50% reduction). This further reduction in light output may be repeated until the temperature reading is above (i.e., not below) the threshold temperature or the light output reduced to 0 L.

In some examples, the distance from the object is detected (by e.g., a distance sensor) and only if the distance is within a threshold distance (e.g., 3 feet/1 meter, 6 feet/2 meters, etc.) does the controller reduce the light output based on the temperature reading. The threshold distance may be static or may be based on the light output.

According to some aspects, the distance to an area (e.g., an area illuminated or pointed-at by the portable lighting device) or object may be determined. The portable lighting device may determine a threshold light output based on the distance. The threshold light output may be compared to the light output of the portable lighting device. The threshold light output may be static for all modes within a threshold distance or may vary based on the distance. Where the light output is greater than the determined threshold, the portable lighting device may reduce the light output, power off lighting elements or the portable lighting device entirely, and/or activate or switch into other lights/modes of the portable lighting device.

According to various aspects of the disclosure, reducing or increasing the light output is described. In some examples, the portable lighting device may modulate light output directly, whereas in other examples power provided to lighting elements of the portable lighting device may be modulated. In further examples, the portable lighting device may turn on or off (or provide power to/cease providing power to) one or more lighting elements of the portable lighting device.

According to various aspects of the disclosure, in certain operating modes (e.g., with a lumen output over a threshold) or configurations (e.g., configuration of lenses that focus the light output onto a small area) a distance sensor may be activated to determine the distance to a target. In other lighting modes (where the light output is below a certain threshold, e.g., 1000 lm) or configurations, the distance sensor may be deactivated. In some examples, the distance sensor is configured to detect the distance of objects illuminated by the portable lighting device. In flashlight embodiments, the distance sensor may be located in the head portion of the flashlight near the lighting elements. The distance sensor may detect objects in front of (e.g., relative to a front face of the head portion) of the flashlight. For example, the distance sensor may send signals directed away from the head portion of the flashlight and/or receive signals directed towards the front face of the head portion of the flashlight. During operation, a controller may be configured to operate the distance sensor and receive distance data from the distance sensor. The distance may be used to determine a threshold (or maximum) light output for the device at a given target distance. When the light output is above the threshold light output, the controller may reduce the light output of lighting elements of the portable lighting device. In some examples, power provided to the lighting elements may be reduced to reduce the light output.

The light output of the lighting elements may be reduced below a pre-set light output (e.g., 1000 lm) or below the determined threshold/maximum light output. After waiting period (e.g., 1 second, 2 seconds, 5 seconds, etc.), another distance reading may be taken by the distance sensor. The controller may receive the distance and determine an updated threshold/maximum light output. Where the light output is above the updated threshold light output, the controller may further reduce the light output of the portable lighting device. In some examples, the light output may be reduced to the threshold light output. In other examples, the light output may be reduced by a static amount (e.g., 250 lm). In other examples, the light output may be reduced by a percentage of the current output (e.g., a 50% reduction).

In some examples, the controller only determines a threshold light output where the distance detected by the distance sensor is within a threshold distance (e.g., 3 feet/1 meter, 18 inches/half a meter, 12 inches, 8 inches, 6 inches, etc.). At distances beyond the threshold distance, the light output may not pose a safety hazard as the heat may not accumulate to a significant degree to pose a safety risk. In some examples, different lighting modes/light outputs have different threshold distances and is based on the light output. For example, a boost mode with a light output of 10,000 lm may have a threshold distance greater than an extreme mode with a light output of 5,000 lm.

In some examples, the distance threshold and/or the threshold light output may be based on the temperature of the target. For example, a temperature sensor (e.g., an infrared temperature sensor) may be activated to sense the temperature of an object. In some examples, the temperature sensor is configured to detect the temperature of objects illuminated by the portable lighting device. In flashlight embodiments, the temperature sensor may be located in the head portion of the flashlight near the lighting elements. During operation, a controller may be configured to receive temperature data from the temperature sensor. Temperature data may be combined with distance data to determine the threshold light output (e.g., of a particular lighting mode/light output/lighting device configuration). When the temperature is detected to be above a threshold temperature, the controller may reduce the light output of lighting elements of the portable lighting device. In some examples, power provided to the lighting elements may be reduced.

According to various aspects of the disclosure, the temperature of the portable lighting device or components of the portable lighting device may be taken and where the temperature is over a threshold temperature, the light output of the portable lighting device may be reduced, the light output turned off entirely, and/or other lights/modes of the portable lighting device may be activated. For example, the high lumen output of the portable lighting device may generate an excess of heat which may pose a risk to users holding the portable lighting device or materials in contact with the portable lighting device. For example, the portable lighting device may determine a surface temperature (e.g., of the handle portion) of the portable lighting device via a temperature sensor. In various examples, an internal temperature of the portable lighting device may be determined and may be used to estimate the surface temperature. The surface temperature determination may be performed when the portable lighting device is operating in certain operating modes (e.g., with a lumen output over a threshold) or configurations. During operation, a controller may be configured to receive temperature data from the temperature sensor. When the temperature is detected to be above a threshold temperature, the controller may reduce the light output of lighting elements of the portable lighting device. In some examples, power provided to the lighting elements may be reduced.

1 Touch Sensors

Touch sensors, also known as touch-sensitive devices, operate using various technologies to detect physical contact or proximity. The main types of touch sensors include capacitive touch sensors, resistive touch sensors, inductive touch sensors, infrared (IR) touch sensors, surface acoustic wave (SAW) touch sensors, optical touch sensors, and proximity touch sensors.

Capacitive touch sensors operate based on the principle of capacitance, which is the ability of a system to store an electric charge. Capacitance is created when two conductive objects are separated by an insulating material (dielectric). When a voltage is applied across the conductors, an electric field is created, and charge is stored. The capacitance is determined by the size of the conductors, the distance between them, and the properties of the dielectric material.

Capacitive touch sensors may include a grid of electrodes made of conductive material, typically arranged in rows and columns, forming a touch-sensitive surface. When a signal (e.g., an alternating current (AC) signal) is applied to these electrodes, an electric field is created. When the skin of the finger/hand of a user comes near or touches the surface, a new capacitance is introduced which impacts the electrical field. The two main types of capacitive sensing are self-capacitance and mutual capacitance. For self-capacitance, the sensor measures the change in capacitance at a single electrode. When touched, the capacitance increases. For mutual capacitance, the sensor measures the change in capacitance between two electrodes. The touch distorts the electric field between the electrodes, changing the mutual capacitance. The signals generated by the sensor may be determined to be the touch of a user, multiple touches, the location of the touch(es).

Capacitive touch sensors may have high durability, as they may have no moving parts and may be covered with a hard, protective layer. This makes capacitive touch sensors more resistant to wear and tear compared to resistive touch sensors. However, capacitive touch sensors may require direct contact with the skin (or, e.g., a conductive glove or stylus), which may limit use in environments where users wear gloves.

Resistive touch sensors operate based on the principle of pressure-induced contact between (e.g., two) conductive layers separated by a gap. For example, a resistive touch sensor may include a flexible, transparent top layer and a rigid bottom layer, both coated with a conductive material such as indium tin oxide (ITO). These layers are separated by spacer dots or an insulating layer, which ensures that the layers do not touch when the portable lighting device is not being used. The top layer may include a flexible polyester film, while the bottom layer may include a rigid glass or acrylic substrate.

During use, when a user applies pressure to the surface of the resistive touch sensor, the top conductive layer is deformed and comes into contact with the bottom layer at the point of touch. This contact creates a voltage divider between the two layers. The sensor may be connected to a controller that applies a voltage across one of the layers, creating an electric field. When the layers touch, the voltage at the point of contact can be measured by the other layer, which acts as a probe. The voltage measured at this point corresponds to one coordinate (either X or Y) of the touch location. The particular location of the touch point may be determined by repeating the application of and measuring the voltage for the other axis. For example, if the initial measurement was for the X-axis, the controller then applies a voltage across the Y-axis, and the top layer measures the resulting voltage, giving the Y-coordinate.

To determine the exact touch point, the process may be repeated for the other axis. If the initial measurement was for the X-axis, the controller then applies a voltage across the Y-axis, and the top layer measures the resulting voltage, giving the Y-coordinate. This method of using a voltage divider to detect touch points allows for precise detection of the touch location. The analog voltage values are then converted to digital signals by an analog-to-digital converter (ADC), and the touch coordinates are processed by a microcontroller or processor to interpret the user's input.

Resistive touch sensors may be activated by any object, including fingers, styluses, or gloves, making them suitable for various environments, such as where users may wear gloves.

Inductive touch sensors operate based on the principle of electromagnetic induction, where changes in a magnetic field can induce electrical currents in nearby conductors. Inductive touch sensors may include a conductive coil, or a series of coils, embedded beneath a touch surface.

When an alternating current (AC) flows through these coils, during operation, the current generates an oscillating magnetic field. When a conductive object, such as a stylus, glove, or a finger equipped with a special ring, comes close to the sensor, the conductive object interacts with this magnetic field. The conductive object disrupts the magnetic field, inducing eddy currents within itself. These eddy currents create their own magnetic field, which opposes the original field created by the sensor's coils. The sensor may detect these disturbances by monitoring the changes in the impedance of the coils. The impedance changes because the presence of the conductive object alters the inductance of the coil system. The sensor can determine the position of the object by measuring these impedance changes. To process the signals, the changes in the magnetic field are converted into electrical signals that are interpreted by a controller. The controller calculates the location of the touch based on the pattern and magnitude of the impedance changes. In some examples, inductive touch systems may distinguish between different types of touches and objects, providing detailed information about the nature of the interaction.

Inductive touch sensors may be able to interact with a conductive object without physical contact. This non-contact nature means that the touch surface can be made of any non-conductive material, including thick glass or plastic which may increase durability of the sensor/portable lighting device.

2 Safe Operation Via User Control/Touch

Various embodiments of present disclosure use sensors to detect the touch/presence of a user in a portable lighting device. The touch/presence of the user may indicate user control of the portable lighting device; the absence of touch/presence of the user may indicate the user is not in control of the device. When the user is not in control of the device, the portable lighting device may determine the device is undertaking hazardous operation and fallback to a "safe mode" or "protective mode" of operation. FIG. 2 is a logical block diagram of one exemplary method 200 for safe mode fallback.

At step 202, a control module of the portable lighting device initializes itself for device operation. At step 204, the control module may start a mode of operation. In some examples, the mode of operation may be one of a plurality of different operating modes. Starting the mode of operation may include initializing the mode from a powered down or low-power state, changing mode from a different mode of operation, or resuming from a previous operation.

The user may select between different operational modes by e.g., clicking a button, turning a dial, and/or applying user gestures to navigate between modes. Still other techniques for mode selection are described within U.S. patent application Ser. No. 18/068,286, filed Dec. 19, 2022, and entitled "Adaptive Flashlight Control Module," the foregoing application being incorporated herein by reference in its entirety.

In some examples, a user may select between various device configurations. For example, a lens may be configured in multiple configurations/orientations. The controller may determine the position/orientation of the lens/reflectors in the portable lighting device. As a brief aside, changing the orientation of a lens in a flashlight affects the spread of light by altering the way light rays are focused or diverged. When the lens is oriented to focus light, the lens directs light rays to converge at a point, creating a narrow and concentrated beam. This focused beam may be ideal for illuminating objects at a distance, making the flashlight function like a spotlight. Typically, a convex lens, which is curved outward, is used to achieve this focused effect. By adjusting the position of this convex lens closer to the light source, the light can be focused more tightly, resulting in a beam that reaches farther with a higher intensity.

Conversely, when the lens is adjusted to spread or diverge the light, the lens causes the light rays to spread out over a wider area. This creates a broad, diffuse beam, which is useful for illuminating a larger space at close range. This wide beam is beneficial for activities like camping, reading, or working on projects where broad area illumination is needed. A concave lens, which is curved inward, or a convex lens positioned to disperse the light, may be used to achieve this effect. Moving the lens farther from the light source typically results in a wider beam spread, reducing the intensity but increasing the coverage area.

The portable lighting device may have an adjustable-focus lens that allow a user to switch between a focused beam and a wide flood. These lens mechanisms may include a sliding or rotating action. In a sliding mechanism, the lens may be moved closer to or farther from the light source. Sliding the lens closer focuses the light into a narrow beam, while sliding it farther spreads the light out. In a rotating mechanism, turning the flashlight head or bezel adjusts the lens position, tightening or widening the beam accordingly.

The shape and type of lens may also play a role in how the light is spread. A convex lens may focus light rays, while a concave lens may diverge them. Aspheric lenses, which are not perfectly spherical, may be used to reduce optical aberrations and provide better focus and clarity. Reflectors inside the portable lighting device may further shape the beam, with smooth reflectors producing a focused beam and textured reflectors creating a wider, diffused beam. By adjusting the lens and reflector orientation, portable lighting devices can provide optimized lighting for a variety of lighting needs, from spotlighting distant objects to flooding a wide area with light.

In some examples, during operation of certain operating modes, the control module may periodically/intermittently check (every second, every few seconds, etc.) to see whether the user is touching/in the presence of/in control of the portable lighting device. In other examples, the control mode may receive an interrupt from a sensor regarding a change in the touch/presence of the user prompting the controller to switch to the safe mode (at step 208). If the touch/presence of a user is detected (at step 206, "Yes" branch), the device may operate or continue to operate in the selected operating mode. In certain modes of operation and/or device configurations, if the touch/presence of a user is not detected (at step 206, "No" branch) the control module of the portable lighting device switches the portable lighting device into a fallback "safe mode" operation (at step 208). Operating modes/configurations that may trigger the safe mode when the user's touch or presence is not detected or is removed may be based on the lumen output of the mode (e.g., above 1000 lm) and/or a lens configuration (e.g. in a spotlight configuration).

Different operating modes and/or device configurations may have different fallback options. In some examples, the safe mode may reduce the light output to a safe level (while still providing some illumination). In other examples, the safe mode may power-off the light or the portable lighting device. In further examples, the device configuration may be altered (e.g., the lens may be moved changing the focus).

In some examples, touch sensors may be used to detect the presence/touch of a user on the portable lighting device. In other examples, a user may hold down a button to continue operation in a high-power mode. Other sensors may be used to determine user control/presence. In one example, device motion/acceleration may be detected via, e.g., motion sensor(s) to determine user control. This may include performance of one or more gestures. In other examples, the user's proximity (via, e.g., proximity sensor(s)) may be determined. A user within a certain threshold distance of the portable lighting device (e.g., within 2 feet, 5 feet, etc.) may be considered in control of the portable lighting device. In one example, a microwave-based motion sensor may be used to detect the presence of a user within the threshold distance. Use of a microwave-based motion sensor are described within U.S. patent application Ser. No. 18/765,295, filed Jul. 7, 2024, and entitled "Microwave Motion Detection System and Lighting Applications," the foregoing application being incorporated herein by reference in its entirety.

In other examples, user touch or presence may be detected based on heat (via temperature or thermal/IR sensors). A users (or the hands of a user) may have a specific heat signature that may be detected to indicate the touch/presence (or absence) of the user. In still further examples, a user's voice may indicate device control. A microphone may sense/record verbal assurances of control (e.g., "I still have control of the device!") or commands to continue the device mode (e.g., "Continue operating!") from a user in response to a prompt by the portable lighting device. In other examples, cameras on the portable lighting device may allow the controller to provide visual recognition of device control. In additional examples, the presence of a wearable (e.g., smart watch, smart ring), phone, or other user device may indicate user proximity or control. These other devices may be detected via RFID or wireless signals.

Additionally, control of certain operating modes may be limited to certain (e.g., pre-registered) users. Voice or visual recognition, fingerprint detection, wearable/other device detection may indicate the presence of or control by a particular user and lock out or limit operation for others (e.g., minors, non-owners, etc.).

In other examples, other hazardous conditions may be detected to prompt the control module to enter safe mode (at step 208). For example, where the temperature of the lighting device(s) or power source/battery is above a threshold (determined via, e.g., a temperature sensor), the control module may enter the safe mode (at step 208).

In safe mode, the control module may the control module may periodically/intermittently check (every second, every few seconds, etc.) to see whether the user is touching/in the presence of/in control of the portable lighting device (step 206). If the user touch, presence, or control is detected (and in some examples present for a certain period of time), the portable lighting device may return to the previous operating mode (at step 204). In other examples, the control module may resume operation in a user-defined mode; for example, instead of returning to a maximum output mode, a flashlight may return to a mode selected by the user's gesture, or a pre-defined "restart" mode.

In some variants, the control module may notify the user of a hazard. For example, a rear-facing LED may blink to indicate safe mode. Other common notification methods may include audible notifications via a speaker, haptic notifications via a vibrator, etc.

Figure 3:
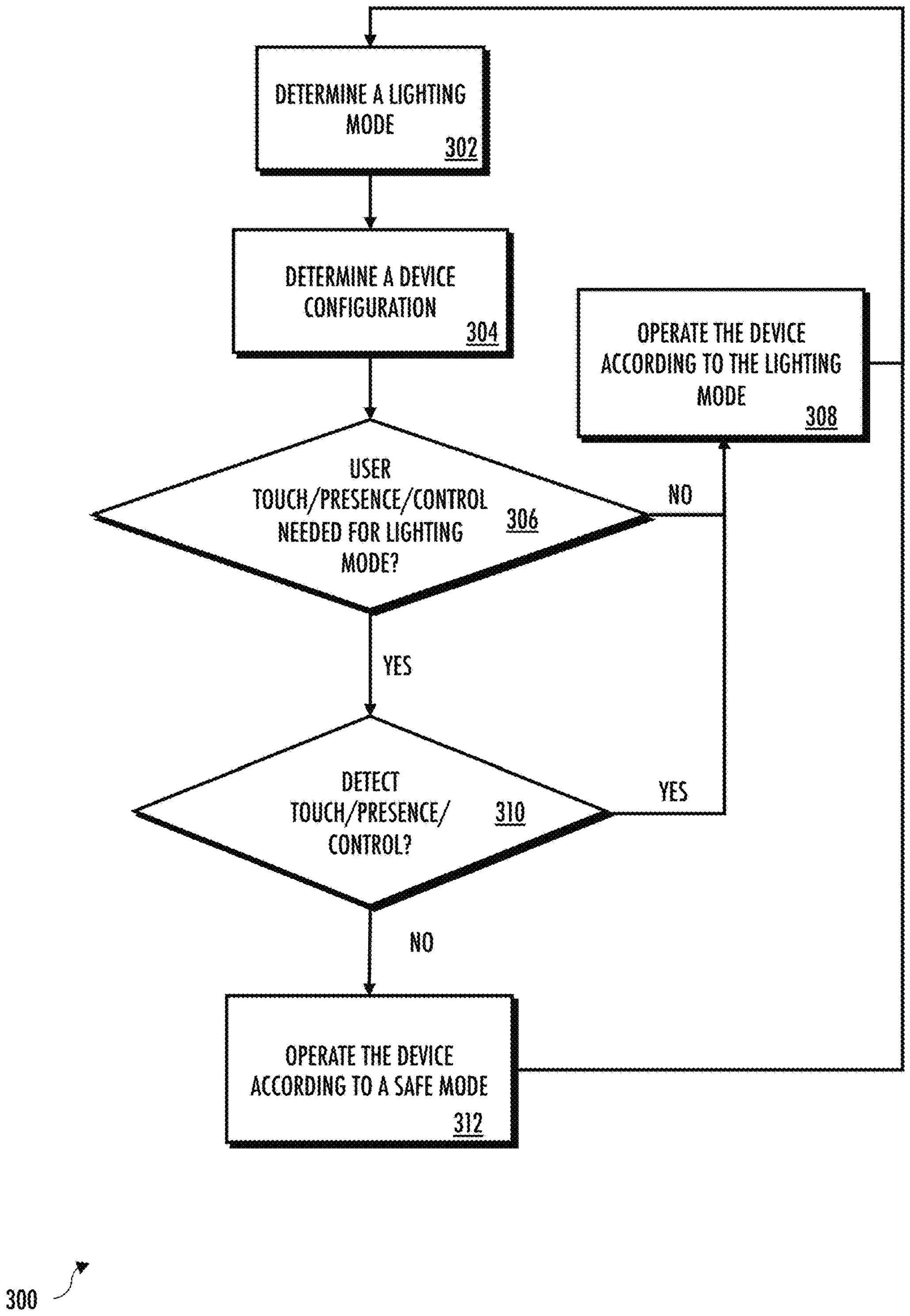
FIG. 3 is a logical flow diagram of a method for operational mode selection, according to aspects of the present disclosure.

FIG. 3 is a logical flow diagram of a method 300 for operational mode selection. The exemplary lighting system may determine which lights to power, how much power to provide the lights/LEDs, and other usage settings, and for how long. The exemplary lighting system may determine a lighting mode (at step 302). The lighting mode may be determined based on user input. For example, lighting modes may be determined based on determination of a gesture, a button press, turning of a dial, etc. or a combination of inputs.

The exemplary lighting system may determine a configuration of the device (at step 304). In some examples, the lens position may be determined. In some examples, a spotlight/narrow beam or a wide beam configuration is determined.

The exemplary lighting system may determine whether the lighting mode or configuration (or a combination) require user touch/presence/control (at step 306). If user touch/presence/control is not needed ("no" branch), the exemplary lighting system may operate the device according to the determined lighting mode/configuration (at step 308). If user touch/presence/control is needed ("yes" branch), the exemplary lighting system may attempt to detect the user touch/presence/control via the user interface subsystem (at step 310).

If user touch/presence/control is detected ("yes" branch), the exemplary lighting system may operate the device according to the determined lighting mode/configuration (at step 308). If user touch/presence/control is not detected ("no" branch), the exemplary lighting system may operate the device according to a safe mode or power off the exemplary lighting system (at step 312).

Periodically, the exemplary lighting system may redetermine the lighting mode (at step 302) whether in safe mode or in another lighting mode.

3 Touch-Based User and Sensor Interface

Figure 4:
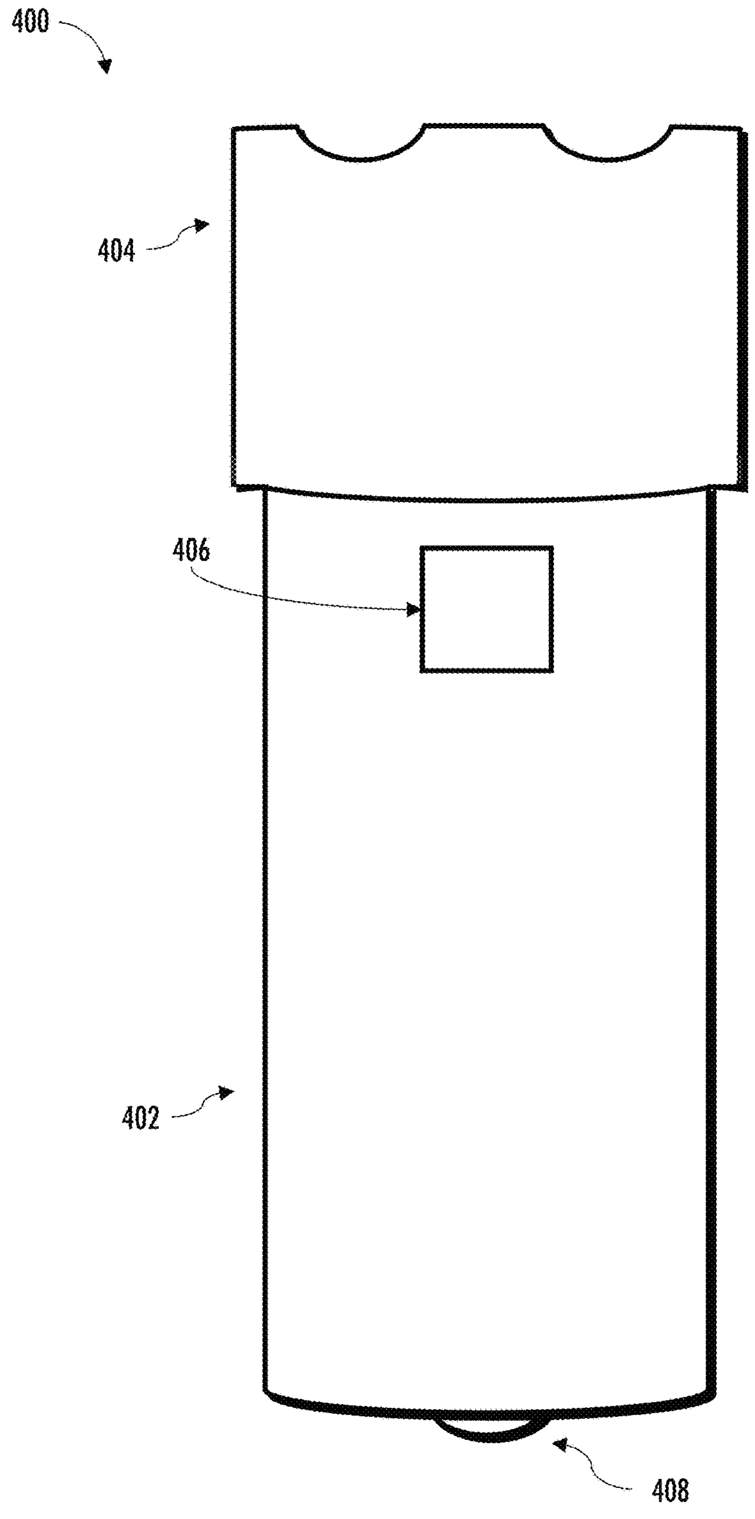
FIG. 4 illustrates a portable lighting device according to aspects of the present disclosure.

The lumen outputs of the various modes may be set/programmed by a user of the portable lighting device. This may allow a user to customize their portable lighting device to their needs. FIG. 4 illustrates a portable lighting device 400 according to aspects of the present disclosure. While the following discussion is presented with reference to an exemplary flashlight, artisans of ordinary skill in the related arts will readily appreciate that the following techniques may be broadly extended to e.g., flashlights, headlamps, lanterns, work lights, and/or any other lighting device having a plurality of operational modes. As illustrated, the portable lighting device 400 is a flashlight with a barrel 402 and a head component 404.

The barrel 402 is configured to be grasped by a user and may include ridges, knurling, or other texture along the outer periphery for improved handling during operation. The barrel 402 may also include flat/un-textured/un-ridged portions (e.g., a thumb/finger rest area) for a user to comfortable place their thumb when handheld. The barrel 402 of the portable lighting device 400 may house a power source (e.g., a battery) and may include connections to couple charging devices (e.g., a charging port).

The head component 404 may include one or more light-emitting assemblies including a lens, a reflector, and a light emitting diode (LED). The light-emitting assemblies may be used together, or individually, in a variety of different operating modes. The head component 404 may include a bezelled rim around the circumference.

A touch sensor 406 may be located on the barrel 402. The touch sensor 406 is configured to determine a user touch/presence/control with respect to the portable lighting device 400. A button 408 may be located on the barrel 402. The button 408 (e.g., when held down) may be used to determine user touch/presence/control with respect to the portable lighting device 400. The button 408 may also be used to toggle between lighting modes (or powered operation of the portable lighting device 400). Input indicating the user touch/presence/control may be used to determine the lighting mode or whether to continue in (or return to) a particular lighting mode.

4 Temperature Sensors

Various types of temperature sensors may be used to detect the temperature of objects. Some temperature sensors may detect the temperature of objects in contact with the sensor while others are able to detect the temperature of objects remote from (e.g., not in contact with) the temperature sensor.

Semiconductor sensors, such as diodes or integrated temperature sensors, may measure temperature by exploiting the predictable change in voltage or current in semiconductor junctions with temperature. In some examples, a voltage may be detected across a diode to determine a resistance. Since the resistance of the diode varies proportionally to a change in temperature, temperature may be determined based on, e.g., by converting, the voltage reading. These sensors may interface may use an analog-to-digital converter (ADC) to feed the signal into a microcontroller.

In other examples, dissimilar materials (e.g., two metals) that have different expansion/contraction properties, are used to determine a temperature/a change in temperature. For example, in a vibrating wire temperature meter, a stretched magnetic wire with two ends fixed to the dissimilar metals can detect changes in temperature based on a change in the vibrations of the wire. This may be due to a change in tensile strength of the wire because of the expansion/contraction of the metals. In another example, a thermocouple may sense temperature changes by detecting a voltage where dissimilar metals are joined at the point of connection to form a junction. When exposed to temperature, the junction may generate a voltage proportional to the temperature difference between the "hot" and "cold" ends. A thermocouple interface circuit may have an amplifier to boost the voltage and an ADC to feed the signal into a microcontroller for processing. Cold-junction compensation, via a secondary sensor, may be used to correct measurement errors.

In further examples, resistance changes in a material may vary based on temperature. For example, thermistors may provide temperature sensitivity through materials whose resistance changes significantly with temperature. Negative Temperature Coefficient (NTC) thermistors decrease resistance with an increase in temperature, while Positive Temperature Coefficient (PTC) thermistors increase resistance with an increase in temperature. Resistance Temperature Detectors (RTDs) may measure temperature by monitoring changes in resistance of a material (e.g., platinum) when provided a stable current.

Figure 5:
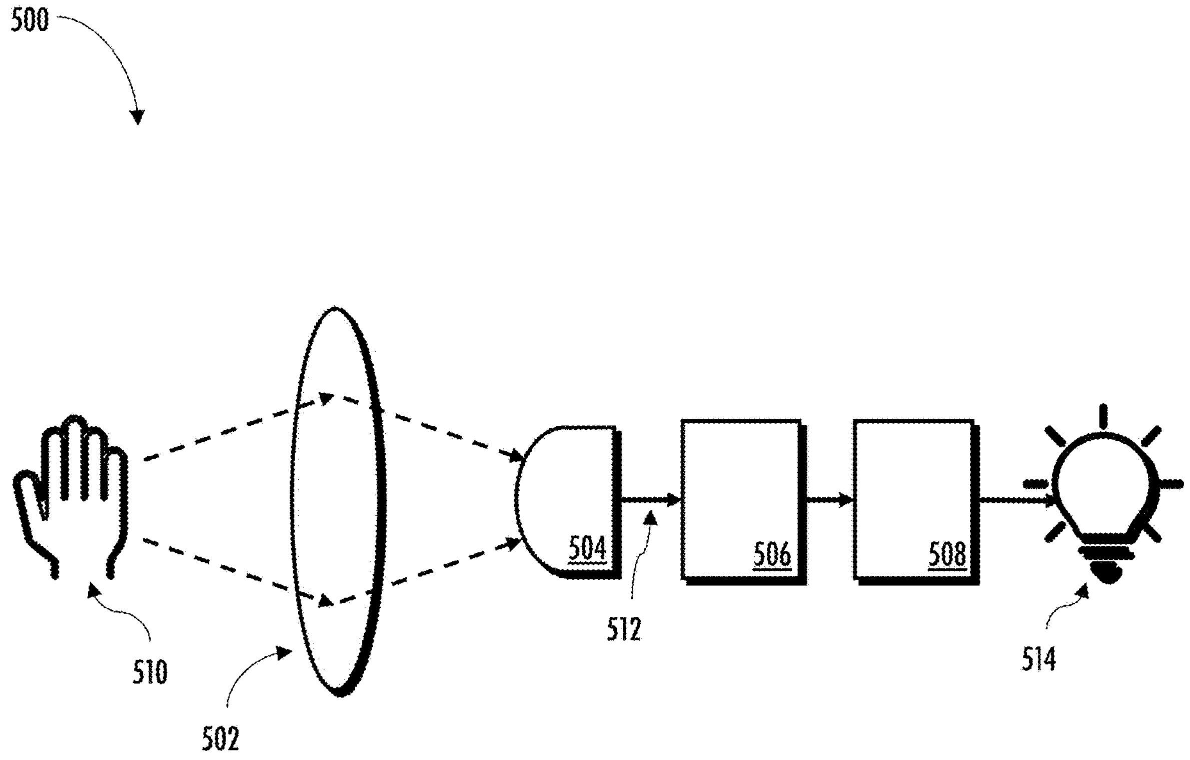
FIG. 5 illustrates an exemplary infrared thermometer system, according to aspects of the present disclosure.

Infrared (IR) thermometers are a type of non-contact temperature sensor. IR thermometers measure the infrared radiation emitted by an object. Every object emits infrared radiation as a function of its temperature, and IR thermometers detect this radiation to determine the temperature. FIG. 5 illustrates an exemplary IR thermometer system 500.

The IR thermometer system 500 includes an optical system (e.g., lens 502), a detector 504, a signal processor 506, and a controller 508. The optical system may include a lens 502 configured to focus infrared radiation from the target 510 (e.g., a person, animal, or object) onto the detector 504. Different lens materials may be used depending on the wavelength range of the IR radiation. Filters may be used to allow only specific wavelengths of IR radiation to reach the detector 504 which may improve accuracy of the IR thermometer system 500. In some examples, lens 502 includes a converging/convex lens configured to focus infrared radiation from a broad area onto the detector 504. However, other lens types (e.g., concave lenses) may be used.

Detector 504 may convert the infrared radiation collected in the optical system into an electrical signal 512. In some examples, detector 504 may include a thermopile or pyroelectric detector. The detector 504 may send the electrical signal 512 to a signal processor 506. The signal processor 506 may include an amplifier configured to boost the electrical signal 512 to a level that may be processed by the controller 508. The signal processor 506 may also include an analog-to-digital converter (ADC), to convert the analog signal generated by the detector 504 into a digital format usable by the controller 508.

The controller 508 may interpret the electrical signal 512 and calculate the temperature. The controller 508 may calculate the temperature based on factors including emissivity of target materials (e.g., skin, paper, fabric), ambient temperature, etc. The calculated temperature may be used in various applications including controlling the light output of a lighting element 514 or for display.

5 Safe Operation Via Temperature Detection

Various embodiments of present disclosure detect the temperature of an object or area illuminated by a portable lighting device. The temperature of the object/area may be used to control (e.g., limit) the light output of certain modes/configurations of the portable lighting device. Above a threshold temperature (e.g., 120° F., 140° F., etc.), the portable lighting device may limit light output to a certain output (e.g., 1000 lm) or enter a different "safe mode." Light output may be limited further (e.g., in 250 lm increments) periodically (e.g., every second, 2 seconds, 5 seconds, etc.) until the detected temperature is below the threshold temperature or the lighting elements are powered off.

Figure 6:
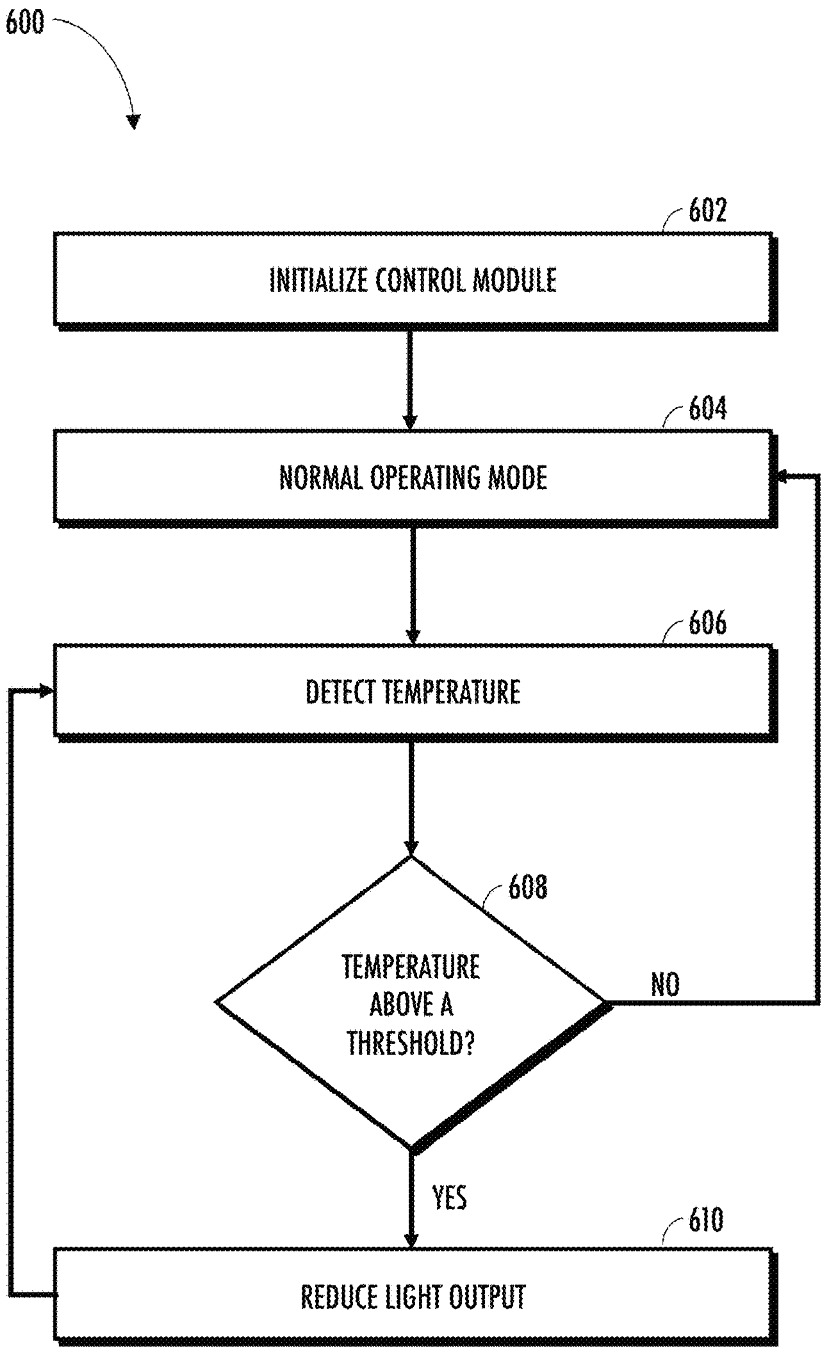
FIG. 6 is a logical block diagram of one exemplary method for controlling light output based on a target temperature, according to aspects of the present disclosure.

FIG. 6 is a logical block diagram of one exemplary method 600 for controlling light output based on a target temperature. At step 602, a control module of the portable lighting device initializes itself for device operation. At step 604, the control module may start a mode of operation. In some examples, the mode of operation may be one of a plurality of different operating modes. Starting the mode of operation may include initializing the mode from a powered down or low-power state, changing mode from a different mode of operation, or resuming from a previous operation.

The user may select between different operational modes by e.g., clicking a button, turning a dial, and/or applying user gestures to navigate between modes. Further techniques for mode selection may be used, as previously described.

In some examples, a user may select between various device configurations. For example, a lens may be configured in multiple configurations/orientations. The controller may determine the position/orientation of the lens/reflectors in the portable lighting device. As a brief aside, changing the orientation of a lens in a flashlight affects the spread of light by altering the way light rays are focused or diverged. When the lens is oriented to focus light, the lens directs light rays to converge at a point, creating a narrow and concentrated beam. This focused beam may be ideal for illuminating objects at a distance, making the flashlight function like a spotlight. Typically, a convex lens, which is curved outward, is used to achieve this focused effect. By adjusting the position of this convex lens closer to the light source, the light can be focused more tightly, resulting in a beam that reaches farther with a higher intensity.

Conversely, when the lens is adjusted to spread or diverge the light, the lens causes the light rays to spread out over a wider area. This creates a broad, diffuse beam, which may be useful for illuminating a larger space at close range. This wide beam may be beneficial for activities like camping, reading, or working on activities where broad-area illumination is needed. A concave lens, which is curved inward, or a convex lens positioned to disperse the light, may be used to achieve this effect. Moving the lens farther from the light source typically results in a wider beam spread, reducing the intensity but increasing the coverage area.

The portable lighting device may have an adjustable-focus lens that allow a user to switch the configuration of the portable lighting device between a focused beam and a wide-flood beam. These lens mechanisms may include a sliding or rotating action. In a sliding mechanism, the lens may be moved closer to or farther from the light source. Sliding the lens closer focuses the light into a narrow beam, while sliding it farther spreads the light out. In a rotating mechanism, turning the flashlight head or bezel adjusts the lens position, tightening or widening the beam accordingly.

The shape and type of lens may also play a role in how the light is spread. A convex lens may focus light rays, while a concave lens may diverge them. Aspheric lenses, which are not perfectly spherical, may be used to reduce optical aberrations and provide better focus and clarity. Reflectors inside the portable lighting device may further shape the beam, with smooth reflectors producing a focused beam and textured reflectors creating a wider, diffused beam. By adjusting the lens and reflector orientation, portable lighting devices may provide optimized lighting for a variety of lighting needs, from spotlighting distant objects to flooding a wide area with light.

In some examples, during operation of the portable lighting device (e.g., in certain operating modes), the control module may determine a temperature of a target object or area (at step 606). The target object or area may be in the area of illumination of a lighting element of the portable lighting device. The control module may determine temperature via a temperature sensor (an external temperature sensor), e.g., an IR thermometer, etc. In other examples, the control module may receive an interrupt from a temperature sensor regarding a change in the temperature or a temperature above a threshold.

Where the detected temperature is not above a threshold temperature (at step 608, "No" branch), the control module may continue operation of the portable lighting device (in the present operating mode). Where the detected temperature is above a threshold temperature (at step 608, "Yes" branch), the control module may reduce the light output of the portable lighting device (at step 610). The light output may be reduced to a pre-set value (e.g., 1000 lm), by a set amount (e.g., 250 lm), or may be based on the current light output (e.g., 50% of the current light output). In some examples, the control module will change operating modes (e.g., to a "safe mode"), power down the lighting elements, or power down the portable lighting device.

Periodically, the control module may re-detect the temperature of a target (at step 606). Where the detected temperature is no longer above a threshold temperature (at step 608, "No" branch), the control module may return operation to the previous/normal/selected mode of operation and increasing the light output of the portable lighting device. Where the detected temperature remains above a threshold temperature (at step 608, "Yes" branch), the control module may further reduce the light output of the portable lighting device (at step 610). The light output may be reduced by a set amount (e.g., 250 lm), or may be based on the current light output (e.g., 50% of the current light output). In some examples, the control module will change operating modes (e.g., to a "safe mode"), power down the lighting elements, or power down the portable lighting device.

In some examples, different operating modes and/or device configurations have different safe modes/lumen reductions. In some examples, the safe mode may reduce the light output to a safe level (while still providing some illumination). In other examples, the safe mode may power-off the light or the portable lighting device. In further examples, the device configuration may be altered (e.g., the lens may be moved changing the focus).

Figure 7:
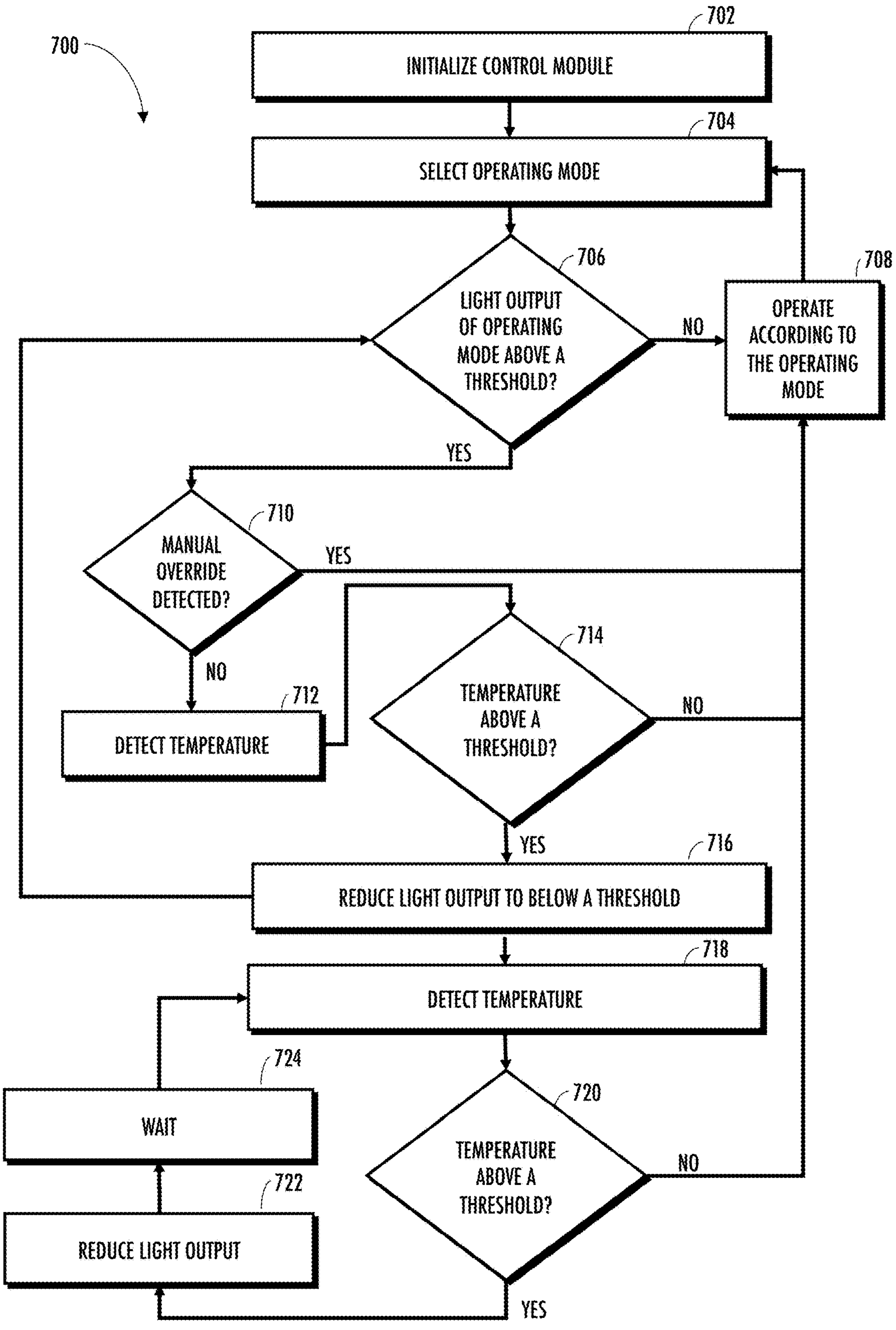
FIG. 7 is a logical block diagram of one exemplary method for controlling light output based on a target temperature, according to aspects of the present disclosure.

FIG. 7 is a logical block diagram of one exemplary method 700 for controlling light output based on a target temperature. At step 702, a control module of the portable lighting device initializes itself for device operation. At step 704, the control module may start a mode of operation. In some examples, the mode of operation may be one of a plurality of different operating modes. Starting the mode of operation may include initializing the mode from a powered down or low-power state, changing mode from a different mode of operation, or resuming from a previous operation.

The control module of the portable lighting device may determine whether the light output of the selected mode is above a threshold (e.g., above 1000 lm). If the portable lighting device is in a light output mode below the threshold (e.g., a safe mode, an operating mode at or below 1000 lm) (at step 706, "No" branch), the portable lighting device may operate according to the selected lighting mode (at step 708). The portable lighting device may operate in the selected operating mode until there is a change (e.g., user input, sensor input, etc.).

Where the portable lighting device is in a light output mode below the threshold (e.g., above 1000 L, a high-output mode, etc.) (at step 706, "Yes" branch), the portable lighting device may determine whether a manual override is detected. The manual override may include holding down a button on the portable lighting device or other input indicating the user wishes to continue operating at the present light output regardless of a target temperature. Where a manual override is detected/activated (at step 710, "Yes" branch), the portable lighting device may operate according to the selected lighting mode (at step 708). Where a manual override is not detected/activated (at step 710, "No" branch), the portable lighting device may detect a temperature of a target (at step 712). The target may include an object or area illuminated by the portable lighting device.

Where the temperature detected is not above a threshold temperature (at step 714, "No" branch), the portable lighting device may operate according to the selected lighting mode (at step 708). Where the temperature detected is greater than the threshold temperature (at step 714, "Yes" branch), the portable lighting device may reduce the light output of the portable lighting device to below a light threshold (e.g., 1000 lm) (at step 716).

The portable lighting device may (re-)detect the temperature of the target (at step 718). Where the temperature detected is not above a threshold temperature (at step 720, "No" branch), the portable lighting device may operate according to the selected lighting mode (at step 708). Where the temperature detected is above the threshold temperature (at step 720, "Yes" branch), the portable lighting device may further reduce the light output of the portable lighting device (at step 722). The further reduction may be a fixed amount (e.g., 250 lm), variable based on the current light output (e.g., a 50% reduction), or powering off lighting elements/the portable lighting device. The portable lighting device may wait a period of time (at step 724) before detecting the temperature of the target again (at step 718).

6 Temperature-Based User and Sensor Interface

Figure 8:
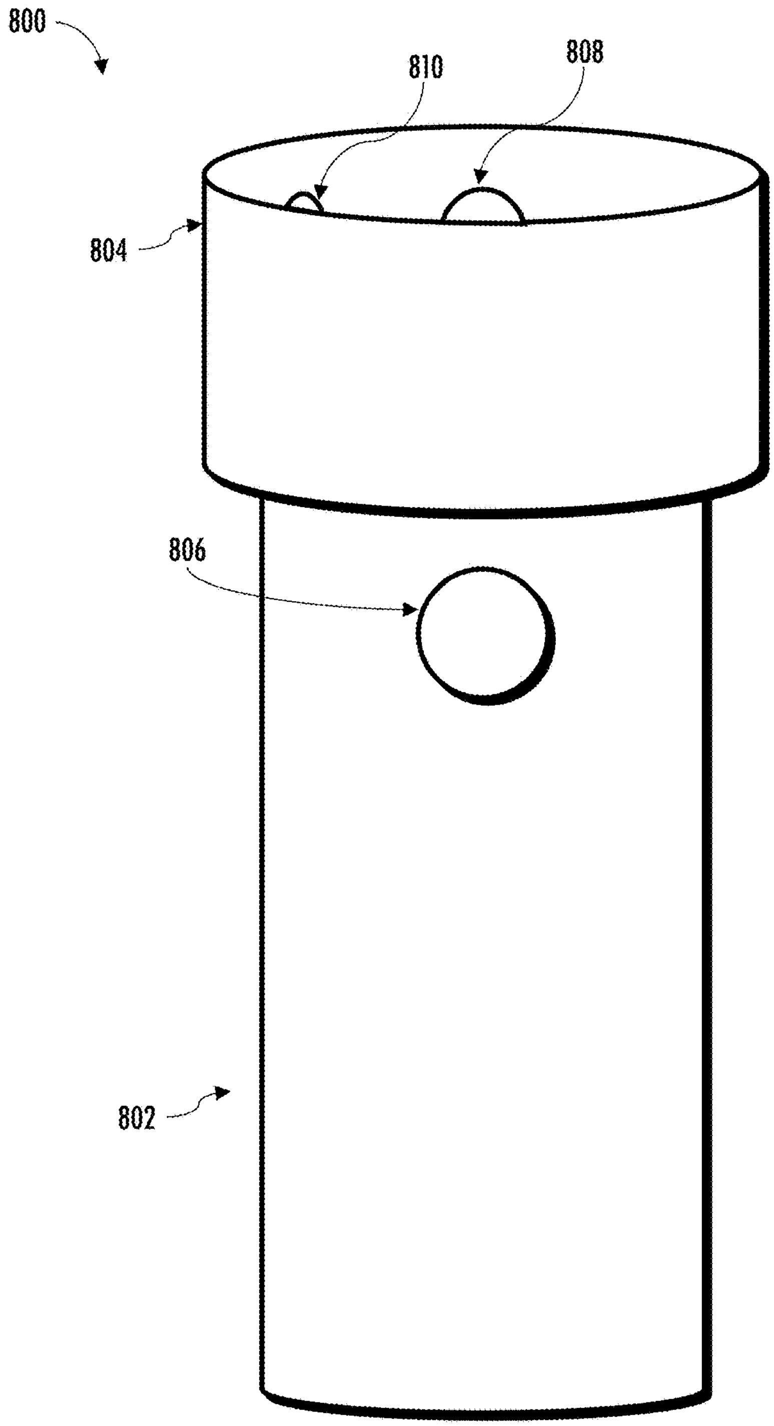
FIG. 8 illustrates a portable lighting device according to aspects of the present disclosure.

The lumen outputs of the various modes may be adjusted based on a detected temperature. FIG. 8 illustrates a portable lighting device 800 according to aspects of the present disclosure. While the following discussion is presented with reference to an exemplary flashlight, artisans of ordinary skill in the related arts will readily appreciate that the following techniques may be broadly extended to e.g., flashlights, headlamps, lanterns, work lights, and/or any other lighting device having a plurality of operational modes. As illustrated, the portable lighting device 800 is a flashlight with a barrel 802 and a head component 804.

The barrel 802 is configured to be grasped by a user and may include ridges, knurling, or other texture along the outer periphery for improved handling during operation. The barrel 802 may include a button 806 to control the portable lighting device 800. The barrel 802 of the portable lighting device 800 may house a controller configured to operate the portable lighting device 800 and a power source (e.g., a battery) and may include connections to couple charging devices (e.g., a charging port).

The head component 804 may include one or more light-emitting assemblies 808 and a temperature sensor 810. Light-emitting assemblies 808 may include a lens, a reflector, and a light emitting diode (LED). The light-emitting assemblies 808 may be used together, or individually, in a variety of different operating modes. The temperature sensor 810 may include an infrared (IR) thermometer or other non-contact temperature sensor 810. In some examples, the head component 804 may include a bezelled rim around the circumference. In some examples, the head component 804 includes a distance sensor configured to detect the distance of a target or area illuminated by the light-emitting assemblies 808. The distance sensor may be co-located with the temperature sensor 810. Where the distance detected is greater than a distance threshold, the portable lighting device 800 may override light output reductions or operate according to a selected/normal operating mode without taking temperature readings. The distance threshold may be a fixed threshold (e.g., 3 inches, 6 inches, 1 foot, 3 feet, etc.), or a threshold based on the current operating mode/light output. For example, the distance threshold may be greater where the light output (of the operating mode) is greater and smaller where the light output (of the operating mode) is smaller.

The button 806 (e.g., when held down) may be used to override the light output reductions/mode changes associated with temperature sensing by the portable lighting device 800. The button 806 may also be used to toggle between lighting modes (or powered operation of the portable lighting device 800).

7 Distance Sensors

Distance sensors may be used to detect the distance to an object/target. A distance sensor may be in signal communication with a controller in the portable lighting device to determine the distance and operate the portable lighting device based on the distance. The distance sensor may output a signal at (or in the direction of) a target object and may sense/detect how the reflected signal changes upon return. In some examples, signal changes may be measured based on the time for the reflected signal to return (time-of-flight), intensity of the reflected signal, and/or a phase change of the reflected signal. The type of distance sensor select may be based on factors including detection range, precision, environmental conditions (e.g., in fog, rain, or dust), and cost.

Time-of-flight (TOF) sensors are a category of distance sensors that emit a short burst of light (e.g., from a laser or LED) and measure the time the emitted light takes to reflect off an object and return to the sensor. This round-trip time may be used to calculate the distance.

Laser distance sensors may project a focused laser beam onto a target. The laser distance sensor may measure the time it takes for the laser to travel to the target and back (via e.g., a time-of-flight), the reflected angle which correlates to the distance (e.g., triangulation), and/or the phase-shift of the reflected light wave. This precise timing may allow the laser distance sensor to calculate the distance to the target with high accuracy. The laser pulse emitted may include near-infrared (NIR) pulses (having a wavelength in the range of 780-1550 nm), red pulses (having a wavelength in the range of 630-670 nm), blue/green pulses (having a wavelength in the range of 450 and 540 nm), mid-infrared (MIR) pulses (having a wavelength in the range of 3-5 μm), far infrared (FIR) pulses (having a wavelength greater than 15 μm), and/or ultraviolet (UV) pulses (having a wavelength below 400 nm).

Figure 9:
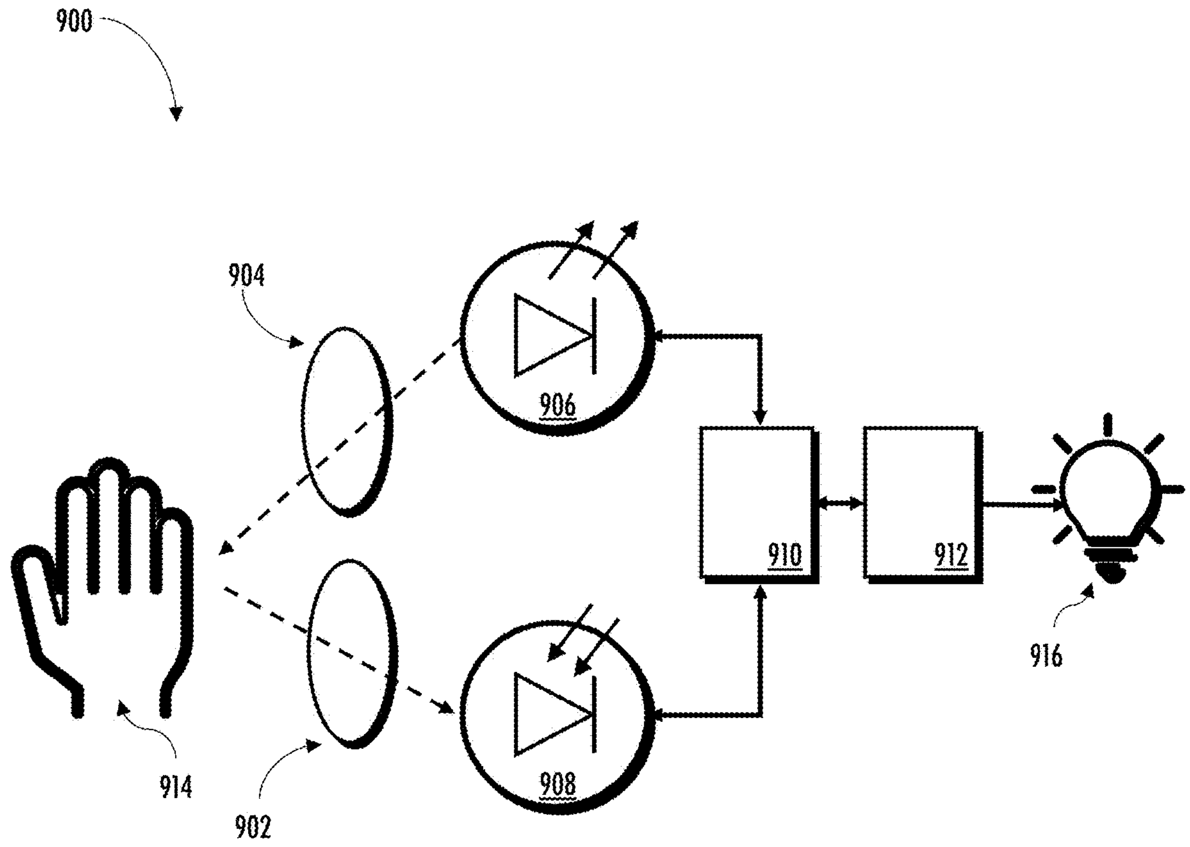
FIG. 9 illustrates an exemplary laser distance sensor system, according to aspects of the present disclosure.

FIG. 9 illustrates an exemplary laser distance sensor system 900. The laser distance sensor system 900 includes an optical system (e.g., lens 902, lens/filters 904), an emitter (e.g., laser diode 906), a receiver (e.g., photodetector 908), timing circuitry 910, and a controller 912. The optical system may include a lens 902 with beam-shaping optics configured to focus and/or direct a laser beam emitted by the laser diode 906. The laser diode 906 and the optical system may be configured to focus the laser light emitted by the laser diode 906 onto a target 914 (e.g., a person, animal, or object). The laser diode 906 may include a class 1 or class 1M laser to emit the laser pulse for their safety and low power consumption, however, higher power lasers (e.g., classes 2, 2M, 3R, 3B, and 4 may be used consistent with the present disclosure).

The laser diode 906 may emit a laser pulse toward the target 914. At the moment of emission, the timing circuitry 910 may start a high-speed clock (via e.g., an oscillator). The high-speed clock may have nanosecond or picosecond resolution for accurate measurement. The laser pulse travels to the target 914 and reflects back to the photodetector 908. The time taken depends on the distance of the laser distance sensor system 900 to the target 914. Lens/filters 904 may focus and/or filter the reflected laser light onto the photodetector 908. In some examples, the lens/filters 904 includes a converging/convex lens (or other lenses, e.g., concave lenses) configured to focus the reflected laser light from a broad area onto the photodetector 908.

The lens/filters 904 may remove noise/interference from ambient light from the reflected laser light. The lens/filters 904 may isolate light detected by the photodetector 908 to the emitted frequency of the laser pulse via high-pass/low-pass/band-pass filters. The photodetector 908 may capture the reflected laser light. The photodetector 908 may signal to the timing circuitry 910 receipt of the reflected laser light. In response to the capture of the reflected laser light by the photodetector 908, the timing circuitry 910 may stop the high-speed clock and may determine/record the total time-of-flight.

The controller 912 may receive the total time-of-flight data from the timing circuitry 910. The controller 912 may calculate the distance to the target based on the total time-of-flight. For example, the distance may be calculated as (or based on the formula of) half the total time of flight (T) multiplied by the speed of light (c) (e.g., $cT/2$). The calculated distance may be used in various applications including controlling the light output of a lighting element 916 or for display.

Other distance sensors may be substituted with equal success. For example, an ultrasonic distance sensor may be used to emit ultrasonic waves and measure the time to detect the echo of the ultrasonic waves. The ultrasonic sensor may emit high-frequency sound (ultrasound) waves from a transmitter. These waves travel through the air and reflect off an object. A receiver on the sensor then detects the echo, and the time taken for the echo to return is measured. Using the speed of sound in air, the distance to the object may be calculated by a controller.

In one example, an ultrasonic sensor may perform measurements between moving or stationary objects. The ultrasonic sensor may interface to a microcontroller for quick integration. A single I/O pin is used to trigger an ultrasonic burst (well above human hearing) and then "listen" for the echo return pulse. The sensor measures the time required for the echo return and returns this value to the microcontroller as a variable-width pulse via the same I/O pin.

Infrared (IR) sensors may emit infrared light from an LED or laser towards a target. The infrared sensor may measure the intensity and/or angle of the reflected light. Infrared sensors may operate also operate as proximity sensors (detecting if something is nearby) as well as operating as distance sensors (calculating the actual distance to the target). Active IR sensors may use an external light source (e.g., emitted by the IR sensor), while passive IR sensors may detect heat emitted naturally by objects.

Camera-based systems may be used to detect distance based on images captured by one or more cameras. For example, stereo vision systems may use two cameras to mimic human binocular vision, calculating depth by comparing the images captured from slightly different angles. Monocular systems may use a single camera combined with algorithms (e.g., perspective or AI-based depth estimation) to infer distance.

Other sensors may be used to determine a distance. For example, a capacitive sensor may detect a target by measuring changes in capacitance caused by the proximity of the target. Inductive sensors may generate a magnetic field using an oscillating current in a coil. When an object (e.g., a metallic object) enters the field, the object may induce eddy currents in the object, which alter the sensor's magnetic field. This change in the magnetic field may be detected and used to determine the presence and distance of the object.

8 Safe Operation Based on Distance

Various embodiments of present disclosure detect the distance of an object or area illuminated by (or within the illumination range of) a portable lighting device. The distance of the object/area may be used to control (e.g., limit) the light output of certain modes/configurations of the portable lighting device. Within a threshold distance (e.g., 3 feet/1 meter, 18 inches/half a meter, 12 inches, 8 inches, 6 inches, etc.), the portable lighting device may limit light output to a certain output (e.g., 1000 lm), set of outputs based on the distance, enter a different/"safe" mode of operation, or power-off lighting elements entirely.

Distance determinations may be taken periodically (e.g., every second, 2 seconds, 5 seconds, etc.). An updated light output threshold based on the distance may be determined/calculated. In some examples, an updated light output threshold is determined when the distance is within the distance threshold. Light output may be modified based on the updated light output threshold. For example, an updated light output threshold may be lower, which may prompt the portable lighting device to limit light output, enter a different/"safe" mode of operation, or power-off lighting elements. Where the updated light output threshold is greater, the portable lighting device may remain in the present mode/maintain the current light output, return to a previous/user selected light output, output light at the new (greater light output threshold), or power-on lighting elements.

Figure 10:
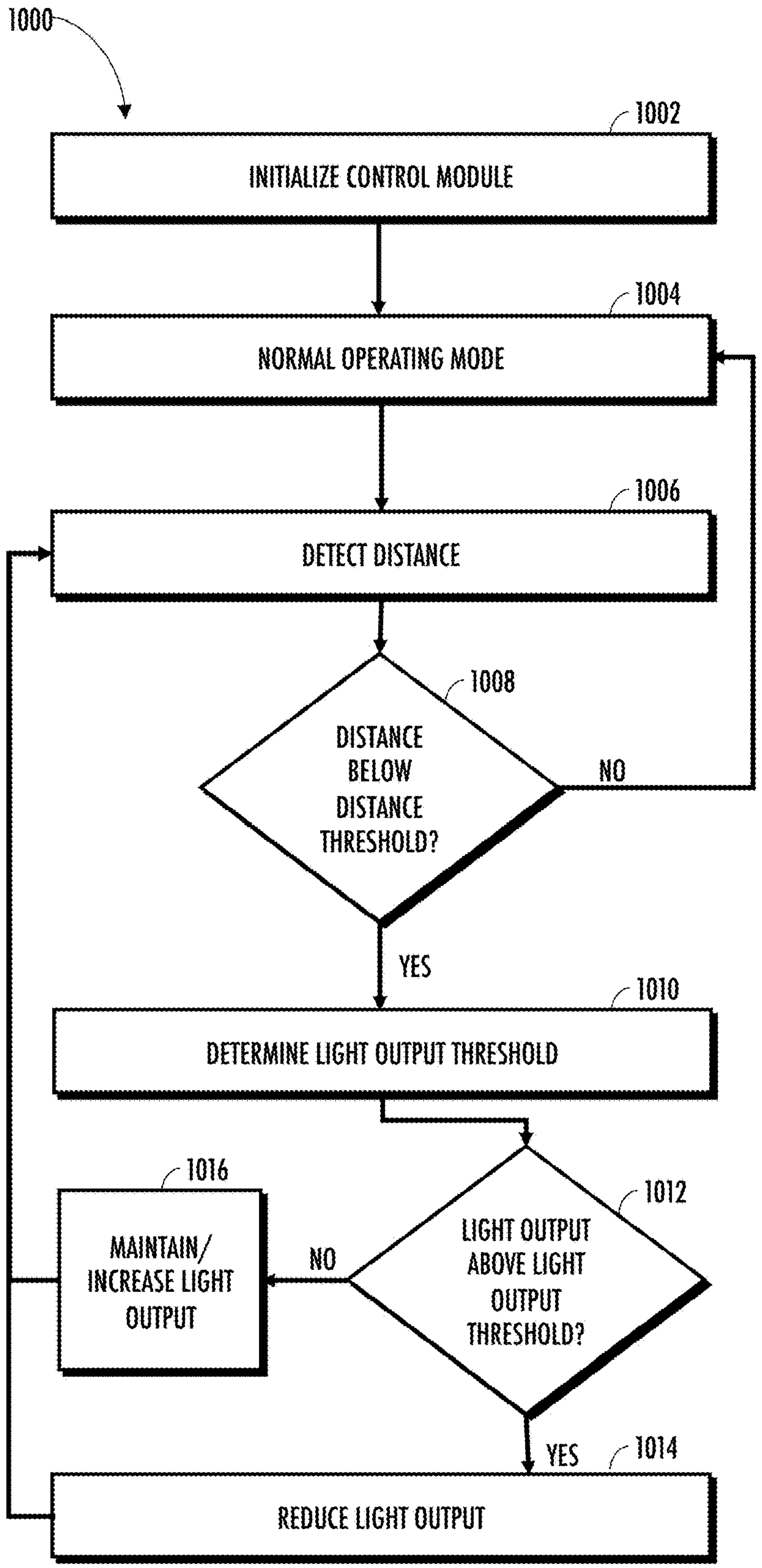
FIG. 10 is a logical block diagram of one exemplary method for controlling light output based on a target distance, according to aspects of the present disclosure.

FIG. 10 is a logical block diagram of one exemplary method 1000 for controlling light output based on a target distance. At step 1002, a control module of the portable lighting device initializes itself for device operation. At step 1004, the control module may start a mode of operation. In some examples, the mode of operation may be one of a plurality of different operating modes. Starting the mode of operation may include initializing the mode from a powered down or low-power state, changing mode from a different mode of operation, or resuming from a previous operation.

The user may select between different operational modes by e.g., clicking a button, turning a dial, and/or applying user gestures to navigate between modes. Further techniques for mode selection may be used, as previously described.

In some examples, a user may select between various device configurations. For example, a lens may be configured in multiple configurations/orientations. The controller may determine the position/orientation of the lens/reflectors in the portable lighting device. As a brief aside, changing the orientation of a lens in a flashlight affects the spread of light by altering the way light rays are focused or diverged. When the lens is oriented to focus light, the lens directs light rays to converge at a point, creating a narrow and concentrated beam. This focused beam may be ideal for illuminating objects at a distance, making the flashlight function like a spotlight. Typically, a convex lens, which is curved outward, is used to achieve this focused effect. By adjusting the position of this convex lens closer to the light source, the light can be focused more tightly, resulting in a beam that reaches farther with a higher intensity.

Conversely, when the lens is adjusted to spread or diverge the light, the lens causes the light rays to spread out over a wider area. This creates a broad, diffuse beam, which is useful for illuminating a larger space at close range. This wide beam is beneficial for activities like camping, reading, or working on projects where broad area illumination is needed. A concave lens, which is curved inward, or a convex lens positioned to disperse the light, may be used to achieve this effect. Moving the lens farther from the light source typically results in a wider beam spread, reducing the intensity but increasing the coverage area.

The portable lighting device may have an adjustable-focus lens that facilitates switching between a focused beam and a wide flood. These lens mechanisms may include a sliding or rotating action. In a sliding mechanism, the lens may be moved closer to or farther from the light source. Sliding the lens closer focuses the light into a narrow beam, while sliding it farther spreads the light out. In a rotating mechanism, turning the flashlight head or bezel adjusts the lens position, tightening or widening the beam accordingly.

The shape and type of lens may also play a role in how the light is spread. A convex lens may focus light rays, while a concave lens may diverge them. Aspheric lenses, which are not perfectly spherical, may be used to reduce optical aberrations and provide better focus and clarity. Reflectors inside the portable lighting device may further shape the beam, with smooth reflectors producing a focused beam and textured reflectors creating a wider, diffused beam. By adjusting the lens and reflector orientation, portable lighting devices can provide optimized lighting for a variety of lighting needs, from spotlighting distant objects to flooding a wide area with light.

In some examples, during operation of the portable lighting device (while in e.g., certain operating modes/device configurations/light outputs), the control module may determine a distance to a target object or area (at step 1006). The target object or area may be in an area of illumination of a lighting element of the portable lighting device or area that could be illuminated by the portable lighting device. The control module may determine the distance to the target object or area via one or more distance sensor. In other examples, the control module may receive an interrupt from the distance sensor regarding a change in the distance. In some examples, determining the distance may be based on the present operating mode/device configuration/light output level of the portable lighting device. For example, the distance may be determined where the light output of the portable lighting device (e.g., 1000 lm) or the present operating mode is configured for high light output (e.g., a boost mode, an extreme mode, etc.). Outside of those operating modes/light outputs, the control module may not detect the distance of a target.

The distance sensor may be co-located with the lighting elements of the portable lighting device (e.g., in a head portion of a flashlight). In some examples, multiple distance sensors may be used where multiple lighting elements in the portable lighting device are configured to illuminate different directions. For example, a lantern may be configured to illuminate 360 degrees around the lantern. Distance sensors may be located around the lantern (e.g., four distance sensors located at each 90 degrees, six distance sensors located at each 60 degrees, or multiple distance sensors at unequal distances around the lantern). In another example, lighting devices may be located at opposite ends of a flashlight; distance sensors may be located at each of the opposite ends to determine the distance to a target object or area.

Where the detected distance is greater than a distance threshold (at step 1008, "No" branch), the control module may continue operation of the portable lighting device, e.g., in the present operating mode (at step 1004). Where the portable lighting mode was operating in a non-normal operating state (e.g., a "safe" mode, following a reduction in light output, etc.), the control module may return operation to the previous/normal/selected mode of operation. A return to the previous/normal/selected mode of operation may include increasing the light output of the portable lighting device.

When the portable lighting device is near a target object/area, there may be an increased risk of fire, damage, or injury particularly at higher light outputs (e.g., >1000 lm). To mitigate these risks, the portable lighting device may be configured to alter operation of the device when the portable lighting device is near the target object/area. Where the detected distance is below a distance threshold (at step 1008, "Yes" branch), the control module may determine a light output threshold (at step 1010).

The light output threshold may include a maximum light output based on the determined distance. The light output threshold may also be based on other factors including a user selected light output mode, the current mode of operation, (physical) configuration of the portable lighting device, detected temperature of the portable lighting device (or certain components or portions of the portable lighting device), a detected temperature of the target/target area, a user demonstrating control of the portable lighting device, a user-initiated safety override, etc. Determining the light output threshold may include performing a lookup in a lookup table (or other mapping) based on the determined distance and other factors (e.g., user control, temperature of the portable lighting device, temperature of a target, etc.). The lookup table may be stored in a memory/non-transitory computer readable medium accessible by the control module of the portable lighting device.

Where the light output is above the light output threshold (at step 1012, "Yes" branch), the control module may reduce the light output of the portable lighting device (at step 1014). The light output may be reduced (or further reduced) to the light output threshold, by a set amount (e.g., 250 lm), be reduced as a percentage of the current light output (e.g., 50% of the current light output), the control module may return operation to the previous/normal/selected mode of operation, or provide power to additional lighting elements.

In some examples, different operating modes and/or (physical) device configurations have different safe modes/lumen reductions. In some examples, the safe mode may reduce the light output to a safe level (while still providing some illumination). In other examples, the safe mode may power-off the light or the portable lighting device. In further examples, the device configuration may be altered (e.g., the lens may be moved changing the focus).

Where the light output is below the light output threshold (at step 1012, "No" branch), the control module may maintain or increase the light output (at step 1016). The light output may be maintained when the light output is at or near the light output threshold. The control module may be increased to the light output threshold, by a set amount (e.g., 250 lm), or may be increased by a percentage of the current light output (e.g., increased 10%). The control module then may re-detect the distance of a target (at step 1006). Where the detected distance is above the threshold distance (at step 1008, "No" branch), the control module may return operation to the previous/normal/selected mode of operation and increase the light output of the portable lighting device. Where the detected distance remains below the threshold (at step 1008, "Yes" branch), the control module may determine an updated light output threshold based on the updated distance (at step 1010) and compare the light output with the updated light output threshold (at step 1012).

In some examples, the light output may be estimated by, e.g., the control module of the portable lighting device, based on the power output to the lighting elements. While discussed in the context of light output, power output to lighting elements may be substituted with equal success. For example, the light output threshold may be a power threshold to provide to the lighting elements and/or the light output of the portable lighting device may be the current power being provided to the lighting elements. Power values may be defined directly (e.g., an amount of current to supply) and/or as a duty cycle, e.g., where pulse width modulation (PWM) techniques are used to power the lighting elements of the portable lighting device.

9 Safe Operation Based on Surface Temperature

Various embodiments of present disclosure detect the temperature of the portable lighting device or a portion (e.g., a surface or handle) of the portable lighting device. The temperature of the portable lighting device may be used to control (e.g., limit) the light output of certain modes/configurations of the portable lighting device. Above a threshold temperature (e.g., 45° C., 50° C., etc.), the portable lighting device may limit light output to a certain output (e.g., 1000 lm) or enter a different "safe mode." Light output may be limited further (e.g., in 250 lm increments) periodically (e.g., every second, 2 seconds, 5 seconds, etc.) until the detected temperature is below the threshold temperature or the lighting elements are powered off.

Figure 11:
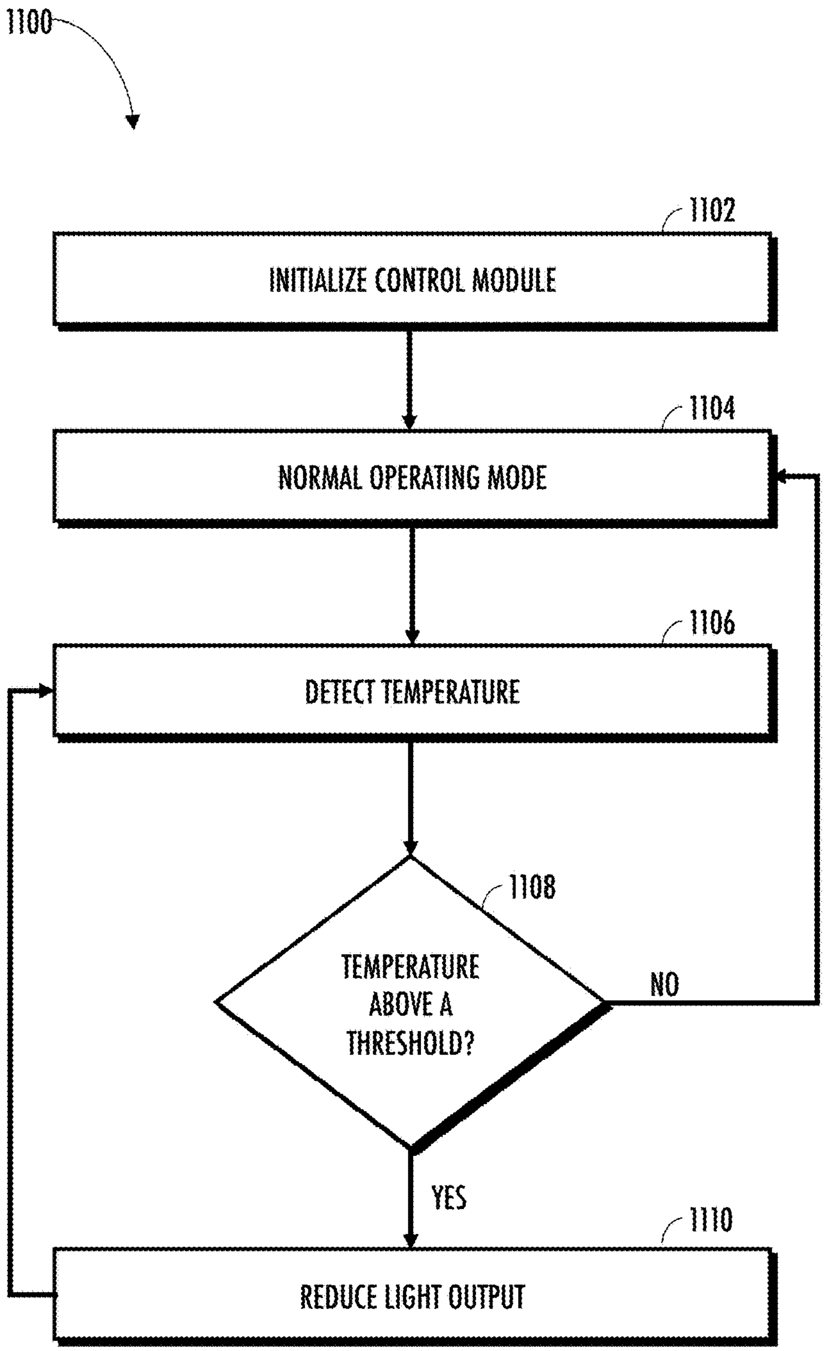
FIG. 11 is a logical block diagram of one exemplary method for controlling light output based on a temperature of components of a portable lighting device, according to aspects of the present disclosure.

FIG. 11 is a logical block diagram of one exemplary method 1100 for controlling light output based on a target temperature. At step 1102, a control module of the portable lighting device initializes itself for device operation. At step 1104, the control module may start a mode of operation. In some examples, the mode of operation may be one of a plurality of different operating modes. Starting the mode of operation may include initializing the mode from a powered down or low-power state, changing mode from a different mode of operation, or resuming from a previous operation. The user may select between different operational modes by e.g., clicking a button, turning a dial, and/or applying user gestures to navigate between modes. In some examples, a user may select between various device configurations as described herein.

In some examples, during operation of the portable lighting device (during e.g., of certain operating modes), the control module may determine the temperature of the portable lighting device (at step 1106). Certain modes of operation of the portable lighting device may not perform temperature sensing, while in other operating modes the portable lighting device may perform temperature sensing. For example, in low output modes (e.g., <1000 lm) or configurations temperature sensing (and changing the mode/ lighting based on the temperature) is not performed/skipped. In other examples, a manual override is detected. The manual override may include holding down a button on the portable lighting device or other input indicating the user wishes to continue operating at the present light output regardless of a target temperature. Where a manual override is detected the portable lighting device may operate according to the selected lighting mode rather than in a reduced lighting/"safe" mode.

The temperature sensed may be the temperature of the surface or handle of the portable lighting device. In other examples, an internal device temperature, temperature of lighting devices, etc. may be determined. Multiple temperature readings from various portions of the surface (or other portion) or the entire portable lighting device may be performed and the largest (or, average, smallest, median, etc.) temperature used for the determination.

In other examples, an internal temperature of the portable lighting device may be detected and a surface temperature estimated based on the internal temperature. For example, a temperature sensor (e.g., an internal temperature sensor) may detect the temperature of an internal component of the portable lighting device. In one example, the temperature of the PCB or the control module may be detected. An estimated surface temperature may be determined via a lookup based on the detected temperature in a lookup table in a memory accessible by the control module of the portable lighting device. In some examples, the values in the lookup table may be based on testing comparing the internal and surface temperatures of the portable lighting device.

The detected temperature may be compared with a threshold surface temperature to determine whether to mitigate the temperature. The threshold temperature may be set to a temperature value where continued exposure can lead to pain or injury to a user (see e.g., FIG. 1) In some examples the temperature threshold is between 45° C. and 55° C. Where the detected temperature is not above a threshold temperature (at step 1108, "No" branch), the control module may continue operation of the portable lighting device (in the present operating mode). Where the detected temperature is above a threshold temperature (at step 1108, "Yes" branch), the control module may reduce the light output of the portable lighting device (at step 1110). The light output may be reduced to a pre-set value (e.g., 1000 lm), by a set amount (e.g., 250 lm), or may be based on the current light output (e.g., 50% of the current light output). In some examples, the control module will change operating modes (e.g., to a "safe mode"), power down the lighting elements, or power down the portable lighting device.

Periodically, the control module may re-detect the temperature, e.g., an updated surface temperature (at step 1106). In some examples, a plurality of updated surface temperatures may be determined over a period of time (e.g., a threshold time period). Where the detected temperature (or temperatures) is no longer above a threshold temperature (at step 1108, "No" branch), the control module may return operation to the previous/normal/selected mode of operation and increasing the light output of the portable lighting device. Where the detected temperature remains above a threshold temperature (at step 1108, "Yes" branch), the control module may further reduce the light output of the portable lighting device (at step 1110). The light output may be reduced by a set amount (e.g., 250 lm), or may be based on the current light output (e.g., 50% of the current light output). In some examples, the control module will change operating modes (e.g., to a "safe mode"), power down the lighting elements, or power down the portable lighting device.

In some examples, different operating modes and/or device configurations have different safe modes/lumen reductions. In some examples, the safe mode may reduce the light output to a safe level (while still providing some illumination). In other examples, the safe mode may power-off the light or the portable lighting device. In further examples, the device configuration may be altered (e.g., the lens may be moved changing the focus).

10 Distance and Device Temperature User and Sensor Interface

Figure 12:
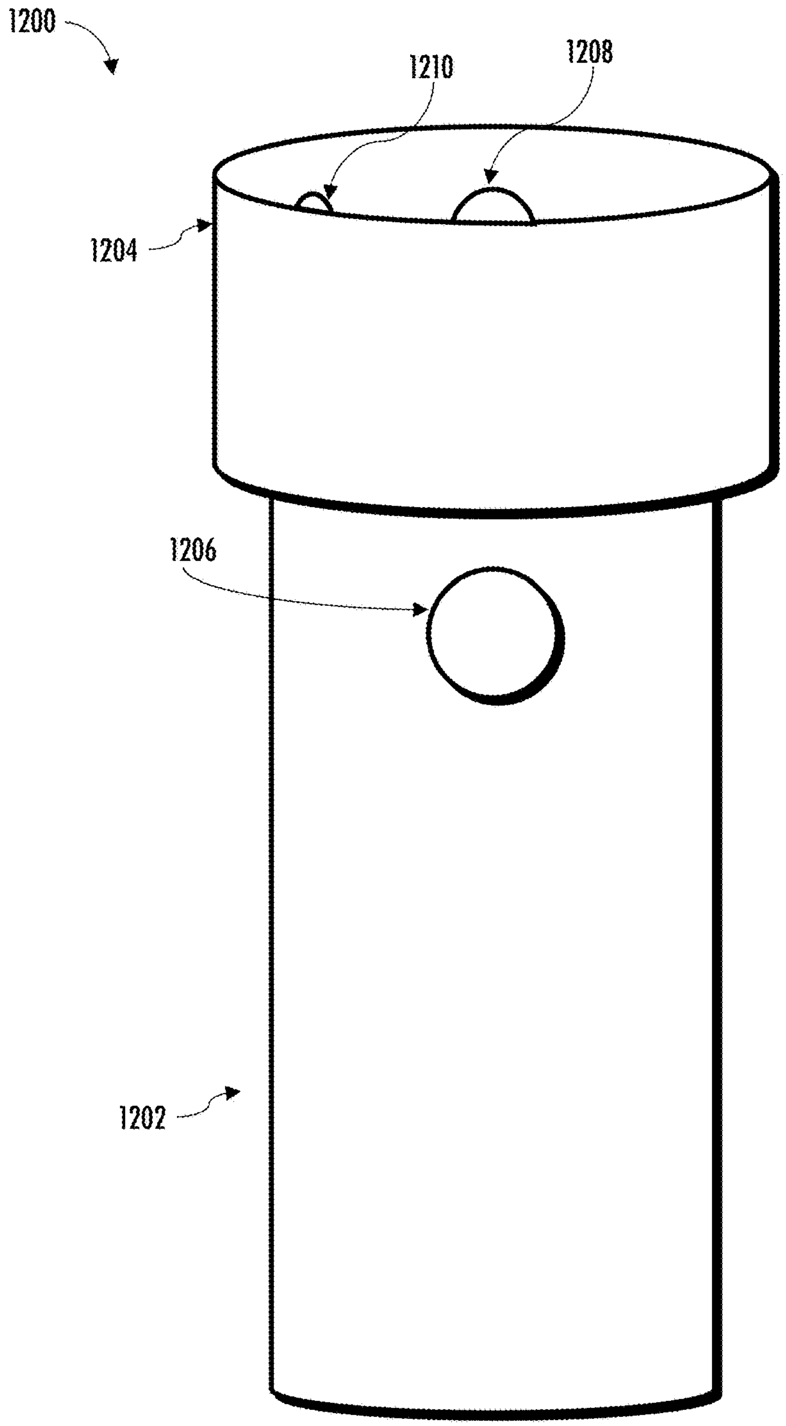
FIG. 12 illustrates a portable lighting device according to aspects of the present disclosure.

The lumen outputs of the various modes may be adjusted based on a detected distance to a target or a device temperature. FIG. 12 illustrates a portable lighting device 1200 according to aspects of the present disclosure. While the following discussion is presented with reference to an exemplary flashlight, artisans of ordinary skill in the related arts will readily appreciate that the following techniques may be broadly extended to e.g., flashlights, headlamps, lanterns, work lights, and/or any other lighting device having a plurality of operational modes. As illustrated, the portable lighting device 1200 is a flashlight with a barrel 1202 and a head component 1204.

The barrel 1202 is configured to be grasped by a user and may include ridges, knurling, or other texture along the outer periphery for improved handling during operation. The barrel 1202 may include a button 1206 to control the portable lighting device 1200. The barrel 1202 of the portable lighting device 1200 may house a controller configured to operate the portable lighting device 1200 and a power source (e.g., a battery) and may include connections to couple charging devices (e.g., a charging port). One or more temperature sensors may be located on, adjacent to, or inside the barrel 1202 to determine the temperature of the barrel 1202.

The head component 1204 may include one or more light-emitting assemblies 1208 and a distance sensor 1210. Light-emitting assemblies 1208 may include a lens, a reflector, and a light emitting diode (LED). The light-emitting assemblies 1208 may be used together, or individually, in a variety of different operating modes. The distance sensor 1210 may include a laser distance sensor, infrared (IR) distance sensor, or other type of distance sensor. In some examples, the head component 1204 may include a bezelled rim around the circumference. In some examples, the distance sensor 1210 in the head component 1204 is configured to detect the distance of a target or area illuminated by the light-emitting assemblies 1208.

A temperature sensor located in the head component may be configured to determine the temperature of the head component or the light-emitting assemblies 1208 within the head component. For example, when a temperature above a threshold is detected, the operating mode may be adjusted (e.g., to a "safe" mode) and/or light output may be reduced or turned off at the light-emitting assemblies 1208 (or the portable lighting device 1200). Light output may be reduced to a pre-set value (e.g., 1000 lm), by a set amount (e.g., 250 lm), or based on the current light output (e.g., 50% of the current light output).

The distance sensor 1210 may be co-located with a temperature sensor configured to determine the temperature of a target/area. Where the distance detected is greater than a distance threshold, the portable lighting device 1200 may override light output reductions or operate according to a selected/normal operating mode (e.g., without taking temperature readings of a target/area). The distance threshold may be a fixed threshold (e.g., 3 inches, 6 inches, 1 foot, 3 feet, etc.), or a threshold based on the current operating mode/light output. For example, the distance threshold may be greater where the light output (of the operating mode) is greater and smaller where the light output (of the operating mode) is smaller.

The button 1206 (e.g., when held down) may be used to override the light output reductions/mode changes associated with distance or temperature sensing by the portable lighting device 1200. The button 1206 may also be used to toggle between lighting modes (or powered operation of the portable lighting device 1200). In some examples, the manual override may be limited (e.g., to temperatures below a second threshold greater than the threshold to change mode/reduce lighting without the override).

11 Lighting Modes

Figure 13:
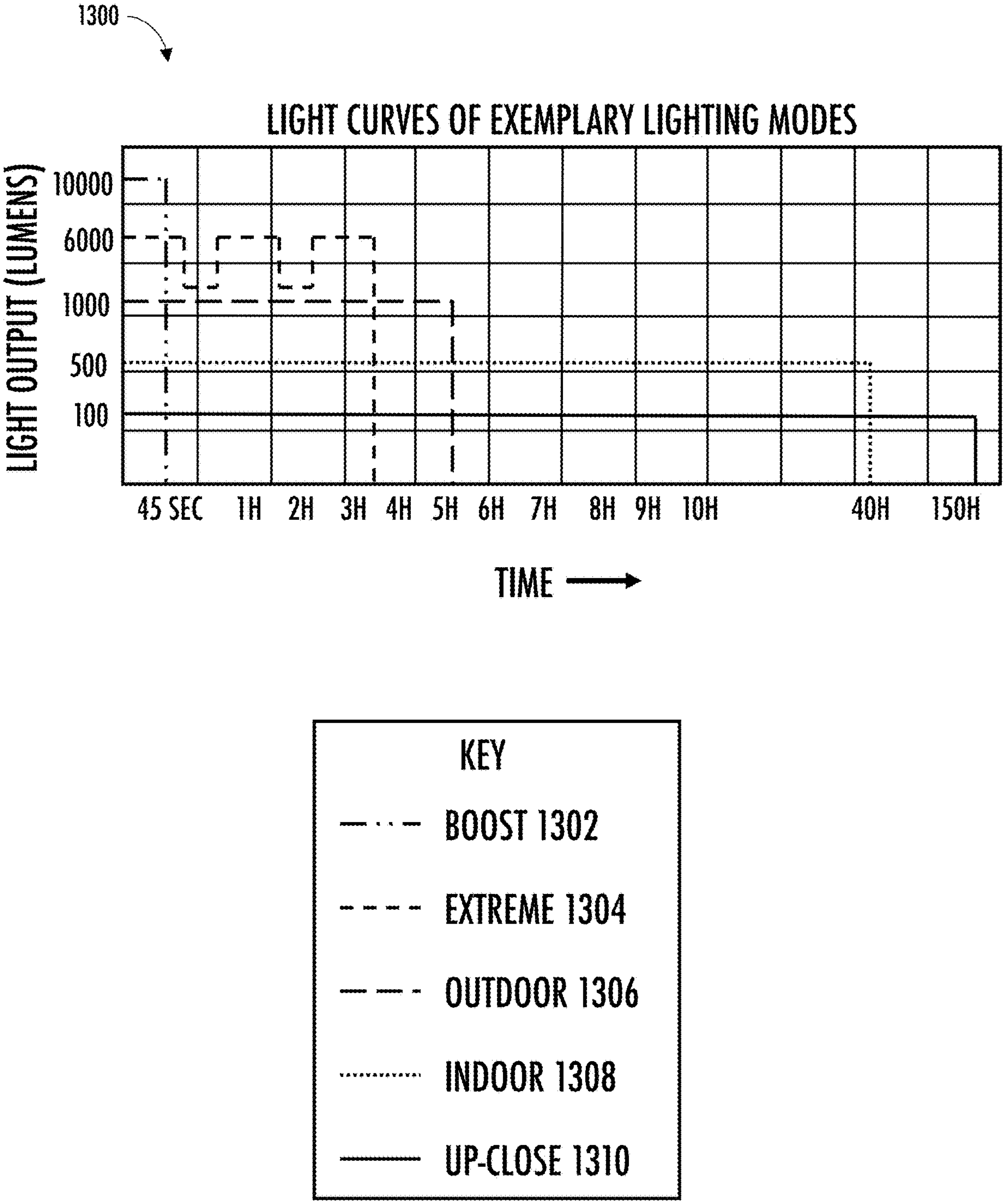
FIG. 13 is a graph of light curves illustrating the light output over time of exemplary lighting modes of a portable lighting device, according to aspects of the present disclosure.

FIG. 13 is a graph 1300 of light curves illustrating the light output over time of exemplary lighting modes of a portable lighting device. In some examples, a portable lighting device may include one or more constant lighting modes. As shown, the constant lighting modes include boost lighting mode 1302, outdoor lighting mode 1306, indoor lighting mode 1308, and up-close lighting mode 1310. In a constant lighting mode, a controller on the portable lighting device may attempt to achieve a relatively stable light output over time. Light output in a constant lighting mode may fall off relatively quickly when the power source of the portable lighting device is nearly depleted. The stable light output of a constant lighting mode may be beneficial to a user that needs consistent lighting particularly over longer time periods rather than in use cases where a dimming light is acceptable. Consistent lighting across lighting devices may better empower users to find the best portable lighting device to meet their needs. In some examples, the constant lighting modes may have pre-set or standardized light outputs such that portable lighting devices may be compared based on the runtime of these standardized constant light modes. In other examples, multiple portable lighting devices may be set to the same (or different/coordinated) lighting modes to achieve a particular lighting effect. Standardized light outputs may enable users to more easily comply with particular lighting restrictions (e.g., time or location-based restrictions).

As used herein, a constant lighting mode is a lighting mode that produces light output within a certain (e.g., 10%) threshold of an initial or advertised output. This output level may be maintained for the majority (e.g., 50%, 75%, 90%) of the runtime of the lighting device. Thus, constant lighting modes may be characterized by a light output during a majority of the runtime being greater than 90% of the initial light output. Due to current, voltage, and temperature fluctuations that may occur in portable lighting devices when powered on or change modes, initial light output may be the light output at a pre-set period of time (e.g., 15 seconds, 30 seconds, etc.) following power-on or mode adjustment.

In certain examples, constant lighting modes may be regulated by a temperature sensor/thermostat. In these examples, when the temperature of the LED has exceeded a temperature threshold (e.g., 100° C.), the LED may be configured to power off or to output a lower lumen level (e.g., a 50% reduction, etc.) to reduce heat and the potential for damage to the portable lighting device.

The portable lighting device may include a boost lighting mode 1302. In one example, the boost lighting mode 1302 includes a constant maximum light output for the portable lighting device. The portable lighting mode may output this maximum light output for as long as possible until battery depletion (or a low power state is detected) or until a temperature threshold is exceeded. As shown, the boost lighting mode 1302 has a constant 10,000 lm output for 45 seconds.

The potential light output of an LED may irreversibly decrease over time (called lumen depreciation); such effects may be exacerbated when LEDs are subjected to high temperature operation. When operating a portable lighting device, heat build-up may be a concern particularly at relatively higher light output levels. Too much heat accumulation may damage the LED chips. At certain light outputs, the heat generated may be too great for continuous operation of the LED due to the relatively lower efficiency of LEDs at higher temperatures and the risk of damage to the LED chip. Said another way, the portable lighting device may be unable to consistently dissipate enough heat at certain lumen outputs to overcome the heat generated by the LED in that mode of operation. If operation of the portable lighting device were to continue unabated, more power would be needed to achieve the high output level (e.g., due to inefficiency of the LED at the higher temperature) and a greater likelihood of irreversible LED failure. Failure may be caused by various factors including proliferating defects in the LED chip, expansion of a transparent epoxy resin surrounding the LED which can result in an LED open circuit, yellowing of the epoxy resin.

In certain lighting modes, when running the LED to create a high lumen output, the heat build-up may be equally high, and the portable lighting device may dim the light output to protect the LED chip. For example, in extreme lighting mode 1304, the portable lighting device may be configured to output light at a high output level (e.g., 6000 lm). At this output level, the LED may generate more heat than can be dissipated which may cause a temperature increase in the LED. When the temperature of the LED has exceeded a temperature threshold (e.g., 100° C.), the LED may be configured to output a lower lumen level (e.g., 3000 lm) to reduce heat and the potential for damage to maintain the robustness of the portable lighting device. The light output may be set to a level where the heat dissipated by the LED is greater than the heat generated by the LED. In some examples, the lower output level is 50% or 30% of the high output level. Once the LED has cooled sufficiently (to below a lower threshold temperature threshold) and/or after a particular period of time elapses (e.g., 5 minutes), the LED may be configured to return to the high lumen output. Such light output modulation may continue until battery depletion (or a low power state is detected).

In some examples, in the extreme lighting mode 1304, rather than having a high and low output modes based on temperature, the extreme lighting mode 1304 may have three or more light output levels (e.g. 6000 lm/4000 lm/2000 lm) based on the temperature of the LED/portable lighting device. In some examples, the portable lighting device may select light output based on a function that is negatively proportional to the determined temperature.

Outdoor lighting mode 1306, indoor lighting mode 1308, and up-close lighting mode 1310 are exemplary constant lighting modes. In some examples, outdoor lighting mode 1306 is characterized by a 1000 lm output, indoor lighting mode 1308 is characterized by a 500 lm output, and the up-close lighting mode 1310 is characterized by a 100 lm output. In some examples, outdoor lighting mode has an initial light output of between 800 lm and 1200 lm, indoor lighting mode has an initial light output of between 450 lm and 550 lm, and up-close lighting mode has an initial light output of between 90 lm and 110 lm. When in these modes, the portable lighting device may attempt to consistently produce the indicated light output until battery depletion (or a low power state is detected). As shown, the portable lighting device is able to maintain the outdoor lighting mode 1306 for about five hours, the indoor lighting mode 1308 for 40 hours, and the up-close lighting mode 1310 for 150 hours.

The light output of an LED naturally decreases during its operating lifetime. Thus, the maximum light output of an LED is higher when the LED is new than after many hours of operation. Similarly, as an LED is used over time, the same input current results in a reduced lumen output (a reduced luminous efficiency). In some examples, the portable lighting device may store information about the total runtime of the LED (or the total runtime in each of the various modes). For example, operation in boost lighting mode 1302 may impact the deterioration of the LED more than a lower lumen output mode. The portable lighting device may determine an output current to provide to the LED based on the runtime of the LED (and/or the various LED modes) and the desired output mode. This output current may be used to achieve consistent lighting over time for the various constant lighting modes of the portable lighting device. Other factors may also impact the efficiency of the LED including the (p-n junction) temperature of the LED. The portable lighting device may determine the output current based on one or a plurality of factors. These factors may include a combination of stored values over time (e.g., total runtime) and presently sensed values. In some examples, the output current may be determined when the portable lighting device is powered on, when the mode is changed, and/or periodically (e.g., every 5 minutes) during operation.

Other lighting modes may include a runtime mode that periodically lowers the lumen output over the course of the runtime of the device in order to increase the potential runtime for a given initial lumen output. The initial lumen output may a lumen output taken between 30 and 120 seconds from powering on the device or activating the lighting mode. Runtime mode may increase the runtime (e.g., preserve battery life) for a given initial light output. In the runtime mode, the light output during the majority of the runtime may be less than 90% of the initial light output. In some examples, runtime mode may be an initial or default operating mode of the portable lighting device. In runtime mode, unlike a constant lighting mode, the portable lighting device dims the light output over the course of operation to maintain battery life/increase runtime for a given initial lumen output. In some examples, a high initial light output is followed relatively quickly by a rapid dimming in light output. For example, rapid dimming may occur within the first few (e.g., 5 or 10) minutes of runtime or within the first 10% or 25% of total (expected) runtime. Some runtime modes may include one or more plateaus where the dimming of light output slows or stops entirely before additional rapid dimming, where Exemplary portable lighting devices may include a preset light output routine based on the current runtime of the portable lighting device.

The portable lighting device may include one or more automatic modes that vary the lumen output of the device based on external factors (to the device). Sensors on the portable lighting device may determine ambient light (via, e.g., an ambient light sensor), proximity to users/targets (via, e.g., a proximity sensor), surrounding motion (via e.g., a motion detector), device motion (via, e.g., an inertial sensor), etc. Some or all of these data may be used by the portable lighting device to determine the light output.

For example, in a first automatic mode light output is proportional to the amount of ambient light. As the amount of ambient light increases, the portable lighting device may increase the light output. As the amount of ambient light decreases, the portable lighting device may decrease the light output/dim the LED. In a second automatic mode, the distance to a target opposite the LED beam (e.g., what a flashlight is pointed at) is determined. As the distance increases to the target, the light output is increased; as the distances to the target decreases, the light output is decreased. The distance to moving objects/users surrounding the portable lighting device may be determined. Where the moving objects are determined to be close to the portable lighting device, the light output may be relatively low/decreased; conversely where the moving objects are determined to be far from the portable lighting device, the light output may be high/increased. In an alternative mode, when moving objects are close the light output may be high/increased and when moving objects are far from the light output may be low/decreased. In a third automatic mode, where the speed of the portable lighting device is high/increasing the light output is high/increased; where the speed of the portable lighting device is low/decreasing the light output may be low/decreased. In some modes, when movement of the portable lighting device is not detected for a particular time period, standby mode is activated which reduces the output power, turns off certain sensors or device functions, or turns off the portable lighting device.

Other automatic modes may be based on the remaining capacity of one or more power source of the device. For example, in a reserve mode, when the remaining battery capacity drops below a threshold (e.g., 10% the initial capacity), the light output may be reduced. This may conserve remaining runtime of the LED or allow the portable lighting device to retain charge to provide power to other devices. Other device modes may include altering the color or color temperature of the LED, strobing/blinking at a selected or preselected intervals, or selecting or modifying the shape of the beam of the light/selecting which light assemblies from a plurality on the portable lighting device.

The portable lighting device may include one or more safe modes that the portable lighting device may enter when a hazard/risk is encountered (e.g., a burn/fire risk). In some examples, the safe mode may reduce the light output to a safe level (while still providing some illumination). In other examples, the safe mode may power-off the light or the portable lighting device. In further examples, the device configuration may be altered (e.g., the lens may be moved changing the focus).

Further operating modes are described within U.S. patent application Ser. No. 18/765,297, filed Jul. 7, 2024, and entitled "Multimode Lighting System," U.S. patent application Ser. No. 18/068,286, filed Dec. 19, 2022, and entitled "Adaptive Flashlight Control Module," and U.S. patent application Ser. No. 17/315,292, filed May 8, 2021, and entitled "Broad View Headlamp," each of the foregoing application being incorporated herein by reference in its entirety.

In some examples, lighting modes may be associated with a light output that varies over time the light mode/lighting device is activated. As illustrated, the extreme lighting mode 1304 may switch between a high and low light output state. Other lighting modes may be associated with light output that decreases over time (and may be illustrated in a graph as having a curve that decreases as time increases). The reduction in light output may be constant (or constant up until a threshold light output) or may vary over time (e.g.

more rapidly at early time periods and less rapidly as it approaches a threshold light output). In some examples, there may be multiple light outputs associated with a particular operational mode. In these examples, the light output compared to a threshold may be an initial output of the lighting mode. Alternatively, the light output compared to a threshold may be the current light output based on the time within the lighting mode or the amount of power provided to (or consumed by) the lighting elements.

12 System Architecture

Figure 14:
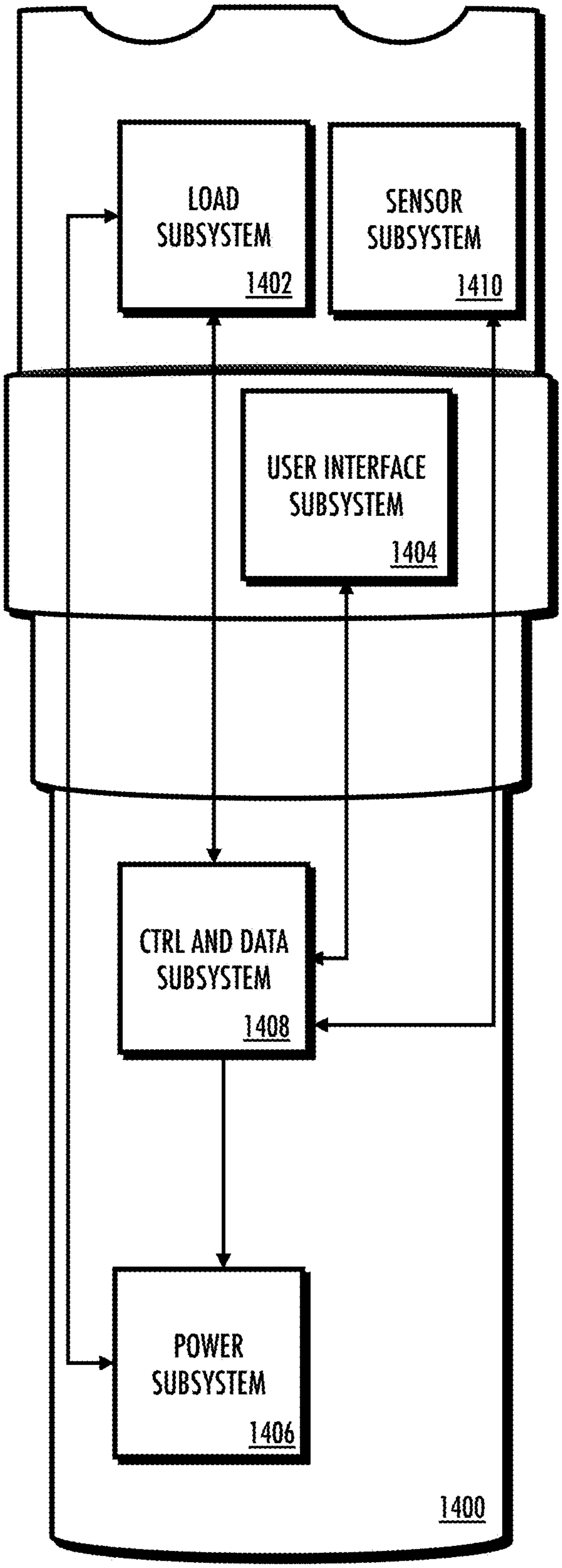
FIG. 14 is a logical block diagram of an exemplary lighting system, useful in conjunction with the various techniques described herein.

FIG. 14 is a logical block diagram of an exemplary lighting system 1400 (also may be referred to as a lighting apparatus). The exemplary lighting system 1400 may include a load subsystem 1402, a user interface subsystem 1404, a power subsystem 1406, a control and data subsystem 1408, and a sensor subsystem, within a housing. During system operation, the power subsystem 1406 provides power from one or more different power sources with different characteristics and/or capabilities. The control and data subsystem 1408 monitors the power subsystem 1406 and/or the load subsystem 1402 and adjusts power provisioning according to the dynamic loading activity of the load subsystem 1402 based on user settings obtained via the user interface subsystem 1404 and/or the sensor subsystem 1410. Additionally, system status and user feedback may be provided to/from the user via the user interface subsystem 1404.

While the illustrated system is presented in the context of a portable lighting device, the system may have broad applicability to any lighting system. Such applications may include personal, industrial, security, medical, and/or scientific devices.

The following discussion provides functional descriptions for each of the logical entities of the exemplary lighting system 1400. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary lighting system 1400 is separately provided below.

13 Load Subsystems

Within the context of the present disclosure, the load subsystem 1402 consumes power that is provided from the power subsystem 1406. In one aspect of the present disclosure, the load subsystem 1402 dynamically varies its load; the dynamic characteristics of the load may be monitored to select, prioritize, or otherwise inform power provisioning (controlled by the control and data subsystem 1408).

As used herein, the term "load" refers to any device or component that consumes electrical energy to perform a specific function. A dynamic load refers to an electrical load that varies its power consumption due to its operating conditions and/or the specific function it performs. A static load refers to an electrical load that has a constant power consumption.

An electrical load may be characterized according to the voltage (measured in "volts" (Joules/Coulomb)) and current (measured in "amps", (Coulombs/second)) the load uses. Power consumption is typically measured in "watts" (volts× amps=watts (Joules/second)). Notably, power consumption is a function of impedance which has two components: resistance and reactance. Resistance measures opposition to the flow of electrical current, whereas reactance measures opposition to a change in electrical current. Reactance may be further sub-divided into inductive reactance and capacitive reactance. Inductive reactance stores energy in the form of magnetic field hysteresis; thus, the change in current "lags" the change in voltage. In contrast, capacitive reactance stores energy as differences in electrical fields thus, the change in current "leads" the change in voltage. The combination of resistance (real) and reactance (imaginary) describes a complex impedance having a magnitude and phase. Notably, reactance stores, but does not consume, power-thus, reactive components are not "dynamic loads" since they do not vary their power consumption.

Electrical systems that switch in/out portions of circuitry are one type of dynamic load behavior. For example, Pulse Width Modulation (PWM) and Pulse Density Modulation (PDM) circuits may switch on/off according to different widths or densities. Other examples include electrical subsystems that can be enabled/disabled either in whole or in part. For example, gate logic and other hardware may be enabled/disabled with clock gating and/or power gating. More generally, however, any time varying load may be substituted with equal success. For example, Pulse Amplitude Modulation (PAM) may increase/decrease impedance to affect the resulting amplitude. As another such example, variable resistances may be used to adjust current flow (e.g., potentiometers and/or rheostats) of analog circuits.

The permissible static and dynamic behavior of electrical signals may be parameterized for a load in a variety of ways. The following listing is illustrative, other load parameters may be used with equal success.

A "nominal" quantity is a specified or typical quantity (e.g., voltage, current, frequency, etc.) that an electrical or electronic component, circuit, or device is designed to operate under normal conditions. It serves as a reference value for the expected value. "Maximum" and "minimum" refer to the highest and lowest values, respectively, that a component, circuit, or device can withstand without suffering damage or exceeding its rated specifications. "Peak" and "trough" refer to the highest and lowest values, respectively, that a component, circuit, or device is designed for to maintain proper operation.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

A "duty cycle" describes the fraction of time during which a periodic signal (such as a pulse or waveform) is in an active state compared to its total period. For example, an 80% duty cycle (sometimes also referred to as an 80/20 duty cycle) refers to a signal that is on for 80% of the cycle (and off for 20% of the duty cycle).

A "slew rate" refers to the rate at which a signal changes over time. For example, slew rates for voltages are often expressed as volts/microsecond.

A "spectral envelope" is a representation of the amplitude characteristics (magnitude) of the frequencies present in a signal or spectrum. It provides information about the dominant frequency components of a signal. A "roll-off frequency" is the point in a frequency response at which the amplitude or power of the signal begins to decrease rapidly. It is typically defined as the frequency at which the response is reduced by a certain amount, often measured in decibels.

The following discussions provide several illustrative embodiments of dynamic loads, however, artisans of ordinary skill in the related arts given the contents of the present disclosure will readily appreciate that the virtually any dynamic load may be substituted with equal success.

13.1 Transducer Components

As used herein, the term "transducer" and its linguistic derivatives refer to components that convert (transduce) energy from a first form to a second form. Forms of energy may include electrical, magnetic, chemical, mechanical, acoustic, optical, thermal, radio, etc. For example, an RF antenna is an example of an electromagnetic transducer (converting electromagnetic waves to/from electrical energy), a speaker is an example of an electroacoustic transducer (converting electrical energy to/from acoustic waves), an LED is an example of an electro-optical transducer (converting electrical energy to incoherent light), etc. Various embodiments of the load subsystem convert (transduce) electrical energy into another form to perform its task; dynamic transduction may entail dynamic loading.

In one embodiment, the load subsystem transduces electrical energy to electromagnetic radiation. EM radiation refers to oscillating electric and magnetic fields that propagate together in the same direction, perpendicular to one another. For example, the load subsystem may be a light module that generates visible light. The light module may include a bulb (incandescent, halogen), light emitting diode (LED), gas-discharge lamp (fluorescent tubes, neon, sodium vapor), lasers, or other light generating device. A bulb includes a wire filament enclosed in a vacuum or inert gas; the resistance of the filament is used to convert electrical energy to heat and light. An LED is composed of a diode junction manufactured from semiconductors with specific electroluminescent properties (e.g., gallium arsenide (GaAs), gallium phosphide (GaP), etc. When electrical energy is applied to the diode junction, electrons are forced to combine with electron holes; this process converts some electrons to photons (light). Gas-discharge lights pass electrical energy through ionized gasses; the ionized gases have quantum energy states so excess energy is released as EM radiation. The EM radiation is absorbed by a phosphor coating, which re-emits it as visible light. Lasers (light amplification by stimulated emission of radiation) use electrical energy to stimulate a gain medium (e.g., gas, liquid, solid); once energized, some atoms of the gain medium emit radiation. The emitted radiation triggers other atoms of the gain medium to emit more radiation; resulting in a rapid amplification of coherent light. The gain medium lies in a resonant cavity of the laser which allows continued amplification even as some portion of the light are output.

In addition to the light generating element, the light module may incorporate passive lenses, diffusers, reflectors, waveguides, and/or any other components or combinations of components configured to direct or disperse the light. For example, lenses are typically manufactured from a transmission medium (e.g., glass, acrylic, polycarbonate, etc.) which has been physically formed to bend (refract) light as it passes through. The lens physical shape may be convex (that causes light to converge), concave (that causes light to diverge), or a piecewise combination. In some applications, multiple lenses may be used in combination to provide refraction characteristics that are not possible (or practical) to implement with a single lens. Diffusers scatter, spread, and/or soften light as it passes through. Examples of diffusers include e.g. diffuser films, prisms, or translucent materials (e.g., frosted glass/acrylic, etc.). Reflectors reflect some (or all) of the light; reflectors are often used to direct light in a particular direction. Reflectors can be made from a wide range of materials, including metals, glass, plastics, and specialized coatings designed for specific wavelengths or applications. The design and geometry of a reflector determine its reflective properties and how it redirects or concentrates light. Waveguides use internal reflection to guide and confine light from one point to another; typical examples of waveguides include e.g. fiber optics for light as well as microwave waveguides and radio waveguides.

More generally, while the foregoing discussion is presented in the context of visible light applications (e.g., security lighting, lanterns, flashlights, head lamps, work lights, etc.), any EM radiator (and associated peripherals) may be substituted with equal success. EM radiation spans a very wide spectrum from e.g., radio waves, microwaves, infrared (IR) or heat, visible light, ultraviolet (UV), x-rays, gamma rays, etc. Such devices may include e.g., telecommunications radios, microwave transmitters/ovens, IR transmitters/elements, UV lamps, X-ray lamps, etc.

In one example, the exemplary lighting system 1400 may server as a speaker for playing music, a speaker and microphone "intercom" for hands-free cellphone operation, a device hub, an external hard drive for storing/transferring media, etc. Media playback assemblies may include associated components: e.g., a wired/wireless interface (e.g., USB™, Bluetooth®, Wi-Fi™, etc.), codecs, user interfaces, screens, speakers, and/or microphones.

In one embodiment, the load subsystem 1402 transduces electrical energy to acoustic waves. An acoustic wave is a mechanical wave that propagates through a physical medium (air, water, solids, etc.) by causing particles in the medium to oscillate or vibrate. In one implementation, the load subsystem 1402 include a moving-coil speaker module that generates audible sound. Such speakers include a diaphragm (cone) that is attached to a coil, and magnet. When an electrical current passes through the coil, the coil generates a magnetic field that interacts with the magnet, causing the coil (and diaphragm) to move. Oscillating the diaphragm within certain frequency ranges and at sufficient magnitudes results in audible sound. Other examples of speakers include electrostatic speakers and planar magnetic speakers. Electrostatic speakers move an electrically charged diaphragm between perforated metal plates by changing the electrical charge of the plates. Planar magnetic speakers move a magnetic diaphragm using an electrically induced magnetic field. Each of these speaker technologies transduces electrical energy into acoustic waves.

Audio devices may include without limitation: audio/visual (AV) players (e.g., laptops, portable stereos, etc.), personal communication devices (e.g., walkie-talkies, smartphones, etc.), home/professional entertainment systems, public address systems, voice assistants, and/or any other personal, industrial, financial, medical, and/or scientific devices that employ audible sound.

Furthermore, much like light, acoustic waves exist on a spectrum that includes infrasound, audible sound, and ultrasound. While the foregoing selection describes audible acoustic applications, non-audible acoustic applications may use other forms of transduction. For example, ultrasonic transducers apply electrical current to piezo-electric elements to vibrate and generate ultrasonic acoustic waves. Ultrasonic waves are used for a variety of medical and industrial applications. Similarly, infrasonic waves may be generated by motors/vibrators; infrasound travels well in liquid/solid mediums and has applications in seismology and/or petroleum exploration, etc.

In one embodiment, the load subsystem 1402 converts electrical energy to mechanical movement. Typically, electro-mechanical movement uses electrical current in combination with permanent magnets to create attraction/repulsion forces. These techniques are commonly used in relays, solenoids, electric motors, stepper motors, linear actuators, servo motors, etc. Mechanical movement may include regular movements such as linear motion, reciprocating motion, rotary motion, oscillatory motion, as well as irregular movements such as cam-based motion, linkages, and eccentric motion.

Electro-mechanical devices may include without limitation: consumer electronics, hand tools and power tools (e.g., drills, screwdrivers, saws, sanders, routers, impact drivers, sprayers, heat guns, nail guns, rotary tools, random orbital sanders, and/or any other similar tools), and/or any other personal, industrial, financial, medical, and/or scientific devices that employ mechanical motion. While the foregoing selection describes electro-mechanical applications for hand-operated applications, artisans of ordinary skill in the related arts will readily appreciate that electro-mechanical motion may also be used in robotics, transportation, industrial automation, and/or drone-based applications. Such applications may also incorporate electro-mechanical transducers of extraordinarily small (or large) scale, such as piezo-electricity, nanotechnologies, etc.

While the foregoing discussion provides several illustrative transduction technologies, virtually any transduction technology with dynamic loading may be substituted with equal success, given the contents of the present disclosure.

13.2 Signal Processing Components

Aspects of the present disclosure may be used in conjunction with dynamic loads of signal processing. Signal processing refers to techniques that manipulate, analyze, and interpret electrical signals, which are representations of data in either analog or digital form. Functionally, semiconductors consume power during operation due to internal resistances. As a result, the dynamic loads associated with signal processing are a function of e.g., processing complexity (e.g., data size, compute cycles, memory accesses, etc.), dynamic behavior (e.g., enable/disable, load balancing, etc.), and/or application considerations (e.g., real-time budgets, best-effort processing, etc.).

As used herein, the term "real-time" refers to tasks that must be performed within definitive time constraints; for example, a video camera must capture each frame of video at a specific rate of capture. As used herein, the term "near real-time" refers to tasks that must be performed within definitive time constraints once started; for example, a smart phone must render each frame of video at its specific rate of display, however some queueing time may be allotted for buffering. As used herein, "best effort" refers to tasks that can be handled with variable bit rates and/or latency. As but one such example, a user that wants to view a video on their smart phone can wait for the smart phone to queue and post-process video.

In one embodiment, the load subsystem 1402 includes a signal processor that manipulates electrical signals in the analog domain. In other words, information is conveyed via voltage and/or current. Functionally, analog processing may consume power to amplify/attenuate and/or synthesize intermediate signals and waveforms. Examples of analog signal processing include without limitation: amplification/attenuation, filtering, modulation/demodulation, signal conditioning, analog-to-digital (ADC)/digital-to-analog (DAC) conversion, automatic gain/frequency control (AGC/AFC), waveform synthesis, voltage/current regulation, mixing, phase shifting, isolation, equalization, and/or any other such operation. Analog signal processing is commonly used in sensors, telecommunications, audio processing, instrumentation, control, and any number of digital signal processing applications.

In one embodiment, the load subsystem 1402 includes a signal processor that switches between operational modes (enables/disables circuitry) to perform signal processing. For example, a multicore processor may shift processing burden between cores (disabling a first core, transferring data, enabling a second core). Similarly, a processor may enable/disable processing elements between different power states (idle, low power, sleep, etc.). As another example, modems often wake-up to respond to communication requests (which could occur at any time), and sleep to save power when not in use.

As a related corollary, in "fixed-width" processing embodiments, data is processed using a fixed number of bits, such as 8, 16, 32, or 64 bits, etc. However, some embodiments may support "variable-width" processing and/or variable-length encoding which dynamically adjust the number of bits used to represent and process data based on the needs of a particular computation. This can be particularly useful for computational and/or memory efficiency. In other words, unnecessary computations may be avoided and/or unnecessary precision can be disregarded (e.g., saving memory space, reducing data transfers, etc.). Variable-width processing may be particularly useful in applications where lossy data is acceptable; examples include communication protocols, media playback, and/or neural network computing.

In one embodiment, the load subsystem 1402 includes a signal processor that adjusts the operation of its gate-level circuitry. As a brief aside, gate-level circuitry refers to digital electronic circuits at the most fundamental level, where digital signals are represented with electrical voltages and drive currents (e.g., a Boolean "o" corresponds to GND voltage, a Boolean "1" corresponds to VCC voltage, etc.). So-called combinatorial logic emulates logical gates (e.g., AND gates, OR gates, NOT gates, NAND gates, NOR gates, XOR gates, XNOR gates, etc.). One example of an operational change that affects the power consumption of the signal processor is the voltage level (which may affect the robustness and reliability of transitions between logical levels). Sequential gates store logical values as electrical charges (e.g., registers, flip-flops, memory, and/or any other non-transitory computer-readable media). Operational changes that affect sequential gate logic include clock rate and/or drive current; in some cases, increasing/decreasing drive current may be used to enable faster clock rates and/or longer signaling distances.

The aforementioned techniques (switching operational modes, changing gate-level circuitry, and/or changing data sizes) are used in many computing devices including without limitation e.g., controllers, general-purpose processors, graphics processors (GPUs), neural network processors (NPUs), image signal processors (ISPs), digital signal processors (DSPs), modems, networking processors, field programmable gate arrays (FPGAs), codecs, application specific integrated circuits (ASICs), and/or any other semiconductor logic. Such computing devices may be combined with other circuitry (e.g., data storage circuitry, sensors, other signal processing components) on one or more printed circuit boards (PCBs) within a device. Such components are often found in devices such as: computers, smartphones, laptops, terminals, servers, workstations, etc. While the foregoing discussion is primarily presented in the context of embedded and portable devices, the concepts may be broadly applied to any signal processing application that may need to dynamically adjust operation based on its power source.

13.3 Energy Transfer Components

Aspects of the present disclosure may be used in conjunction with energy transfer applications. Energy transfer technologies move energy from one device to another device, or store energy in another form for storage/delivery. The conservation of energy is a fundamental principle of physics that prevents energy from being created or destroyed in a closed system (e.g., the energy donor and energy recipient), however practical implementations have some efficiency losses due thermal waste, frictional losses, etc. Examples of energy transfer applications include for example: charging a battery, wireless power transfer, etc.

The energy transfer techniques described above are used in portable chargers, battery packs, power banks, jump starters, generators, and/or other power sources. In many cases, these devices may charge other devices such as smartphones, laptops, cameras, hand tools, power tools, car batteries, and/or other powered devices. These power storage devices are commonly used by working professionals, travelers, outdoor enthusiasts, and/or any other work application where access to power is limited. In one embodiment, the load subsystem 1402 of the exemplary lighting system 1400 delivers power to another device (e.g., an attached device, an external sensor, etc.). For example, the exemplary lighting system 1400 may provide energy to another device (or devices) via a wired or wireless interface. Examples of wired interfaces include, without limitation: Universal Serial Bus (USB) and its derivatives, Lightning®/Magsafe®, charging contacts and charging rings, and any other proprietary charging interfaces, barrel connectors and AC plugs, etc. Wireless charging interfaces include, without limitation: inductive charging, magnetic resonance charging, RF charging, ultrasonic charging, beamforming and/or resonant coupling, etc. In some examples the exemplary lighting system 1400 may provide energy to multiple external devices.

14 User Interface Subsystem

Functionally, the user interface subsystem 1404 conveys (outputs) information to the user in visual, audible, and/or haptic form. Similarly, the user inputs information via physical or virtual interactions. The following discussions provide several illustrative embodiments of user interfaces, however, artisans of ordinary skill in the related arts given the contents of the present disclosure will readily appreciate that the virtually any user interface may be substituted with equal success.

User interfaces often incorporate mechanical elements including, without limitation: buttons, switches, knobs, levers, dials, joysticks, keyboards, mice, pedals, handles, and/or any other physical components that users may interact with to provide information to the system. For example, a user may press a physical button, click on an icon using a mouse, input text via a keyboard, etc.

For example, a touch sensor/proximity detector may be used to determine the touch/presence of a user. The touch sensor/proximity detector may be used to select or alter the mode of operation. In another example, a button or array of buttons may be interacted with to change the mode of operation. Holding the button down (depressed) may be used to determine the touch/presence of a user or to indicate the user wishes to manually override certain safety operations (e.g., temperature/distance checking.)

Multiple input devices may be used in combination to perform certain operations. For example, setting the light output for a constant lighting mode may include pressing the button and touching the touch sensor.

User interfaces often incorporate visual elements, including without limitation: light emitting diodes (LEDs) and variants (e.g., OLEDs, MicroLEDs, etc.), liquid crystal displays (LCDs) and their variants (quantum dot displays (QLED), etc.), e-paper, cathode ray tube (CRT), projection displays, etc. In many cases, these visual elements may be used alone, or in conjunction with other modalities of input/output, for communication. As but one example, a set of light emitting diodes (LEDs) may be used to convey the estimated remaining voltage and charge of a corresponding set of batteries, based on position, color, intensity of illumination, and/or rate of blinking, etc. As another example, a graphical user interface using a virtual "desktop" may be displayed on a screen or touchscreen. The user may interact with icons on the desktop using a mouse and input text commands with a keyboard to see current power status (e.g., clicking on a battery icon opens a current estimated remaining voltage and charge for each battery, etc.).

Some user interfaces incorporate sound and/or audible information. For example, sounds and/or audio may be presented to the user (or captured) via a microphone and speaker assembly. In some situations, the user may be able to interact with the device via voice commands to enable hands-free operation.

Certain user interfaces incorporate motion and/or spatial information. For example, rumble boxes and/or other vibration media may provide haptic signaling. Cameras, accelerometers, gyroscopes, and/or magnetometers may be used to sense the user's physical motion and/or orientation to enable gesture-based inputs.

Most user interfaces incorporate multiple modalities of input. For example, augmented reality (AR) and/or virtual reality (VR) environments have been used in head-mounted apparatus (helmet, glasses, etc.). Such devices often incorporate visual, audio, and/or haptic information to the user.

Within the context of the present disclosure, system status and user feedback may be provided to/from the user via the user interface subsystem 1404 (controlled by the control and data subsystem 1408).

15 Sensor Subsystem

Functionally, the sensor subsystem 1410 detects changes to or the state of the device, the environment, or the output of another system. The sensor subsystem 1410 may convert a physical phenomenon into a voltage (e.g., an analog voltage/digital signal) as input to the control and data subsystem 1408 and/or the user via the user interface subsystem 1404. Sensors input may be used as part of the user interface subsystem 1404 to determine user movement, gestures, etc. as inputs to the exemplary lighting system 1400. The following discussions provide several illustrative embodiments of sensors, however, artisans of ordinary skill in the related arts given the contents of the present disclosure will readily appreciate that the virtually any sensor may be substituted.

The sensor subsystem 1410 may include sensors to detect the state of the device. These may include distance sensors, temperature sensors, voltage sensors, proximity sensors, etc.

Distance sensors may be used to detect the distance to an object/target (as described above). Distance sensors may include devices that detect/measure emit a pulse or signal (laser, IR), receive a corresponding pulse or signal reflected off a target, determine the time difference between emitting and receiving the pulse/signal and the corresponding pulse/signal to determine a distance. Other distance sensors may use multiple images (taken at different angles or times) to determine the distance. The determined distance is then converted into an electrical signal.

In some examples, the lumen output of the LEDs may be reduced when the distance to a target object/area is detected as being within a distance threshold (and the current lumen output is above a light threshold) and raised when above the distance threshold in certain modes of operation (e.g., in an extreme lighting mode). In other examples, the LEDs or the exemplary lighting system 1400 is powered off when the distance to a target object/area is detected as being within the distance threshold (and the current lumen output is above a light threshold).

Temperature sensors may be used to detect the temperature of objects (as described above). Some temperature sensors may detect the temperature of objects in contact with the sensor (e.g., within the exemplary lighting system 1400) while others are able to detect the temperature of objects remote from (e.g., not in contact with) the temperature sensor (e.g., external objects/areas). Temperature sensors may include devices that detect/measure heat and convert the measurement into an electrical signal. In some examples, temperature sensors measure radiation (e.g., IR radiation) emitted by an object. In other examples, a voltage may be detected across a diode to determine a resistance. Since the resistance of the diode varies proportionally to a change in temperature, temperature may be determined based on, e.g., by converting, the voltage reading. In further examples, dissimilar materials (e.g., two metals) that have different expansion/contraction properties, are used to determine a temperature/a change in temperature. For example, in a vibrating wire temperature meter, a stretched magnetic wire with two ends fixed to the dissimilar metals can detect changes in temperature based on a change in the vibrations of the wire. This may be due to a change in tensile strength of the wire because of the expansion/contraction of the metals. In another example, a thermocouple may sense temperature changes by detecting a voltage where dissimilar metals are joined at the point of connection.

Temperature sensors may be used to measure the temperature of components in the exemplary lighting system 1400. In some examples, the temperature of LEDs or a LED assembly may be monitored via a temperature sensor. In other examples, the temperature of the handle/a housing of the exemplary lighting system 1400 may be monitored via a temperature sensor. In further examples, the temperature of internal circuitry of the exemplary lighting system 1400 may be monitored via a temperature sensor. In this example, the temperature of the handle/housing of the exemplary lighting system 1400 may be estimated/calculated based on the temperature of the internal circuitry.

In some examples, the lumen output of the LEDs may be reduced when the temperature is detected as being at or above a temperature threshold and raised when at or below another temperature threshold in certain modes of operation (e.g., in an extreme lighting mode). The lumen output may be increased or decreased after the temperature is above/below the temperature threshold for a particular period of time (or after a certain number of readings of the temperature sensor above/below the temperature threshold). In other examples, the LEDs or the exemplary lighting system 1400 is powered off when the temperature is detected above the threshold. Active cooling e.g., with a fan/refrigerant, may be used to cool the LEDs/handle/housing/circuitry when the temperature detected is above the threshold.

A voltage sensor is a sensor used to monitor, calculate, or determine a voltage supply. Voltage sensors may be able to determine the voltage level of alternating current (AC) or direct current (DC) power sources. The input of voltage sensors may include positive and negative wires/pins. Output may include analog or digital data about the voltage. For example, output may include analog voltage signals, switches, audible signals, analog current levels, frequency, or frequency-modulated outputs. Two classes of voltage sensors include resistive types and capacitive types. Voltage sensors may include a voltage divider and bridge where voltage is separated. In resistive type voltage sensors, multiple resistors (e.g., a static resistor providing a reference voltage and a variable resistor) may be used to sense the difference of voltage based on the difference in the resistance of the resistors. In capacitive type voltage sensors, multiple capacitors may be used to sense the difference in capacitance to indicate the voltage.

Voltage sensors may be used to detect power failures and faults, the addition or changing of a load, to control temperature, to control power demand, and to determine the amount of charge remains in power sources. The exemplary lighting system 1400 may adjust, in certain operating modes due to voltage sensor readings. For example, the voltage of a power source (e.g., a battery) may be used to determine the remaining battery which may be used to activate low power modes; power faults may be detected to turn off the exemplary lighting system 1400 to preserve components during a fault, etc.

Light sensors, including ambient light sensors (ALS), measure the brightness of light (lux) incident on a surface. ALS may be configured to be sensitive to radiation within the range of human vision (approximately 300-1100 nm). In some examples, an ALS may be constructed using a silicon photodiode that converts light to an electrical signal using the photoelectric effect based on a generated electron flow (current) that may be measured. The silicon photodiode may include filters to block certain wavelengths of radiation, such as ultra-violet and infra-red. In some exemplary applications, a camera or photocell may be used as an ALS.

In some examples, an ALS may be used to measure the light in the environment near the exemplary lighting system 1400. The exemplary lighting system 1400 may adjust, in certain operating modes (e.g., an automatic lighting mode), the brightness and/or color temperature of the LEDs of the exemplary lighting system 1400 in response to the determined brightness or color temperature detected by the ALS. LEDs may be powered on when an ALS detects below a certain threshold amount of light.

Inertial sensors may be used to measure the motion of an object (e.g., the exemplary lighting system 1400) with respect to an inertial reference frame. Inertial sensors may include gyroscopes, accelerometers, magnetometers, and barometers. The number of axes an inertial sensor may detect is based on the number of different measurements over a number (e.g., 1-3) of different axes. Accelerometers may be used to detect linear acceleration. Gyroscopes may be used to detect a rotational rate. Magnetometers may detect a magnetic field and be used to determine a magnetic field (e.g., of the earth) for use, e.g., as a heading reference. In some examples, an inertial sensor may include one accelerometer, gyroscope, and magnetometer per axis for each of the three principal axes: pitch, roll and yaw.

In some examples, inertial sensors may be used to determine movement of the device and calculating position and velocity (via, e.g., dead reckoning). The exemplary lighting system 1400 may adjust, in certain operating modes brightness/operating mode when the device is moving or not moving (e.g., going to or out of an idle mode) after a certain threshold of time elapses without movement. Gestures may be determined by the exemplary lighting system 1400 using inertial sensor data to determine user input. Accordingly, operating modes may be determined or altered based on these determined gestures. Gestures may include shaking the device, spinning the device, tossing the device, etc. in particular directions or a certain number of times.

Motion sensors detect the motion of objects in a specific area. A Passive Infrared (PIR) motion sensor is a device that detects motion by measuring changes in infrared radiation caused by the movement of warm objects. PIR sensors are called "passive" because they do not emit any energy on its own; rather PIR sensors simply detect the infrared radiation emitted or reflected by other objects. Microwave motion detection operates by emitting continuous microwave signals into the monitored area and analyzing the reflections caused by moving objects. The motion detection sensor contains a transmitter that emits microwave signals, typically in the gigahertz (e.g., 10.525 GHz) range, and a receiver that captures the reflected signals. When there is no motion, the emitted and received signals match, indicating a static environment. However, when an object enters the monitored zone and disrupts the microwave pattern, the sensor detects a Doppler shift in the reflected signals due to the object's movement. The Doppler shift is caused by the change in frequency as the object approaches or moves away from the sensor. The sensor's electronics analyze these frequency changes to determine the speed, direction, and presence of motion. Different types of motion sensors may be used to detect motion in various directions and through objects (e.g., walls) by blocking or allowing the signal to pass through.

In some examples, motion detectors may be used to turn on or off lights when motion is detected or change the mode of operation based on the amount, type, and distance to the detected motion. For example, the brightness of the LED may be increased when motion is detected nearer (or farther from) the exemplary lighting system 1400.

Global positioning/navigation sensors include receivers that may receive and track signals from one or more Global Navigation Satellite System (GNSS)/Global Positioning System (GPS) satellites in a constellation. These messages may include time information, satellite status/health information, satellite orbit data, etc. This data may be decoded to determine the position, velocity, and time of the receiving device (e.g., the exemplary lighting system 1400) in combination with the messages from other satellites in the constellation.

In some examples, timing information may be used to power on/off the device (e.g. at a particular time of day or with respect to an astronomical event, e.g., sunrise or subset). Geofencing can be used to change device operation based on the determined position. For example, certain areas may not allow lighting above a certain brightness. The exemplary lighting system 1400 may limit the brightness of the LED in those areas.

Within the context of the present disclosure, sensor data may be used as part of the user interface subsystem 1404 and may be used or interpreted by the control and data subsystem 1408.

16 Power Subsystem

As a brief aside, a "closed" electrical circuit provides a path for electric current to flow from a power source across a load; an "open" electrical circuit means that the path from a power source to a load has a gap which prevents the flow of electrical current. As previously alluded to, early electronics were designed for just a single power source and often directly connected power sources to the load, e.g., a battery might directly drive a bulb. Selectively providing power from multiple different power sources requires careful management of both the load requirements and the source output to prevent e.g., voltage/current mismatch, chemistry rate mismatch, capacity mismatch, etc.

Functionally, the power subsystem 1406 connects one or more power sources to the load subsystem 1402. In addition, the power subsystem 1406 may also provide conditioning to compensate for differences between the required and provisioned electrical characteristics. For example, the power subsystem 1406 may ensure that the voltage and current provided from the selected batteries, solar cell, fuel generator, outlet, charging device, etc. match the load requirements in terms of nominal values, rate of use, frequency, etc.

Much like the load subsystem 1402, the power sources of a power subsystem 1406 may also be characterized with source parameters. For example, source parameters for a battery might include its nominal voltage, maximum/minimum voltage, maximum current draw, etc. As a practical matter, many types of power sources do not provide information about their internal operations; for example, a battery may have a nominal voltage but the remaining charge is unknown. Similarly, a solar cell might provide power according to light which may vary, or an AC wall circuit might be shared with other loads.

Various embodiments of the present disclosure further characterize the power sources of a power subsystem with characteristic functions. As used herein, the term "characteristic function" and its linguistic derivatives refers to a relationship between known and unknown quantities. For example, the measurable initial voltage across the terminals of a battery may be used to estimate the unknown remaining charge of the battery. Similarly, the voltage/current and/or line noise of an AC power supply may be used to characterize the unknown loads that are sharing the circuit, etc. Characteristic functions may be empirically determined, based on historic data, defined by manufacturer, user, vendor, etc. More directly, any technique for estimating an unknown quantity from observable quantities maybe substituted with equal success.

16.1 Power Sources and Storage

Power sources may be characterized by their output voltage and maximum supported current draw. As previously noted, power sources cannot provide voltage/current according to idealized curves. For example, a typical battery may have been specified to a nominal voltage and total capacity (number of Coulombs), however, limitations of the battery chemistry and parasitic impedances will affect the actual maximum output current. Similar limitations exist for other forms of power generation (e.g., solar power, outlet power, fuel cells, etc.). Thus, different power sources may have different utility for meeting the dynamic needs of the load subsystem.

16.1.1 Single-Use and Rechargeable Batteries

Compared to rechargeable batteries, single-use batteries store charge longer in extreme temperatures and when not in use (the so-called "self-discharge rate" is the rate at which the stored charge in a battery is reduced due to internal chemical reactions of the battery). Certain types of alkaline batteries, for example, have a shelf life of ten years. Single-use batteries are therefore well suited for emergency-use applications.

Single-use batteries must be replaced after use, thus a cost comparison of single-use batteries and their rechargeable counterparts should consider replacement cost and access to recharging power. Many high-power output products today consume single-use batteries in just a few hours, and performance is frequently inferior to rechargeable batteries at low battery life. Replacement costs can quickly eclipse the low per unit cost of single-use batteries. Further, rechargeable batteries, while having a larger up-front cost than single-use batteries, can be recharged with relatively inexpensive power from, e.g., an outlet. As a result, rechargeable batteries allow for more cost-effective use over their lifetime.

Most batteries use one or more electrochemical cells to store energy as a chemical potential between reactants. During discharge, a chemical reaction converts high-energy reactants to lower-energy products, and the free-energy difference is delivered to the external circuit as electrical energy. Rechargeable battery chemistries allow for both charging and discharging cycles (e.g., charging the cell reverses the chemical process). Batteries come in a variety of sizes and chemistries. Examples of battery chemistries include, without limitation: alkaline, lithium-ion, lead-acid, nickel-cadmium, nickel-metal hydride, lithium polymer, zinc carbon, silver-oxide, zinc-air, sodium-ion, etc. Commonly available single-use sizes include without limitation: AA, AAA, C, D, etc. Rechargeable batteries are available in the legacy cell formats, but also have new formats such as: 10440, 14500, 18650, 26500, 32600, etc.

In one embodiment, the power subsystem 1406 uses batteries to store power. In some variants, exemplary lighting system 1400 may house multiple power sources of different types and sizes. For example, exemplary lighting system 1400 may have a combination of rechargeable and single-use (dry cell) batteries. The rechargeable batteries may be removable or permanently affixed. The batteries may be stored and used in a removable battery cartridge (housing). While some battery cells may each provide approximately 1.5V, the differences in their individual capacities, discharge rates, and chemistries may be suited to certain tasks. For example, the AA cells may be useful for low intensity, short duration tasks (e.g., low illumination settings, soft background music, etc.). D cells may allow for high intensity, long duration tasks (e.g., high intensity lights, klaxon alarms, public address volumes, etc.). The rechargeable cells may be suitable to offload tasks and lengthen the usable life of the single-use cells. In some cases, the rechargeable cells may be charged in device when external power is available e.g., via holster, solar cells, AC adaptors for outlets, etc.

In some implementations, the power subsystem 1406 may incorporate internal batteries. Internal batteries are an integral part of the system's structure and are typically not removeable without e.g., specialized tools, voiding the device warranty, etc. Internal batteries are often used to e.g., support specialized power requirements, enable aggressive design form factors, incorporate proprietary technologies, and/or to reduce the cost of single-use/disposable type devices. In some implementations, the power subsystem 1406 may include housings and connection interfaces to allow for external battery connections; this allows the user to remove and replace batteries. Still other implementations may include both internal and external battery components.

While the foregoing discussion is presented in the context of electro-chemical cells, the concepts are broadly applicable to any power storage apparatus. Examples of other electro-chemical techniques include, e.g., generators and fuel cells that consume fuel to generate electrical energy. Furthermore, the power subsystem 1406 may incorporate other sources of power such as electro-optical cells (solar cells), electrical interfaces (e.g., wall socket power), and/or any other source of power.

16.1.2 Dynamic Loading of Power Sources

Some products have implemented dynamic loading capabilities-dynamic loading potentially offers better performance, longer battery life, and/or improved functionality. So-called Pulse Width Modulation (PWM) is one example of a dynamic loading strategy. Consider a PWM implementation that powers a Light Emitting Diode (LED) according to a selectable duty cycle. Specifically, the anode of the LED may be connected to the positive end of the battery source and the cathode of the LED may be connected to the drain of an N-Channel metal-oxide-semiconductor field-effect transistor (NMOSFET) switch. The source of the NMOSFET is connected to ground, and the gate is opened and closed by the PWM signal. The perceived brightness of the light is based on the duty cycle, e.g., 100% duty is the maximum brightness, 0% duty is off. Artisans of ordinary skill in the related arts will readily appreciate that other dynamic loading schemes provide similar behavior; these schemes may include e.g., Pulse Density Modulation (PDM), Pulse Amplitude Modulation (PAM), and other duty cycle-based modulation techniques.

Dynamic loading schemes may provide substantial benefits over resistive dimming alternatives. NMOSFETs do not burn power during their off cycle which reduces power consumption and heating; this allows devices to stay cooler and last longer. Also, an NMOSFET may be cheaper and smaller compared to power resistors. Unfortunately, these savings may come at the cost of voltage stability and may also increase noise in the system.

For example, lumen output (e.g., of the LEDs) of the exemplary lighting system 1400 may be modulated based on modifying the duty cycle of the power supplied to the lighting components (e.g., the LEDs).

Figure 15:
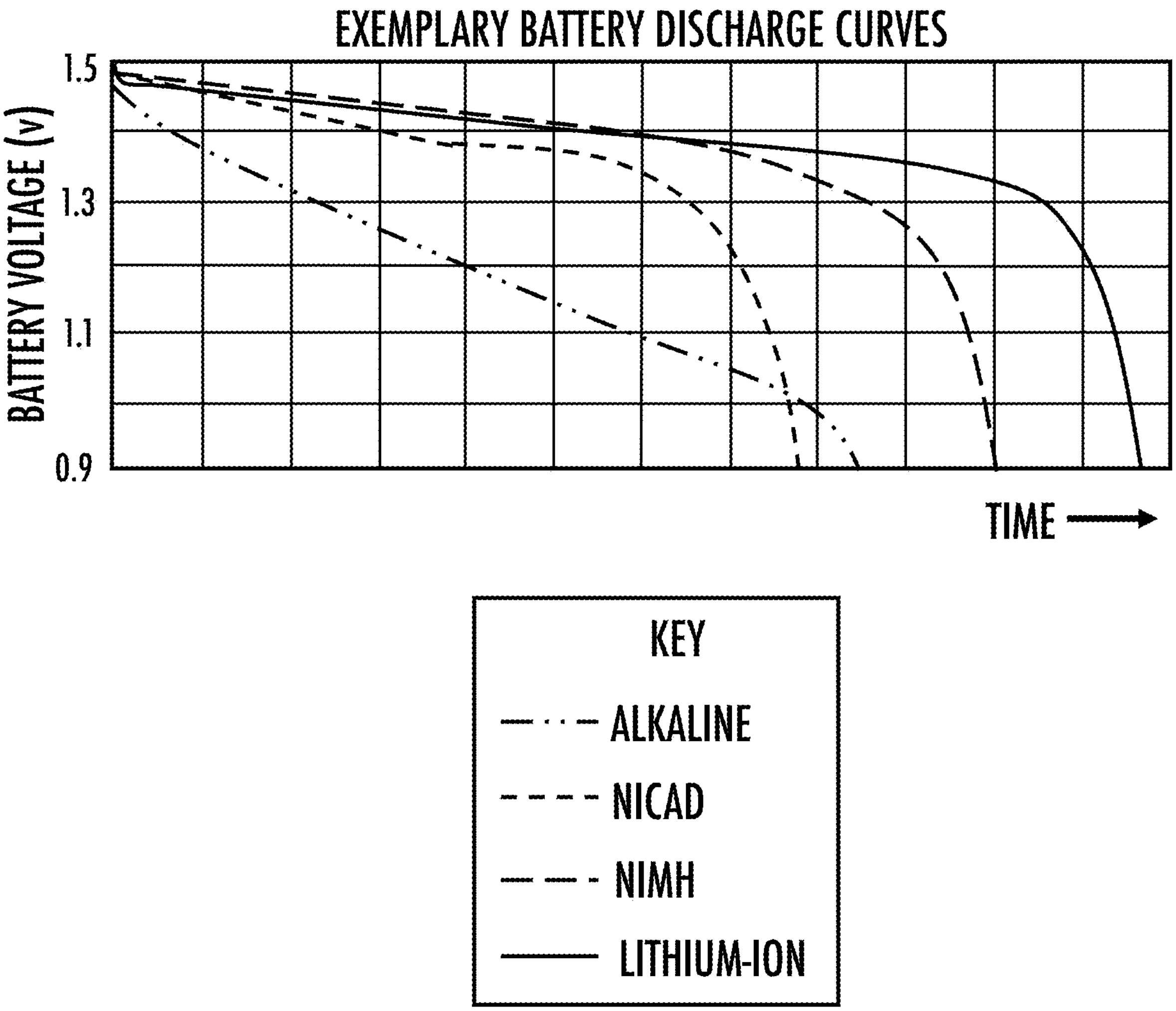
FIG. 15 is a graph illustrating exemplary discharge curves for single-use and rechargeable batteries.

FIG. 15 is a graph illustrating exemplary discharge curves for single-use and rechargeable batteries. The graph illustrates the discharge curves (voltage) of four types of battery chemistries over time of use. Alkaline manganese dioxide (alkaline) batteries are single-use batteries. Nickel-cadmium (NiCAD) batteries, nickel-metal hydride (NiMH) batteries and lithium-ion batteries are rechargeable batteries. Even though all battery chemistries lose voltage over time, alkaline batteries (which are the most popular type of single-use battery) lose voltage at an almost constant rate over the span of discharge. Rechargeable battery chemistries lose voltage at a far slower rate, and drop-off before the battery is depleted. Conventional wisdom suggests that the differences in discharge rates means that single-use and rechargeable cells should not be directly electrically coupled together, since this may cause the cells to load one another unevenly and/or may reduce output, damage the cells, and in extreme cases, cause rupture and cell leakage.

The relatively constant rate of discharge for alkaline batteries simplifies battery-life determination compared to other battery chemistries; the remaining alkaline battery life can be directly estimated based on the output voltage (when not under load). In contrast, rechargeable battery chemistries can provide a relatively more consistent voltage level but may require more complex battery life determination (e.g., based on draw, temperature, usage, etc.).

Figure 16:
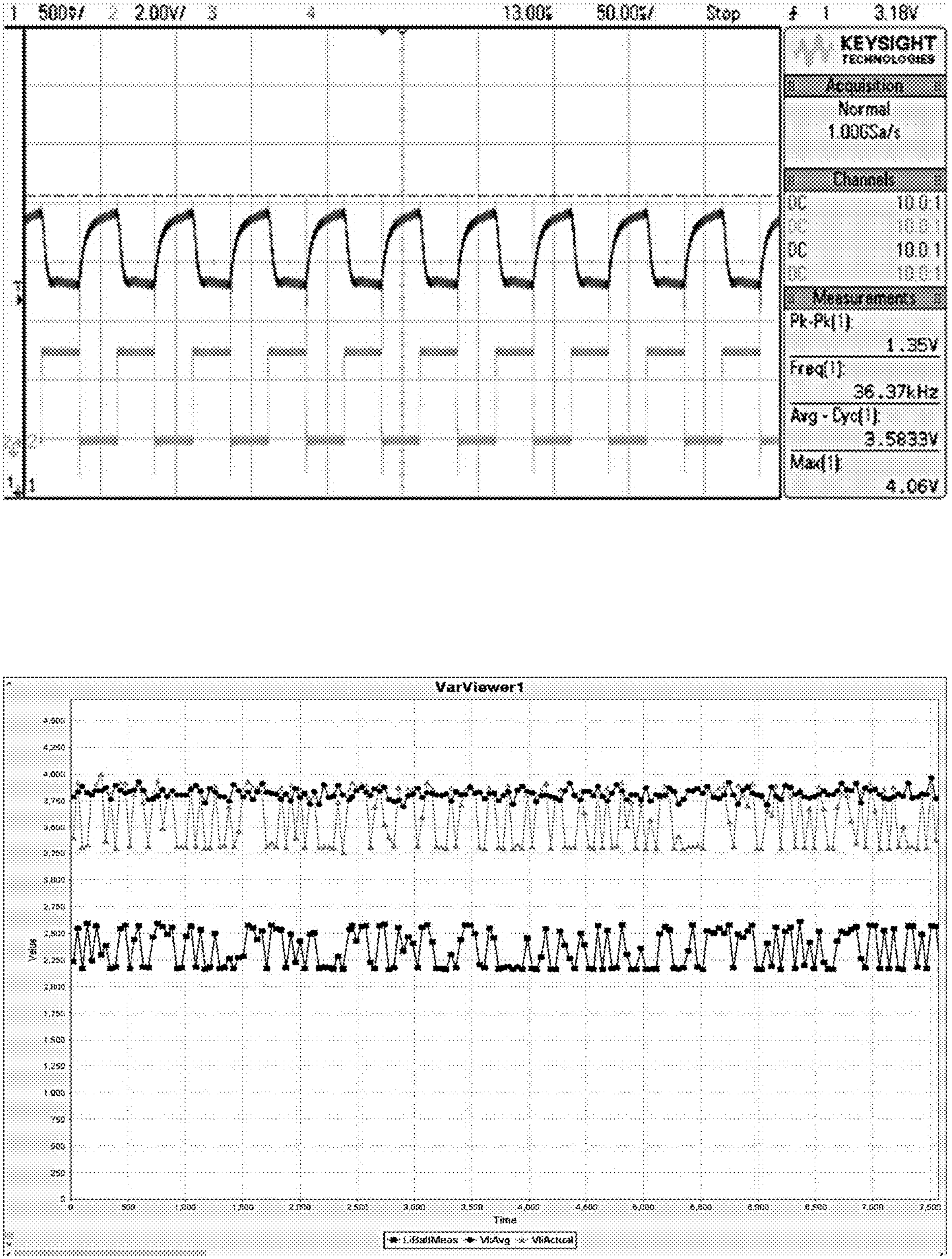
FIG. 16 illustrates voltage measurements for a Pulse Width Modulated (PWM) Light Emitting Diode (LED), useful to illustrate battery capacity measurements under dynamic loading conditions.

FIG. 16 shows a PWM LED implementation useful to illustrate battery capacity measurements under dynamic loading conditions. As shown, an NMOSFET gate is driven on/off at a 50% duty cycle. The battery and circuitry may also have internal resistances (R) and capacitances (C) which affect the rising and falling edges; for example, a square wave input will generate a rounded wave as the resistor-capacitor (RC) circuit charges and discharges (this effect may also be referred to as "$1^{st}$ order decay").

Battery capacity can be accurately measured based on Coulomb counting and battery voltage measurements. Unfortunately, these solutions are often cost prohibitive for low-cost applications. More cost-effective alternatives estimate the remaining charge based on the known discharge curve of the battery chemistry (such as was depicted in FIG. 5) and voltage measurements (using an analog digital converter (ADC)). Historically, most low-cost devices are designed for static loading, thus estimation has been an acceptable design choice.

Notably, static estimation techniques cannot be used under dynamic loading, since voltage is directly affected by the load (e.g., V=iR, i=C dV/dt, and/or any impedance.) A PWM driven NMOSFET results in highly variable voltage readings that present a challenge in estimating remaining battery capacity. As shown in FIG. 6, directly sampling the 50% duty cycle may capture an off-phase or the RC decay. Typically, measurements at ~50% duty cycle have the maximum amount of variation in the battery voltage; however, this may also vary based on current draw, sampling rate, etc. For example, large swings in current draw may cause erratic RC decay readings; similarly, irregular voltage sampling may coincidentally capture more off-phase measurements.

One scheme for dynamically estimating remaining battery capacity compares a "rolling window" of voltage measurements against characteristic discharge cycles for different duty cycles. The sampling rate of the battery measurement circuitry and the duty cycle are unlikely to exactly align. Different frequencies are orthogonal to one another within the frequency domain and will constructively and destructively interfere with one another according to a "beat frequency." However, time averaging the varying voltage can be used to filter out the non-DC (direct current) frequencies, leaving only a non-zero DC voltage. Even though the non-zero voltage is not a direct measurement of voltage, it may be used to characterize the voltage discharge curve for that combination of duty cycle and sample rate. While the foregoing technique uses a rolling window calculation, artisans of ordinary skill in the related arts will readily appreciate that a variety of other calculations may be substituted with equal success. Such other techniques may include time averaging, filtering, root-mean-square calculations, multiply-accumulate, and/or any other calculation that generates a characteristic non-zero value for a dynamic input.

More directly, battery voltage measurement data may be taken during a full discharge cycle at several different fixed PWM duty cycle values. Then, a "characteristic function" that describes the relationship between measured voltage and remaining battery capacity is determined based on one or more of: duty cycle, sample rate, battery chemistry, battery numerosity, battery configuration (parallel, series, etc.), or any other operational parameter. The characteristic functions can be stored within a device to enable subsequent determination of the specific battery capacity threshold based on the measured voltage.

In one embodiment, battery capacity estimation based on characteristic functions can be used within a holster or a flashlight. In such implementations, characteristic functions may be stored into the monitoring logic for battery capacity estimation. Specifically, the characteristic functions are measured and calculated for the exemplary lighting system 1400, at 100%, 75%, 50% and 25% duty cycles using a specified sample rate (e.g., ~40 Hz). The characteristic functions correspond to each of the different battery types used by the exemplary lighting system 1400—for example, each of the 3.7V lithium-ion batteries (rechargeable) or dry cell/single use batteries would have different characteristic functions. During operation, the monitoring logic may determine its battery configuration and collect time averaged battery voltage measurements. The monitoring logic may use the measured voltage to look-up the estimated remaining battery capacity based on the specific characteristic function for the duty cycle, sample rate, battery configuration, operational mode, and/or any other relevant parameter. The estimated remaining battery capacity may also be used to calculate a rate of change in the remaining battery capacity—this rate of change corresponds to the estimated current draw. The estimated remaining battery capacity and rate of change are collectively referred to throughout as the "usage estimates." The usage estimates can be provided to the user via user interface logic used to, e.g., indicate the remaining capacity and/or current draw on the indicator LEDs. In some variants, the monitoring logic may also inform the power management logic; for example, the remaining capacity and/or current draw may be used by the power management logic to select an appropriate power source.

In one specific variant, the time averaged battery voltage measurements are calculated over a rolling window of values (e.g., 4, 8, 16, 32-value average, etc.). Some battery chemistries exhibit misleading behavior based on load and/or environmental factors. For example, certain types of batteries may have a "false" recovery that results in a higher resting voltage; however, the voltage rapidly drops to a more representative voltage under load. In other cases, batteries may have a different characteristic voltage based on ambient temperature, humidity, atmospheric pressure, etc. In some variants, the device logic (hardware, firmware, or software) may use a "ratcheting" level that prevents misleading behavior of calculating remaining charge in the battery. In other words, the indicator LEDs cannot display a rise above a breached lower threshold until e.g., a battery has been changed/recharged or otherwise reset. For example, once the remaining capacity has fallen from 75% to 50%, the device logic will cap the subsequent readings to 50%. The device logic will only re-enable the 100% and 75% levels after a power cycle, batteries change (or charged), etc.

In some embodiments, the user interface logic provides a continuous read-out (to, e.g., the indicator LEDs). Other embodiments may allow the user to selectively check the battery usage estimates only "as-needed." For example, all LED rows may be only momentarily lit when the user presses the ON switch (e.g., power switch), or a user may be able to individually check the power for only one of the power sources (e.g., a small push button may allow a user to check the status of the battery, etc.). Still other implementations may allow display status briefly at the start of and/or periodically during, a specific operating mode.

More generally, the user interface logic of the PCB and indicator LEDs allows a user to determine the ongoing usage and remaining capacity for any one of the power sources. In some cases, the user may be alerted as to when to change batteries, switch power sources, and/or reduce usage. While the foregoing discussion is presented in the context of a specific arrangement and/or color code of LEDs, other arrangements/color codes, as well as other user interface schemes (e.g. audible and/or haptic) may be substituted with equal success (as discussed above with respect to indicator LEDs).

While the foregoing discussion is presented in the context of a specific arrangement and/or color code of LEDs, other arrangements/color codes may be substituted with equal success. Notably, any number of LEDs may be used to signify capacity according to any specific granularity. As one example, 10 LEDs may be used to provide 10% increments (a linear scale). In another example, 4 LEDs may be used to provide logarithmic scale increments (e.g., 10%, 25%, 50%, 100%). Different colors may also be used e.g., red, orange, yellow, green, blue, indigo, violet, etc. to represent different current draws. Still other variants may switch the representation e.g., the color may indicate the percentage left, the number of lit LEDs may represent the current draw.

While the foregoing is described in the context of an on-device visual display, other user interface schemes may be substituted with equal success. In some cases, the notifications may be audible and/or haptic. For example, beeps at different note pitches may be used to convey usage estimates. As but one such example, the number of beeps may indicate remaining capacity e.g., four beeps may indicate 100%, three beeps may indicate 75%, etc. The pitch of the beeps may indicate current draw e.g., 440 Hz (A4 note) may indicate low/no draw, 523.25 Hz (C5 note) may indicate moderate draw, etc. As another example, a "rumble box" may use similar numerosity/frequency schemes to convey information in a tactile modality. In yet other schemes, usage estimates may be wirelessly transmitted to a remote device (smart phone or laptop) that can remotely notify the user according to an application user interface. A wide variety of other user experience (UX) may be substituted with equal success.

16.2 Protection Circuitry

Dynamic loading may introduce undesirable harmonics in either the power sources themselves or the load they are connected to. As a related note, AC power from wall outlets may have residual harmonics and/or noise (which may even survive AC/DC conversion). Examples of undesirable effects that may be introduced by harmonics may include e.g., overshoot/undershoot, noise, interference, fluctuations, etc. In a separate but related tangent, directly coupling different power sources together (without additional power management logic) may create voltage mismatches that damage other circuitry or lead to cell premature failure, excessive discharge, overheating, leakage, and eventually rupture. In view of these issues, power conditioning circuitry may be used to protect the load subsystem 1402 and/or protection circuitry may be used to protect the power sources from one another.

Various embodiments of the present disclosure may incorporate power conditioning techniques to ensure that sourced power does not exceed acceptable tolerances, the rate of change does not exceed acceptable tolerances, and has (or does not have) certain frequency characteristics. As but one example, voltage and/or current regulation may ensure that overvoltage/undervoltage does not damage the load subsystem. Furthermore, additional resistance, capacitance, and/or inductance may be added to filter out problematic resonant frequencies. Non-linear components (such as Zener diodes, etc.) may also be used to ensure that excess power is diverted from sensitive circuits.

Certain harmonics may interfere with the normal operation of internal (or external) circuits. For example, duty cycle-based circuitry may introduce noise into the clocking signals of a nearby processor resulting in timing errors, etc. In some cases, certain frequencies are necessary for circuit operation. For example, some clock circuitry may use 60 Hz (from AC outlet power) to calculate timing; but synthesizing a 60 Hz power signal from battery-based power sources may not match the expected frequency content. Thus, frequency regulation may be used to stabilize frequencies, or synthesize additional frequencies.

More generally, artisans of ordinary skill in the related arts, given the contents of the present disclosure, will readily appreciate that any number of different power conditioning circuits may be used to clean and stabilize output power. Functionally, such conditioning circuits may e.g., regulate voltage, suppress transients, regulate frequencies, filter harmonics, filter noise, convert between voltage/current, etc.

16.3 Other Power Source Considerations

As a brief aside, alternating current (AC) and direct current (DC) are two fundamentally different ways of transmitting and using electrical energy. AC voltage periodically reverses direction. It continuously alternates between positive and negative cycles, creating a sinusoidal waveform. In contrast, DC voltage is unidirectional, meaning it flows in a constant direction from positive to negative terminals. AC is typically used for transmission and distribution because it can be easily transformed into different voltage levels using transformers. It is also used in most household and commercial electrical systems because it is easy to generate and distribute. Conversely, DC circuits are generally simpler; for example, a DC motor can vary speed and provides consistent torque (both of which are difficult to do with AC motors). DC circuits are commonly used in hand tools, electronic devices (like smartphones and laptops), automotive systems, and some specialized applications like solar photovoltaic systems.

In some embodiments, the exemplary lighting system 1400 may incorporate rectifiers, inverters, and/or transformers. A rectifier may be used to convert alternating current (AC) voltage into direct current (DC) voltage. It "rectifies" the AC waveform by allowing current to flow in only one direction. An inverter does the opposite of a rectifier; it "inverts" DC voltage into AC voltage. Inverters generate a sinusoidal or modified sine wave AC output. Transformers can be used to increase (step-up) or decrease (step-down) the voltage level of an AC voltage without changing its frequency.

Transformers have a variety of useful properties. First, transformers may be used to match the voltage of electrical equipment to the available supply voltage. For example, industrial equipment may require a specific voltage level that differs from the standard distribution voltage. Secondly, transformers may be used to match the impedance between two components of a circuit, optimizing power transfer. This is particularly important in audio systems and radio frequency applications. Thirdly, transformers can introduce a controlled phase shift between the input and output voltages. This property is used in various applications, including power factor correction and inductive coupling in electronic circuits.

Another consideration for power sources is recharging functionality. During charging operation, the power subsystem 1406 may recharge a battery (converting electrical energy to a chemical potential for storage). The charging process is typically a multi-stage process that e.g., delivers a constant current to the battery until the battery reaches a specified voltage level (a so-called "constant current" stage), deliver a constant voltage until the battery no longer consumes current (a so-called "constant voltage" stage), and maintains a low current to the battery to top-up from self-discharge (a so-called "trickle charge" stage). In some embodiments, the power subsystem 1406 can both provide power, while also concurrently charging. For example, a device that may operate from wall socket power while also using excess power to charge its batteries.

In some variants, the power subsystem 1406 may include a charging circuit that additionally monitors the charging source and destination to ensure that the charging process operates safely (overcharging can damage batteries and/or result in catastrophic failures). For example, charging circuitry may include circuitry to prevent over (and under) charging of a battery. The circuitry may include a protection circuit module (PCM) configured to manage basic safety functions of the battery including over-voltage, under-voltage, and over-current. In some cases, the PCM additionally monitors battery temperature which can be used to infer aspects of battery operation (e.g., performance, charging state, etc.). In some additional examples, the charging circuitry includes a secondary safety circuit to protect the battery from charge in the event the primary safety circuit fails.

More generally, artisans of ordinary skill in the related arts will readily appreciate that integrating multiple power sources within a single system to service a variety of dynamic loads may require additional supporting circuitry to address these differences. For example, a system may have a transformer to step-down AC power, a rectifier to convert the reduced AC power into DC power, and a charging circuit that manages the battery charging process. As another such example, an inverter may be used to convert DC power to AC power for devices that are usually used with wall outlets.

17 Control and Data Subsystem

Within the context of the present disclosure, the control and data subsystem 1408 monitors the power subsystem 1406 and/or the load subsystem 1402 and adjusts power provisioning according to the dynamic loading activity of the load subsystem 1402. The following discussions provide several illustrative embodiments of control and data subsystem 1408, however, artisans of ordinary skill in the related arts given the contents of the present disclosure will readily appreciate that the virtually any control and data logic may be substituted with equal success.

In one exemplary embodiment, the control and data subsystem 1408 may include a processor and a non-transitory computer-readable medium that stores program instructions and/or data. During operation, the processor performs several actions according to a clock. These may be logically subdivided into a "pipeline" of processing stages. For example, one exemplary pipeline might include: an instruction fetch (IF), an instruction decode (ID), an operation execution (EX), a memory access (ME), and a write back (WB). During the instruction fetch stage, an instruction is fetched from the instruction memory based on a program counter. The fetched instruction is provided to the instruction decode stage, where a control unit determines the input and output data structures and the operations to be performed. These input and output data structures and operations are executed by an execution stage. For example, an instruction (LOAD R1, ADDR1) may instruct the execution stage to "load" a first register R1 of registers with the data stored at address ADDR1. In some cases, the result of the operation may be written to a data memory and/or written back to the registers or program counter.

Artisans of ordinary skill in the related arts will readily appreciate that the techniques described throughout are not limited to the basic processor architecture and that more complex processor architectures may be substituted with equal success. Most processor architectures implement e.g., different pipeline depths, parallel processing, more sophisticated execution logic, multi-cycle execution, and/or power management, etc.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: best-effort operating system (OS) functionality (power management, UX), memory management, etc. Typically, such CPUs are selected to have relatively short pipelining, longer words (e.g., 32-bit, 64-bit, and/or superscalar words), and/or addressable space that can access both local cache memory and/or pages of system virtual memory. More directly, a CPU may often switch between tasks, and must account for branch disruption and/or arbitrary memory access.

As another example, a microcontroller may be suitable for embedded applications of known complexity. Microcontroller operations may include, without limitation: real-time operating system (OS) functionality, direct memory access (DMA) based hardware control, etc. Typically, microcontrollers are selected to have relatively short pipelining, short words (e.g., 8-bit, 16-bit, etc.), and/or fixed physical addressable space that may be shared with hardware peripherals. Typically, a microcontroller may be used with static/semi-static firmware that is application specific.

Application specific integrated circuits (ASICs) and field-programmable gate arrays (FPGAs) are other "dedicated logic" technologies that can provide suitable control and data processing. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0#b'11 and setting all other locations to be "0" the 2-input LUT emulates an AND gate. Conversely, by storing "0" into the location of 0#b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

17.1 Power Source Selection and Monitoring Logic

Figure 17:
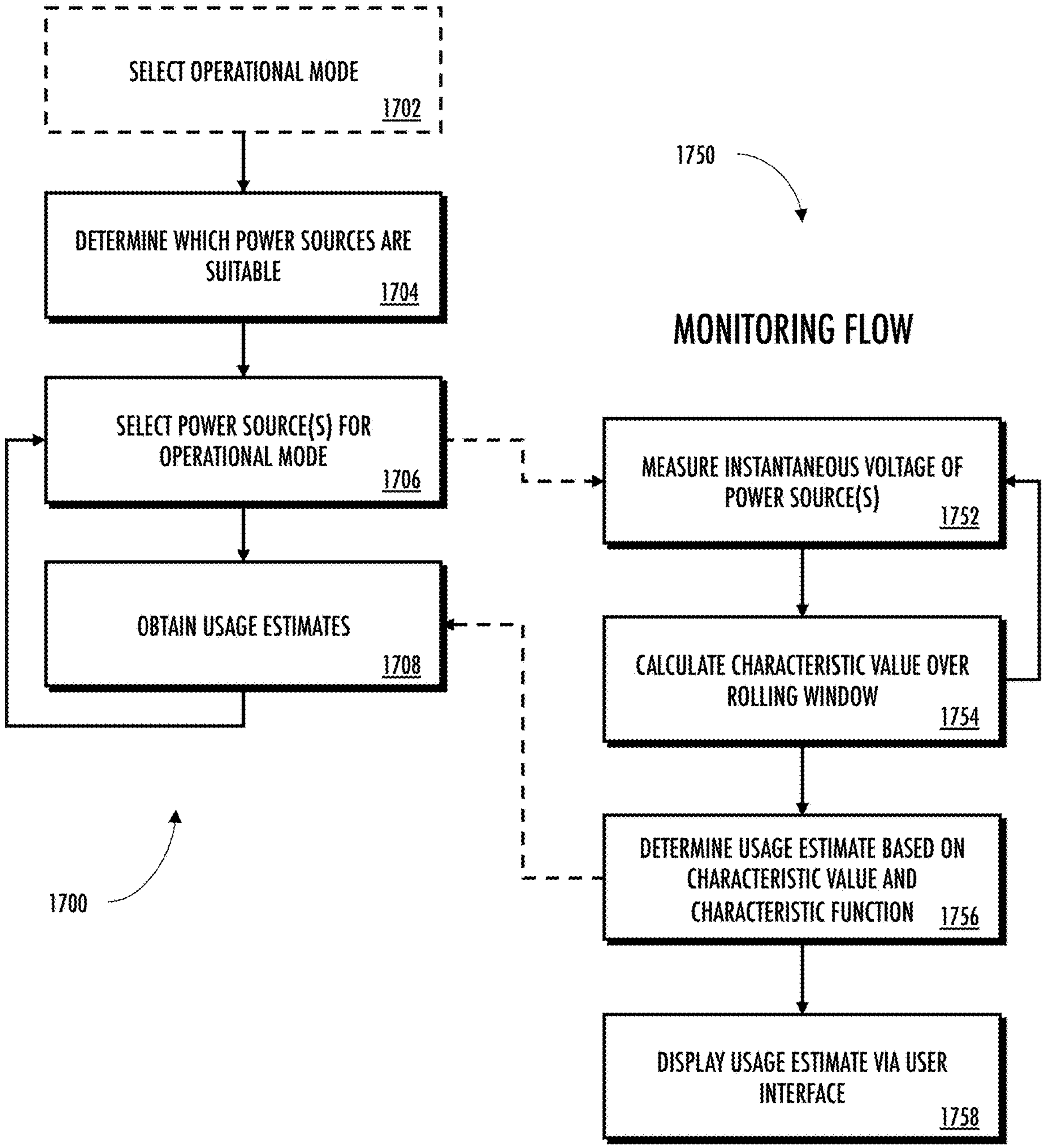
FIG. 17 illustrates logical flow diagrams of methods for power management and monitoring in accordance with the various techniques described herein.

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., power management instructions 1700, and monitoring instructions 1750 of FIG. 17) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of two separate processes, the processes may be combined into a single process or further subdivided into three or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the power management instructions 1700, a user selects one or more operational modes from a plurality of operational modes (step 1702). As previously noted, operational modes may include lighting modes, charging modes, data transfer/playback modes, and/or any other set of active functions. In some embodiments, the operational modes may be selected based on user selection. For example, a user may manually select between USB charging and/or lighting using switches, buttons, or other user interface components. In other embodiments, the operational modes may be selected based on the power management logic's internal heuristics and/or configuration.

For instance, the power management logic may automatically charge connected devices (e.g., the batteries, external devices), plugged devices (e.g., after USB enumeration procedures, etc.) and/or automatically enable/disable lighting based on motion activation, ambient light detection, etc. Accordingly, power management logic may determine the loads needing power including internal loads (e.g., a lighting assembly, indicator LEDs, processing/charging circuitry) and external loads (e.g., external sensors, external devices to charge or power, etc.). In some cases, the power management logic may prevent certain operational modes—for example, high current drain lighting may disable external charging, or with low remaining battery charge reduce the brightness of or disable certain types of lighting and/or vice versa.

Power management logic may include detecting and/or monitoring connected (or disconnected) loads. For example, an external device or sensor may be connected to the lighting system. A physical connection may be detected by various means. For example, the power management logic may detect electrical resistance on pins may be measured using a pull-down/pull-up resistor circuit. In a pull-down resistor circuit, a resistor is connected between an input pin (e.g., a charging contact) and the ground (GND) of a microcontroller of the power management logic. When a device is not connected, the resistor pulls the input pin to a logic low level (e.g., 0V or ground). This indicates the absence of a connection. When a device is connected, an external signal source (e.g., the connected device or a switch) overrides the pull-down resistor's effect, and the voltage at the input pin rises to a logic high level (in some examples, close to the supply voltage, e.g., 3.3V or 5V). In a pull-up resistor circuit, a resistor connects the input pin to the positive voltage. When no device is present, the pull-up resistor pulls the input pin to a logic high level (in some examples, close to the supply voltage, e.g., 3.3V or 5V). This indicates the absence of a connected device. When a device is connected, the external signal source (e.g., the connected device or a switch) overrides the pull-up resistor's effect, and the voltage at the input pin drops to a logic low level (e.g., close to ground).

Additional exemplary implementations may use one or more of the following mechanisms: a physical switch that is flipped when a device is connected, optical sensors that get covered when a device is connected, weight or pressure sensors detect a difference, a change in magnetic fields detected, a hall effect sensor detecting the presence/absence of a magnetic field (due to, e.g., a magnet in the connected device), etc.

At step 1704, the power management logic determines a set of power sources that are suitable for the selected operational mode(s). Determining suitable power sources may include determining the kind, type, and/or charging status of available connected power sources. Power sources may include internal power sources (e.g., internal batteries, solar panels, etc.) or external power sources (e.g., connected devices like a power bank, etc.). Power sources may include, without limitation, dry cell batteries, rechargeable batteries, solar panels, hand-crank generator, fuel-based generators, fuel cells, piezo-electric cells, "mains" or "wall" power, and/or external power interfaces (e.g., USB, PoE), and/or any other source of electrical power.

In one embodiment, power management logic may be select between single-source or multiple source power supplies. As used herein, the term "single source" refers to a power supply that can select one power source from multiple power sources. For example, so-called "dual power" devices are devices that are designed to accept either single-use or rechargeable cells, but not at the same time. A dual power device may accept one battery cartridge for single-use batteries and another for rechargeable batteries. In another example, a single battery cartridge type can accept either single-use or rechargeable batteries (but not a mix of types). Dual power devices lack the onboard intelligence to manage different cell chemistries; thus, mixing cell types can result in the problems described above (reduced power, damage, and/or rupture). In some situations, dual power devices can also be inconvenient because the consumer may need to carry both options with them and to know in advance what their power needs will be.

As used herein, the term "multiple source" refers to a power supply that can combine power outputs from multiple power sources. For example, "hybrid power devices" may include circuitry that monitors power conditions of the different power sources and may make intelligent power management decisions on how to budget available power for a user of the device. Ideally, hybrid power devices can accommodate different power supplies, flexibly address different usages, and improve the convenience of use. For example, the exemplary lighting system 1400 may combine output from multiple power sources (e.g., a solar panel and an internal rechargeable battery).

Various embodiments of the present disclosure may limit operational modes to certain suitable power sources. For example, suitable power draw may not be available from an on-device solar panel to power the needed lighting; supplemental current may be drawn from the rechargeable battery or the solar panel may be disabled. In another example, 3 AA or 3 D batteries can both generate up to 4.5 V but at different current draws; thus, either power supply may be suitable for certain lighting modes. Similarly, external charging may preferentially use the 3.7 V lithium-ion, with a fallback to 3 AA batteries. In some cases, suitability preferences may be used to prioritize/de-prioritize operational modes; for example, the exemplary lighting system 1400 may preserve its internal battery when there is sufficient current available from the solar panel or when coupled to an external source of power via a USB-charging port. In some examples, the exemplary lighting system 1400 may use certain power sources (e.g., the rechargeable battery) for high-intensity loads (e.g., certain lighting applications), devices (e.g., a device connected for charging) or interfaces (e.g., charging contacts), but not others. For example, charging a connected device via a USB interface. In other cases, suitability preferences may enable hybrid operation e.g., 4.5 V can be concurrently sourced from AA and D cells without damage—but would result in harmful back current for the 3.7 V lithium-ion. In some examples, a 4.5 V load can be concurrently sourced from the internal battery and via a (power-in) USB interface. Some implementations may implement usage restrictions as static logic, other implementations may dynamically evaluate suitability based on a variety of factors. Examples of such factors may include e.g., minimum or maximum voltage/current/power requirements, user preferences, history of usage, battery condition, battery hysteresis (memory effects), availability of alternative power supplies, and/or any other operational consideration.

At step 1706, the power management logic selects one or more power sources from the set of power sources for the operational mode. In one exemplary embodiment, the power management logic may select from multiple types of batteries and allow the batteries to be used separately, or concurrently. In another exemplary embodiment, the power management logic may select from powering device operations from connected power sources (e.g., via a USB power-in interface, a connected charging device, solar panels, etc.) and an internal battery and allow the various power sources to be used separately, or concurrently. The power management logic may intelligently monitor the availability of the power sources and the power remaining in all power sources; this information may be used to switch between the power sources. Ideally, the power management logic maximizes the power available for the lowest lifetime cost, while also offering the highest flexibility in power options.

For example, power management logic in the exemplary lighting system 1400 may monitor available the available charge/battery life in the internal battery or an external battery pack to determine whether to continue to charge the internal battery (or, e.g., leave remaining power in the external battery to power/charge other, perhaps emergency, components like a cellular phone or headlamp). Determinations of the remaining charge may be provided via a data connection between devices or determined via the requested load.

At step 1708, the power management logic obtains usage estimates from monitoring logic and may select (or re-select) another power source from the set of power sources for the selected operational mode. In some examples, usage estimates may be received from monitoring logic on a connected device.

Referring now to the monitoring instructions 1750, the instantaneous voltage of a power source is measured at step 1752. Voltage may be measured with a voltage sensor (described with respect to the sensor subsystem 1410). In one exemplary embodiment, voltage may be measured across a known impedance using an analog-digital conversion (ADC). Impedance based measurements may consider both resistance (frequency independent) and/or reactance (frequency dependent). For example, certain duty cycles and/or sampling frequencies may use frequency-dependent resonance/interference to amplify and/or attenuate measurements. Then, the monitoring logic calculates a characteristic voltage for a rolling window at step 1754.

As used herein, "instantaneous" refers to a specific measurement of a time-varying quantity at a specific time (an instance). "Characteristic" refers to a representative measurement for a time-varying quantity over a window of time. As previously noted, characteristic measurements may include averaging (mean, median, range), filtering, root-mean-square calculations, multiply-accumulate, and/or any other calculation that generates a characteristic non-zero value for a dynamic input.

In some embodiments, the granularity of the instantaneous measurements, the sample rate, and/or the size of the rolling window may be selected to provide a specific granularity. For example, a 4-bit ADC can generate up to 16 different values, an 8-bit ADC can generate up to 256 values. The sampling rate (e.g., 1 Hz (1/sec), 2 Hz (2/sec), . . . 40 Hz (40/sec), etc. affects the relative responsiveness of measurements. Accumulating these values over the rolling window could provide a substantial range of readings (e.g., accumulating 16 measurements could span 256-4096 different possible values over a duration between 200 ms-16 s). In some cases, the granularity may be specific to the operational mode. For example, a high-draw operational mode (e.g., 100% duty cycle light) will use battery power very quickly and may only need gross measurements at a relatively fast sample rate to detect the drop and/or rate of drop. In contrast, a low-draw operational mode (e.g., trickle charging) may need much finer granularity and/or a much slower sample rate to provide meaningful data. In other words, the monitoring logic may adjust its measurement accuracy/precision to suit the power consumption characteristics of the different operational modes.

At step 1756, the monitoring logic determines usage estimates based on the characteristic value and a characteristic function. In one exemplary embodiment, the characteristic function may be a look-up table that provides a correspondence between a characteristic value (e.g., a time averaged voltage measurement taken at a specific duty cycle and sample rate) to an estimated battery life based on the experimentally determined battery chemistry/characteristics. More generally, however, any suitable function may be substituted with equal success. Characteristic functions may be based on piecewise, point-wise, linear approximation, polynomial interpolation, etc.

In some examples, usage estimates (and/or voltage/characteristic values) may be provided to a connected device.

For example, the exemplary lighting system 1400 may provide usage estimates of an internal battery to a connected battery pack when charging. The exemplary lighting system 1400 may receive the characteristic value and/or receive the voltage/characteristic values and calculate the characteristic value over a rolling window for power management, monitoring, and/or display.

At step 1758, the usage estimates are displayed via a user interface. Notably, indicator LEDs can represent different usage estimates based on the number lit and color. For example, the exemplary lighting system 1400 may have four indicator LEDs to indicate the draw (or charging) of the state of the internal battery of the device. In another example, the exemplary lighting system 1400 may have indicator LEDs to indicate the usage/remaining charge of each connected battery separately and/or connected external batteries based on receiving usage estimates from the external batteries. Other implementations may use any number of LEDs/colors to represent any number of different power information. More broadly, any scheme for representing usage may be substituted with equal success. For example, a sufficiently capable UI may provide usage estimates in more verbose or granular form e.g., a smart phone interface could provide a text readout with an estimated current draw (in amps/milliamps, etc.) and/or remaining capacity (amp hours, milliamp hours, etc.), or illustrate usage/capacity over time.

17.2 Operational Mode Selection

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., operational mode selection instructions) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of a single process, the process may be separated into multiple processes (and performed by e.g., different subsystems of the exemplary lighting system 1400) may be combined with other processes or further subdivided into two or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

In some examples, operational mode selection instructions may operate the exemplary lighting system 1400 according to the methods 200 (of FIG. 2) and/or 300 (of FIG. 3). For example, the exemplary lighting system 1400 may, in one set of operating modes (e.g., having a light output over a threshold), determine whether a user is holding a button down, touching a touch sensor, in proximity of the exemplary lighting system 1400, or otherwise exercising control of the exemplary lighting system 1400. When such an action/control is identified, operation may continue in the operating mode. When action/control is not identified, the exemplary lighting system 1400 may switch to a different (e.g., safe) mode.

In some examples, operational mode selection instructions may operate the exemplary lighting system 1400 according to the methods 600 (of FIG. 6) and 700 (of FIG. 7). For example, the exemplary lighting system 1400 may determine the temperature of a target/object, e.g., illuminated by the exemplary lighting system 1400. Where the temperature is above a threshold, light output of the exemplary lighting system 1400 may be reduced. A manual override may stop or reduce a limiting of the light output. However, in some examples, the temperature (may be compared to a second threshold. If the temperature exceeds the second threshold may override the manual override. Light may be reduced (or a mode changed) in response to the detected temperature when above the threshold. The temperature may be periodically determined to determine whether the lighting should be further reduced.

In some examples, operational mode selection instructions may operate the exemplary lighting system 1400 according to the methods 1000 (of FIG. 10) and/or 1100 (of FIG. 11). For example, the exemplary lighting system 1400 may determine a target distance and operate the exemplary lighting system 1400 based on the distance as well as determining a temperature of the exemplary lighting system 1400 (or a portion of the exemplary lighting system 1400, e.g., a surface/handle of the exemplary lighting system 1400). For example, the exemplary lighting system 1400 may periodically perform a plurality of safety determinations using various sensors. For example, the exemplary lighting system 1400 may determine: a distance to a target object/area using the distance sensor; the temperature of one or more components of the exemplary lighting system 1400 via a temperature sensor, the temperature of a target using a temperature sensor, user control/pressing a manual override button, etc. Based on these determinations, further actions may be undertaken to investigate the potential safety risk (e.g., determining a light output threshold, etc.) and/or mitigate the risk (by, e.g., changing the operating mode or reducing the light output of the exemplary lighting system 1400).

In some examples, the exemplary lighting system 1400 may run multiple mode selection instructions in parallel/concurrently (from at least two of methods 200 (of FIG. 2), 300 (of FIG. 3), methods 600 (of FIG. 6), 700 (of FIG. 7), 1000 (of FIG. 10) and/or 1100 (of FIG. 11)). Operationally, the exemplary lighting system 1400 may change the operational mode and/or reduce (or increase) light output based on multiple sensor inputs (indicating e.g., touch/presence/control by a user, device temperature, target distance, and target temperature). In some examples, the exemplary lighting system 1400 may change operational mode/light output based on a single factor (among multiple considered) or may require a combination of multiple factors. For example, to maintain a light output greater than a threshold (e.g., 1000 lm) or the exemplary lighting system 1400 in a particular configuration, the exemplary lighting system may require multiple factors to begin or continue operating at that light output but a single factor (e.g., touch/presence/control by a user, device temperature, target distance, or target temperature) or subset of factors to enter a safe mode or reduce light output.

18 Additional Configuration Considerations

Throughout this specification, some embodiments have used the expressions “comprises,” “comprising,” “includes,” “including,” “has,” “having” or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the term "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processor" or "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A lighting apparatus, comprising:
- one or more lighting devices;
- a distance sensor;
- a temperature sensor configured to sense an internal temperature of the lighting apparatus;
- a controller coupled to the one or more lighting devices, the distance sensor, and the temperature sensor; and
- a non-transitory computer-readable medium comprising instructions that when executed by the controller cause the lighting apparatus to:
  - determine a distance from a target illuminated by the one or more lighting devices;
  - determine a threshold light output based on the distance from the target;
  - determine whether a light output of the one or more lighting devices exceeds the threshold light output;
  - convert the internal temperature to an estimated surface temperature;
  - monitor a surface temperature of the lighting apparatus based on the estimated surface temperature;
  - determine the surface temperature exceeds a threshold surface temperature; and
  - reduce the light output of the one or more lighting devices based on: the surface temperature exceeding the threshold surface temperature and the light output exceeding the threshold light output.

2. The lighting apparatus of claim 1, where the distance sensor comprises a laser time-of-flight distance sensor.

3. The lighting apparatus of claim 1, where determining the threshold light output is in response to determining the distance from the target being less than a threshold distance.

4. The lighting apparatus of claim 3, where the threshold distance is between 6 and 14 inches, inclusive.

5. The lighting apparatus of claim 1, where reducing the light output of the one or more lighting devices comprises modifying a power duty cycle of the one or more lighting devices.

6. The lighting apparatus of claim 1, where reducing the light output comprises reducing the light output below the threshold light output.

7. The lighting apparatus of claim 1, where the threshold surface temperature is between 45° C. and 55° C.

8. The lighting apparatus of claim 1, where converting the internal temperature to the estimated surface temperature comprises performing a lookup in a mapping between internal and surface temperatures.

9. The lighting apparatus of claim 1, where the instructions, when executed by the controller, further cause the lighting apparatus to:
- monitor an updated surface temperature;
- monitor an updated distance to an updated target illuminated by the one or more lighting devices; and
- increase the light output of the one or more lighting devices based on the updated surface temperature and the updated distance.

10. The lighting apparatus of claim 1, where the instructions, when executed by the controller, further cause the lighting apparatus to:
- determine a plurality of updated surface temperatures over a first threshold time period;
- determine the plurality of updated surface temperatures are below a threshold surface temperature for the first threshold time period;

determine a plurality of updated distances over a second threshold time period;

determine the plurality of updated distances are above a threshold distance for the second threshold time period; and increase the light output of the one or more lighting devices based on the plurality of updated surface temperatures are below the threshold surface temperature for the first threshold time period and the plurality of updated distances are above the threshold distance for the second threshold time period.

11. The lighting apparatus of claim 1, where determining the threshold light output comprises performing a lookup of the threshold light output in a table of threshold light outputs based on the distance and the surface temperature.

12. The lighting apparatus of claim 1, further comprising an external temperature sensor coupled to the controller configured to sense a target temperature of the target illuminated by the one or more lighting devices, where the threshold light output is further based on the target temperature.

13. The lighting apparatus of claim 1, further comprising a housing enclosing the one or more lighting devices, the distance sensor, the temperature sensor, and the controller, where the temperature sensor is configured to determine the internal temperature within the housing.

14. The lighting apparatus of claim 13, further comprising a second temperature sensor coupled to the controller configured to determine a second temperature within a second portion of the housing.

15. The lighting apparatus of claim 14, where the instructions that, when executed by the controller, further cause the lighting apparatus to determine the internal temperature based on the temperature sensor and the second temperature sensor.

16. The lighting apparatus of claim 8, where converting the internal temperature to the estimated surface temperature comprises performing a lookup to determine the estimated surface temperature based on the internal temperature.

17. A lighting apparatus, comprising:

one or more lighting devices;

a distance sensor;

a temperature sensor;

a controller coupled to the one or more lighting devices, the distance sensor, and the temperature sensor; and a non-transitory computer-readable medium comprising instructions that when executed by the controller cause the lighting apparatus to:

determine a distance from a target illuminated by the one or more lighting devices;

monitor a surface temperature of the lighting apparatus;

determine a threshold light output based on the distance from the target;

determine whether a light output of the one or more lighting devices exceeds the threshold light output;

reduce the light output of the one or more lighting devices based on the light output exceeding the threshold light output;

monitor an updated surface temperature;

monitor an updated distance to an updated target illuminated by the one or more lighting devices; and increase the light output of the one or more lighting devices based on the updated surface temperature and the updated distance.

18. The lighting apparatus of claim 17, where determining the threshold light output is in response to determining the distance from the target being less than a threshold distance.

19. The lighting apparatus of claim 18, where the threshold distance is between 6 and 14 inches, inclusive.

20. The lighting apparatus of claim 17, where reducing the light output of the one or more lighting devices comprises modifying a power duty cycle of the one or more lighting devices.

21. The lighting apparatus of claim 17, where reducing the light output comprises reducing the light output below the threshold light output.

22. The lighting apparatus of claim 17, where the instructions, when executed by the controller, further cause the lighting apparatus to reduce the light output of the one or more lighting devices based on the surface temperature exceeding a threshold surface temperature.

23. The lighting apparatus of claim 17, where determining the threshold light output comprises performing a lookup of the threshold light output in a table of threshold light outputs based on the distance and the surface temperature.

24. A lighting apparatus, comprising:

one or more lighting devices;

a distance sensor;

a temperature sensor;

a controller coupled to the one or more lighting devices, the distance sensor, and the temperature sensor; and a non-transitory computer-readable medium comprising instructions that when executed by the controller cause the lighting apparatus to:

determine a distance from a target illuminated by the one or more lighting devices;

monitor a surface temperature of the lighting apparatus;

determine a threshold light output based on the distance from the target;

determine whether a light output of the one or more lighting devices exceeds the threshold light output;

reduce the light output of the one or more lighting devices based on the light output exceeding the threshold light output;

determine a plurality of updated surface temperatures over a first threshold time period;

determine the plurality of updated surface temperatures are below a threshold surface temperature for the first threshold time period;

determine a plurality of updated distances over a second threshold time period;

determine the plurality of updated distances are above a threshold distance for the second threshold time period; and increase the light output of the one or more lighting devices based on the plurality of updated surface temperatures are below the threshold surface temperature for the first threshold time period and the plurality of updated distances are above the threshold distance for the second threshold time period.

25. The lighting apparatus of claim 24, where the distance sensor comprises a laser time-of-flight distance sensor.

26. The lighting apparatus of claim 24, where determining the threshold light output comprises performing a lookup of the threshold light output in a table of threshold light outputs based on the distance and the surface temperature.

27. The lighting apparatus of claim 24, where reducing the light output of the one or more lighting devices comprises reducing a pulse width modulation (PWM) duty cycle.

28. The lighting apparatus of claim 24, where the light output of the one or more lighting devices is estimated based on a lighting mode.

* * * * *